(12) United States Patent
Barbieru et al.

(10) Patent No.: US 9,051,468 B2
(45) Date of Patent: Jun. 9, 2015

(54) DYES FOR POLYMER COLORATION, THEIR PREPARATION AND THEIR USE

(71) Applicants: Roxana Barbieru, Singapore (SG); Gunter Görlitz, Bad Soden (DE); Carsten Harfmann, Frankfurt am Main (DE)

(72) Inventors: Roxana Barbieru, Singapore (SG); Gunter Görlitz, Bad Soden (DE); Carsten Harfmann, Frankfurt am Main (DE)

(73) Assignee: Clariant International LTD (CH)

( * ) Notice: Subject to any disclaimer, the term of this patent is extended or adjusted under 35 U.S.C. 154(b) by 0 days.

(21) Appl. No.: 13/621,330

(22) Filed: Sep. 17, 2012

(65) Prior Publication Data

US 2013/0019415 A1   Jan. 24, 2013

Related U.S. Application Data

(63) Continuation of application No. 13/363,600, filed on Feb. 1, 2012, now abandoned, which is a continuation of application No. 13/140,081, filed as application No. PCT/EP2009/065683 on Nov. 24, 2009, now abandoned.

(30) Foreign Application Priority Data

Dec. 17, 2008   (EP) .................................... 08171893

(51) Int. Cl.
| | |
|---|---|
| *C07D 401/02* | (2006.01) |
| *C07D 401/14* | (2006.01) |
| *D06P 3/00* | (2006.01) |
| *C07D 471/02* | (2006.01) |
| *C07D 471/08* | (2006.01) |
| *C07D 471/12* | (2006.01) |
| *C09B 5/62* | (2006.01) |
| *C08K 5/00* | (2006.01) |

(52) U.S. Cl.
CPC ................. *C09B 5/62* (2013.01); *C08K 5/0041* (2013.01)

(58) Field of Classification Search
USPC ........................................ 8/636, 506; 546/37
See application file for complete search history.

(56) References Cited

U.S. PATENT DOCUMENTS

| | | |
|---|---|---|
| 4,238,386 A | 12/1980 | Babler |
| 5,104,918 A | 4/1992 | Babler |
| 6,605,126 B1 | 8/2003 | Xia et al. |
| 2007/0221913 A1* | 9/2007 | Lee et al. .................... 257/40 |
| 2010/0011656 A1* | 1/2010 | Gessner et al. ................ 44/338 |

FOREIGN PATENT DOCUMENTS

| | | |
|---|---|---|
| EP | 0006122 A1 | 1/1980 |
| EP | 0283436 A2 | 9/1988 |
| JP | 10006645 A | 1/1998 |
| JP | 2006 098927 A | 4/2006 |
| WO | WO 2007/099059 * | 9/2007 |
| WO | WO-2007/099059 A1 | 9/2007 |

OTHER PUBLICATIONS

Chen et al. Novel Nanoscale Organic Materials for Optimal Photovoltaic Functions. Mater. Res. Soc. Symp. Proc. vol. 974, 2007, Materials Research Society, 0974-CC06-11.*

* cited by examiner

*Primary Examiner* — Amina Khan

(74) *Attorney, Agent, or Firm* — Novak Druce Connolly Bove + Quigg LLP

(57) ABSTRACT

The present invention relates to a compound of formula (I)

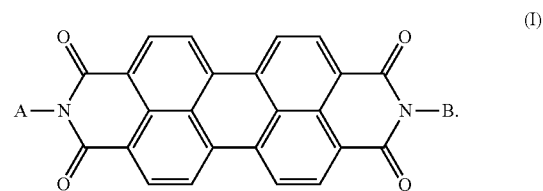

The invention also relates to the preparation of the compound of formula (I) and to its use.

8 Claims, No Drawings

DYES FOR POLYMER COLORATION, THEIR PREPARATION AND THEIR USE

This application is a Continuation Application of application Ser. No. 13/363,600 filed Feb. 1, 2012, now abandoned, which is incorporated by reference. U.S. application Ser. No. 13/363,600 is a Continuation Application of application Ser. No. 13/140,081 filed Jun. 16, 2011, now abandoned, which is incorporated by reference. U.S. application Ser. No. 13/140,081 is a national stage application (under 35 U.S.C. §371) of PCT/EP2009/065683, filed Nov. 24, 2009, which claims benefit of European application 08171893.4, filed Dec. 17, 2008.

BACKGROUND OF THE INVENTION

Polymers can be colored with dyes in various ways. One way is mass coloration of polymers whereby for example a pigment or a dye is mixed with the polymer and the polymer is melted to transport the dye into the polymer matrix. Other processes involve the polymer being colored, or to be more precise dyed, by the dyes diffusing into the polymer from a solution or dispersion, examples being the dyeing of polymeric fibers composed of polyester, polyacrylonitrile, polyurethane, cellulose or polyamide for example with, for example, disperse dyes, cationic dyes, acid dyes, metallized dyes or reactive dyes. The use of reactive dyes results in a covalent bond being performed between the dye and the substrate, conferring particularly high fastnesses on the dyeings/colorations. Another way to color a polymer is to add the dye to the polymer's monomers or oligomers, before the polymer is formed or as it is being formed. Dyes capable of forming covalent bonds with the polymer scaffold may likewise result in colorations of high fastness being obtained. For this, the dyes used, or to be more precise their chromophores, have to be sufficiently stable under the conditions of the polymerization.

Commercially available pigments when used in mass coloration of polymers do give colored polymers of predominantly high fastnesses, but the colorations are dull, i.e., lack transparency. Commercially available dyes for polymers are usually disperse dyes or solvent dyes and produce, when used for the coloration of polymers, colored polymers in which the dye often only has low bleed fastnesses. In addition, many of the known dyes have poor lightfastnesses or low thermal stabilities. In polyolefins, Dyes having good bleed fastnesses, good lightfastnesses, good thermal stabilities as well as high saturation and transparency in polyolefins without adversely affecting the properties of the polyolefins used are not known in large numbers.

EP 0 006 122 A1 discloses perylene dyes which meet the above-recited requirements only in part since they are not suitable when high bleed and wet gap fastnesses are desired.

EP 0 283 436 A2 describes perylenediimides having aliphatic radicals containing carboxy and/or carbamoyl groups attached to both nitrogen atoms. These dyes do give good results in the coloration of polyolefins, but there continues to be a broad need for improvements, for example with regard to the transparency of the colorations or the thermal stability of the colorations.

JP 2006098927, JP 10006645, US2007/0221913A1 and WO2007/099059 A1 and also J. Phys. Chem. B., 3, Jul. 2008, 112, Supporting Information, S1-S13, J. Org. Chem. 2005, 70, 8956-8962 and Chem. Mater. 1998, 10, 3603-3610 also already describe perylene dyes having poly(oxy)alkyl chains, but do not disclose their use for polymer coloration.

BRIEF SUMMARY OF THE INVENTION

There is therefore a need for dyes which have the recited properties and thus are useful for the coloration of polyolefins.

It has now been found that, surprisingly, perylenetetracarboxylic diimides having a specific substitution pattern for the imido groups represent useful dyes for the coloration of polyolefins and other substrates. They have high stability under application conditions, are readily soluble in the polymer, or miscible with suitable organic solvents, and afford highly transparent colorations having high bleed fastness.

The present invention accordingly provides compounds of formula (I)

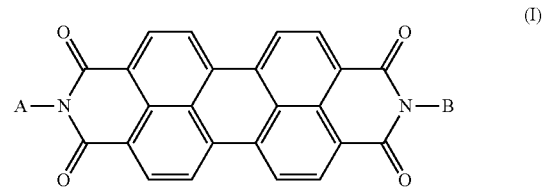

where

A represents $(C_5-C_6)$-cycloalkyl; heterocycloalkyl having 5 or 6 ring members; heteroaryl having 5 or 6 ring members; a group Ar; $(C_1-C_{35})$-alkyl; $(C_2-C_{35})$-alkyl interrupted by one or more hetero atoms, $(C_1-C_{35})$-alkyl substituted by one or more substituents $G^1$; $(C_2-C_{35})$-alkyl interrupted by one or more hetero atoms and substituted by one or more substituents $G^1$; or has one of the meanings of B;

$G^1$ represents trifluoromethyl; cyclo-$(C_5-C_6)$-alkyl; aryl; heteroaryl having 5 or 6 ring members; heterocycloalkyl having 5 or 6 ring members; halogen; cyano; nitro; hydroxyl; $(C_1-C_{35})$-alkoxy; aryloxy; $(C_2-C_{35})$-acyl; arylcarbonyl, $(C_2-C_{35})$-acyloxy; arylcarbonyloxy; $(C_2-C_{35})$-acylamino; $(C_1-C_{35})$-alkylsulfonylamino; arylsulfonylamino; arylcarbonylamino; carbamoyl; N-monocyclo-$(C_3-C_8)$-alkyl-carbamoyl; N-mono-$(C_1-C_{35})$-alkyl-carbamoyl; N,N-dicyclo-$(C_3-C_8)$-alkyl-carbamoyl; N,N-di-$(C_1-C_{35})$-alkyl-carbamoyl; N-monoaryl-carbamoyl; N,N-diaryl-carbamoyl; N-monocyclo-$(C_3-C_8)$-alkyl-N-monoarylcarbamoyl; N-mono-$(C_1-C_{35})$-alkyl-N-monoaryl-carbamoyl; $(C_1-C_{35})$-alkoxycarbonyl; aryloxycarbonyl; amino; monocyclo-$(C_3-C_8)$-alkyl-amino; mono-$(C_1-C_{35})$-alkyl-amino; di(cyclo)-$(C_3-C_8)$-alkyl-amino; di-$(C_1-C_{35})$-alkyl-amino; monoaryl-amino; diaryl-amino; monocyclo-$(C_3-C_8)$-alkylmonoarylamino; mono-$(C_1-C_{35})$-alkylmonoaryl-amino; aminothiocarbonylamino; aminocarbonylamino; sulfamoyl; N-monocyclo-$(C_3-C_8)$-alkyl-sulfamoyl; N-mono-$(C_1-C_{35})$-alkyl-sulfamoyl; N,N-dicyclo-$(C_3-C_8)$-alkyl-sulfamoyl; N,N-di-$(C_1-C_{35})$-alkyl-sulfamoyl; N-monoaryl-sulfamoyl; N,N-diaryl-sulfamoyl; N-monocyclo-$(C_3-C_8)$-alkyl-N-monoarylsulfamoyl; N-mono-$(C_1-C_{35})$-alkyl-N-monoarylsulfamoyl; amino-sulfonylamino; $(C_1-C_{35})$-alkylthio; arylthio; $(C_1-C_{35})$-alkylsulfonyl or arylsulfonyl;

Ar represents a group of formula (1) or (2)

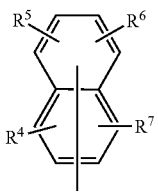

(2)

where

R¹ to R⁷ each Independently represent hydrogen; $(C_1-C_{35})$-alkyl; singly or multiply hetero atom-interrupted $(C_2-C_{35})$-alkyl, monohydroxy-$(C_1-C_{35})$-alkyl, polyhydroxy-$(C_2-C_{35})$ alkyl, vinylsulfonyl, hydroxyethylsulfonyl, trifluoromethyl; cyclo-$(C_5-C_6)$-alkyl; aryl; heteroaryl having 5 or 6 ring members; heterocycloalkyl having 5 or 6 ring members; halogen; cyano; nitro; hydroxyl; $(C_1-C_{35})$-alkoxy; aryl-$(C_1-C_{35})$-alkoxy, aryloxy; $(C_2-C_{35})$-acyl; cyclo-$(C_3-C_8)$-alkylcarbonyl, arylcarbonyl, $(C_2-C_{35})$-acyloxy; arylcarbonyloxy; $(C_2-C_{35})$-acylamino; $(C_1-C_{35})$-alkylsulfonylamino; arylsulfonylamino; arylcarbonylamino; carbamoyl; N-monocyclo-$(C_3-C_8)$-alkyl-carbamoyl; N-mono-$(C_1-C_{35})$-alkyl-carbamoyl; N,N-dicyclo-$(C_3-C_8)$-alkyl-carbamoyl; N,N-di-$(C_1-C_{35})$-alkyl-carbamoyl; N-monoaryl-carbamoyl; N,N-diaryl-carbamoyl; N-monocyclo-$(C_3-C_8)$-alkyl-N-monoarylcarbamoyl; N-mono-$(C_1-C_{35})$-alkyl-N-monoarylcarbamoyl; $(C_1-C_{35})$-alkoxycarbonyl; aryloxycarbonyl; amino; monocyclo-$(C_3-C_3)$-alkyl-amino; mono-$(C_1-C_{35})$-alkyl-amino; di(cyclo)-$(C_3-C_8)$-alkyl-amino; di-$(C_1-C_{35})$-alkyl-amino; monoaryl-amino; diaryl-amino; monocyclo-$(C_3-C_8)$-alkylmonoarylamino; mono-$(C_1-C_{35})$-alkylmonoaryl-amino; aminothiocarbonylamino; aminocarbonylamino; sulfamoyl; N-monocyclo-$(C_3-C_8)$-alkyl-sulfamoyl; N-mono-$(C_1-C_{35})$-alkyl-sulfamoyl; N,N-dicyclo-$(C_3-C_8)$-alkyl-sulfamoyl; N,N-di-$(C_1-C_{35})$-alkyl-sulfamoyl; N-monoaryl-sulfamoyl; N,N-diaryl-sulfamoyl; N-monocyclo-$(C_3-C_8)$-alkyl-N-monoarylsulfamoyl; N-mono-$(C_1-C_{35})$-alkyl-N-monoarylsulfamoyl; aminosulfonylamino; $(C_1-C_{35})$-alkylthio; arylthio; $(C_1-C_{35})$-alkylsulfonyl or arylsulfonyl; or a substituent of formula (2) or (3)

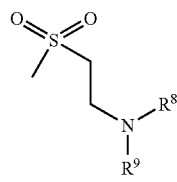

(2)

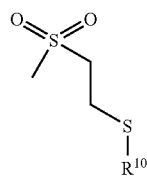

(3)

where

R⁸ to R¹⁰ each independently represent $(C_5-C_6)$-cycloalkyl; heterocycloalkyl having 5 or 6 ring members; heteroaryl having 5 or 6 ring members; aryl; $(C_1-C_{35})$-alkyl; $(C_2-C_{35})$-alkyl interrupted by one or more hetero atoms; $(C_1-C_{35})$-alkyl substituted by one or more substituents G¹; or $(C_2-C_{35})$-alkyl interrupted by one or more hetero atoms and substituted by one or more substituents G¹; and R⁸ and R⁹ may each also represent hydrogen;

B represents a group of formula (4)

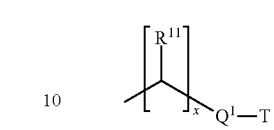

(4)

where

T represents hydrogen; $(C_1-C_{35})$-alkyl; aryl; aryloxy; hydroxyl; $(C_1-C_{35})$-alkoxy; $(C_1-C_{35})$-alkyl-aryloxy; a group of formula (5)

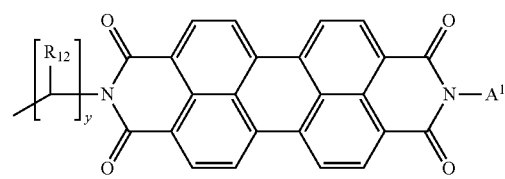

(5)

or a group of formula (6)

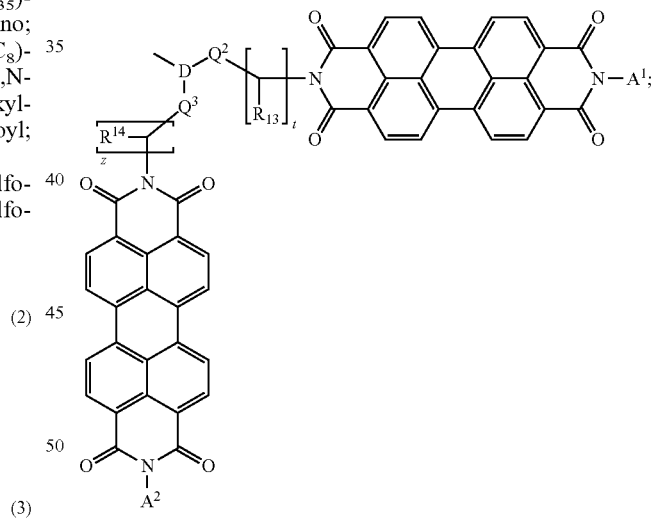

(6)

A¹ and A² each independently have one of the meanings defined for A but cannot represent B where T represents a group of formula (5) or (6);

R¹¹ to R¹⁴ each independently represent hydrogen, $(C_1-C_{35})$-alkyl, singly or multiply oxygen-interrupted $(C_1-C_{35})$-alkyl, aryl, aryl-$(C_1-C_{35})$-alkyl, $(C_1-C_{35})$-alkyl-aryl, aryloxy, $(C_1-C_{35})$-alkoxy, monohydroxy-$(C_1-C_{35})$-alkyl or polyhydroxy-$(C_2-C_{35})$-alkyl and are each identical or different within a molecule of formula (I);

x, y, t and z each independently represent a rational number from 0 to 30 except that x does not represent 0 when T represents a group of formula (6);

$Q^1$ to $Q^3$ each independently represent a group of formula (7)

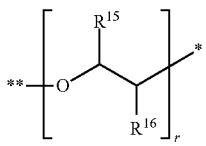
(7)

where r represents a rational number from 1 to 200 and has identical or different meanings within a molecule of formula (I);

$R^{15}$ and $R^{16}$ each independently represent hydrogen, $(C_1-C_{35})$-alkyl, singly or multiply oxygen-interrupted $(C_1-C_{35})$-alkyl, aryl, aryloxy, $(C_1-C_{35})$-alkoxy, monohydroxy-$(C_1-C_{35})$-alkyl or polyhydroxy-$(C_2-C_{35})$alkyl;

where $R^{15}$ and $R^{16}$ each have identical or different meanings within a molecule of formula (I); and where when $R^{15}$ and $R^{16}$ have different meanings within a molecule of formula (I), these different meanings are randomly distributed or regions of respectively identical meanings follow each other;

and where the T groups are attached to the bond * and when D is present to the bond **;

and $Q^1$, $R^{11}$, T and x are each identical or different within a molecule of formula (I);

D represents a group of formula (8)

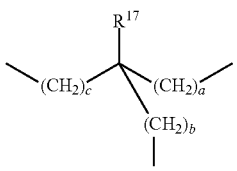
(8)

where a, b and c each independently represent a number from 0 to 15; and $R^{17}$ represents hydrogen, $(C_1-C_{35})$-alkyl, singly or multiply oxygen-interrupted $(C_1-C_{35})$-alkyl, aryloxy, $(C_1-C_{35})$-alkoxy, monohydroxy-$(C_1-C_{35})$alkyl or polyhydroxy-$(C_2-C_{35})$-alkyl; and In the above definitions aryl represents a group of formula (9) or (10)

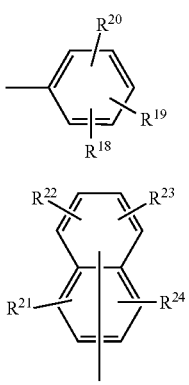

(9)

(10)

where $R^{18}$ to $R^{24}$ each independently represent hydrogen; $(C_1-C_{12})$-alkyl; monohydroxy-$(C_1-C_6)$-alkyl, polyhydroxy-$(C_1-C_6)$-alkyl, trifluoromethyl; cyclo-$(C_3-C_6)$-alkyl; halogen; cyano; nitro; hydroxyl; $(C_1-C_6)$-alkoxy; $(C_2-C_6)$-acyl; $(C_2-C_6)$-acylamino; $(C_1-C_6)$-alkylsulfonylamino; carbamoyl; N-mono-$(C_1-C_6)$-alkyl-carbamoyl; N,N-di-$(C_1-C_6)$-alkyl-carbamoyl; amino; mono-$(C_1-C_6)$-alkyl-amino; di-$(C_1-C_6)$-alkyl-amino; aminocarbonylamino; sulfamoyl; N-mono-$(C_1-C_6)$-alkyl-sulfamoyl; N,N-di-$(C_1-C_6)$-alkyl-sulfamoyl; aminosulfonylamino; $(C_1-C_6)$-alkylthio or $(C_1-C_6)$-alkylsulfonyl;

where in a B group of formula (4) r represents a rational number from 8 to 200 when T represents hydrogen, alkyl or alkoxy; and excluding compounds in which A and B each represent a group of formula (4) where T represents $(C_1-C_{35})$-alkyl, hydroxyl or $(C_1-C_{35})$-alkoxy, x represents 2 or 3 and $R^{11}$ is identical within the compounds and represents hydrogen.

DETAILED DESCRIPTION OF THE INVENTION

In the abovementioned definitions, alkyl groups may be straight chain or branched and be for example methyl, ethyl, n-propyl, isopropyl, n-butyl or isobutyl, but also hexyl, such as n-hexyl, heptyl, such as n-heptyl, octyl, such as n-octyl and isooctyl, nonyl, such as n-nonyl, decyl, such as n-decyl, dodecyl, such as n-dodecyl, hexadecyl, such as n-hexadecyl, or octadecyl, such as n-octadecyl. The same holds mutatis mutandis for alkoxy and alkylthio groups.

When alkyl groups are interrupted by one or more hetero atoms, hetero atoms are oxygen, sulfur sulfonyl, carbonyl and also the group —$NR^{25}$, where $R^{25}$ represents $(C_1-C_6)$-alkyl, monohydroxy-$(C_1-C_6)$-alkyl, polyhydroxy-$(C_2-C_6)$-alkyl, $(C_1-C_4)$-alkyloxy-$(C_1-C_6)$-alkyl, phenoxy-$(C_1-C_6)$-alkyl or phenyl.

Cycloalkyl groups are in particular cyclopropyl, cyclobutyl, cyclopentyl, cyclohexyl, cycloheptyl and cyclooctyl.

Heterocycloalkyl preferably represents pyrrolidine, piperidine, morpholine, N-methylpiperazine or piperazine.

Heteroaryl is preferably pyridine, pyrimidine, pyridazine, pyrazine, pyrrole, imidazole, pyrazole, 1,2,4-thiadiazole, 1,2,4-triazole, tetrazole, thiophene, thiazole, isothiazole, 1,3,4-thiadiazole, furan, oxazole, isoxazole or benzothiazole.

Halogen is in particular fluorine, chlorine or bromine.

Preferred dyes of formula (I) according to the present invention conform to formula (Ia)

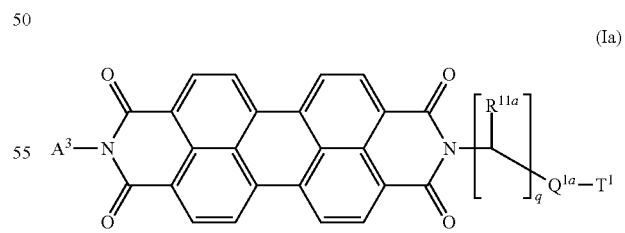
(Ia)

where $T^1$ represents hydrogen, $(C_1-C_{35})$-alkyl, aryl, aryloxy, hydroxyl, $(C_1-C_{35})$-alkoxy or $(C_1-C_{35})$-alkyl-aryloxy;

q represents a number from 1 to 10;

$Q^{1a}$ has one of the meanings of $Q^1$;

$R^{11a}$ has one of the meanings of $R^{11}$; and $A^3$ represents $(C_5-C_6)$-cycloalkyl; heterocycloalkyl having 5 to 10 ring members; heteroaryl having 5 or 6 ring members;

$(C_1-C_{35})$-alkyl; $(C_2-C_{35})$-alkyl interrupted by one or more hetero atoms, $(C_1-C_{35})$-alkyl substituted by one or more substituents $G^2$; $(C_2-C_{35})$-alkyl interrupted by one or more hetero atoms and substituted by one or more substituents $G^2$;

$G^2$ represents trifluoromethyl; cyclo-$(C_5-C_6)$-alkyl; aryl; heteroaryl having 5 or 6 ring members; heterocycloalkyl having 5 or 6 ring members; hydroxyl; $(C_1-C_{35})$-alkoxy; aryloxy; $(C_2-C_{35})$-acyl; arylcarbonyl, $(C_2-C_{35})$-acyloxy; arylcarbonyloxy; $(C_2-C_{35})$-acylamino; $(C_1-C_{35})$-alkylsulfonylamino; arylsulfonylamino; arylcarbonylamino; carbamoyl; N-monocyclo-$(C_3-C_8)$-alkyl-carbamoyl; N-mono-$(C_1-C_{35})$-alkyl-carbamoyl; N,N-dicyclo-$(C_3-C_8)$-alkyl-carbamoyl; N,N-di-$(C_1-C_{35})$-alkyl-carbamoyl; N-monoaryl-carbamoyl; N,N-diaryl-carbamoyl; N-monocyclo-$(C_3-C_8)$-alkyl-N-monoarylcarbamoyl; N-mono-$(C_1-C_{35})$-alkyl-N-monoaryl-carbamoyl; $(C_1-C_{35})$-alkoxycarbonyl; aryloxycarbonyl; amino; monocyclo-$(C_3-C_8)$-alkyl-amino; mono-$(C_1-C_{35})$-alkyl-amino; di(cyclo)-$(C_3-C_8)$-alkyl-amino; di-$(C_1-C_{35})$-alkyl-amino; monoaryl-amino; diaryl-amino; monocyclo-$(C_3-C_8)$-alkylmonoarylamino; mono-$(C_1-C_{35})$-alkylmonoaryl-amino; aminothiocarbonylamino; aminocarbonylamino; sulfamoyl; N-monocyclo-$(C_3-C_8)$-alkyl-sulfamoyl; N-mono-$(C_1-C_{35})$-alkyl-sulfamoyl; N,N-dicyclo-$(C_3-C_8)$-alkyl-sulfamoyl; N,N-di-$(C_1-C_{35})$-alkyl-sulfamoyl; N-monoaryl-sulfamoyl; N,N-diaryl-sulfamoyl; N-monocyclo-$(C_3-C_8)$-alkyl-N-monoarylsulfamoyl; N-mono-$(C_1-C_{35})$-alkyl-N-monoarylsulfamoyl; aminosulfonyl-amino; $(C_1-C_{35})$-alkylthio; arylthio; $(C_1-C_{35})$-alkylsulfonyl or arylsulfonyl; where aryl represents a group of formula (9a) or (10a)

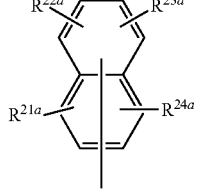

(9a)

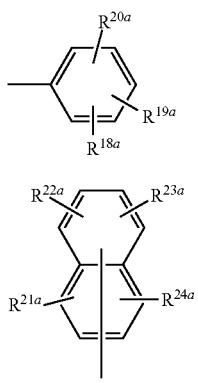

(10a)

where $R^{18a}$ to $R^{24a}$ each independently represent hydrogen; $(C_1-C_{12})$-alkyl; trifluoromethyl; cyclo-$(C_3-C_8)$-alkyl; halogen; cyano; nitro; hydroxyl; $(C_1-C_6)$-alkoxy; $(C_2-C_6)$-acyl; $(C_2-C_6)$-acylamino; $(C_1-C_6)$-alkylsulfonylamino; carbamoyl; N-mono-$(C_1-C_6)$-alkyl-carbamoyl; N,N-di-$(C_1-C_6)$-alkyl-carbamoyl; amino; mono-$(C_1-C_6)$-alkyl-amino; di-$(C_1-C_6)$-alkyl-amino; aminocarbonylamino; sulfamoyl; N-mono-$(C_1-C_6)$-alkyl-sulfamoyl; N,N-di-$(C_1-C_6)$-alkyl-sulfamoyl; aminosulfonylamino; $(C_1-C_6)$-alkylthio or $(C_1-C_6)$-alkylsulfonyl.

In particularly preferred compounds of formula (Ia)

$T^1$ represents $(C_1-C_{35})$-alkoxy, hydroxyl, $(C_1-C_{35})$-alkyl or $(C_1-C_{35})$-alkyl-aryloxy;

$R^{11a}$ represents hydrogen or $(C_1-C_{15})$alkyl;

q represents 1, 2 or 3;

$Q^{1a}$ represents a group of formula (7) where r represents a rational number from 8 to 100 and has identical or different meanings within a molecule of formula (Ia);

$R^{15}$ and $R^{16}$ each independently represent hydrogen or $(C_1-C_{35})$-alkyl and where $R^{15}$ and $R^{16}$ have identical or different meanings within a molecule of formula (Ia); and where $R^{15}$ and $R^{16}$ each have Identical or different meanings within a molecule of (Ia);

and where when $R^{15}$ and $R^{16}$ have different meanings within a molecule of formula (Ia), these different meanings are randomly distributed or regions of respectively identical meanings follow each other; and $A^3$ represents a group $A^{3a}$ where $A^{3a}$ represents $(C_5-C_6)$-cycloalkyl; heterocycloalkyl having 5 or 6 ring members; heteroaryl having 5 or 6 ring members; $(C_1-C_{35})$-alkyl; $(C_2-C_{35})$-alkyl interrupted by one or more hetero atoms, $(C_1-C_{35})$-alkyl substituted by one or more substituents $G^3$; $(C_2-C_{35})$-alkyl interrupted by one or more hetero atoms and substituted by one or more substituents $G^3$;

$G^3$ represents trifluoromethyl; cyclo-$(C_5-C_6)$-alkyl; aryl; heteroaryl having 5 or 6 ring members; heterocycloalkyl having 5 or 6 ring members; hydroxyl; $(C_1-C_{35})$-alkoxy; aryloxy; $(C_2-C_{35})$-acyl or arylcarbonyl;

where aryl represents a group of formula (9b) or (10b)

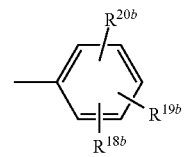

(9b)

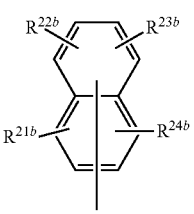

(10b)

where $R^{18b}$ to $R^{24b}$ each independently represent hydrogen, $(C_1-C_6)$-alkyl; trifluoromethyl; cyclo-$(C_3-C_8)$-alkyl; halogen; cyano; nitro; hydroxyl; $(C_1-C_6)$-alkoxy; $(C_2-C_6)$-acyl; $(C_2-C_6)$-acylamino; $(C_1-C_6)$-alkylthio or $(C_1-C_6)$-alkylsulfonyl.

In very particularly preferred compounds of formula (Ia)

$T^1$ represents $(C_1-C_{15})$-alkoxy, particularly methoxy; or $(C_1-C_{10})$-alkyl-phenoxy;

$R^{11a}$ represents hydrogen or $(C_1-C_4)$alkyl, particularly methyl;

q represents 2;

$Q^{1a}$ represents a group of formula (7) where r is a rational number from 8 to 35 and has identical or different meanings within a molecule of formula (Ia);

$R^{15}$ and $R^{16}$ each independently represent hydrogen or $(C_1-C_4)$-alkyl, particularly methyl;

where $R^{15}$ and $R^{16}$ have respectively identical or different meanings within a molecule of the formula (Ia); and where when $R^{15}$ and $R^{16}$ have different meanings within a molecule of formula (Ia), regions of respectively identical meanings follow each other; and $A^3$ represents $(C_6-C_{20})$-alkyl; $(C_1-C_8)$-alkoxy-$(C_1-C_4)$-alkyl; hydroxy-$(C_1-C_4)$-alkoxy-$(C_1-C_4)$-alkyl; cyclohexyl; cyclohexyl-$(C_1-C_4)$-alkyl; N-methylpiperazinyl, benzothiazolyl, D-($C_1$-$C_4$)-alkyl, where D represents naphthyl or morpholine; or a group of formula (11);

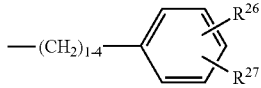
(11)

where $R^{26}$ and $R^{27}$ each independently represent hydrogen, chlorine, fluorine or ($C_1$-$C_4$)-alkoxy, particularly methoxy.

Compounds of formula (Ia) conform for example to formula (Iaa)

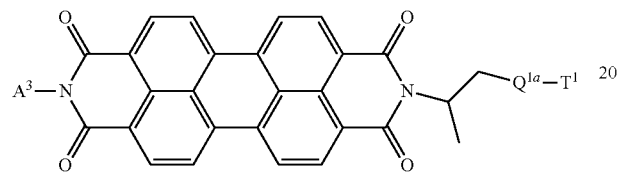
(Iaa)

where
$T^1$ represents ($C_1$-$C_{15}$)-alkoxy, particularly methoxy; or ($C_1$-$C_{10}$)-alkyl-phenoxy;

$Q^{1a}$ represents a group of formula (7) where r is a rational number from 8 to 35 and has identical or different meanings within a molecule of formula (Ia);

$R^{15}$ and $R^{16}$ each independently represent hydrogen or ($C_1$-$C_4$)-alkyl, particularly methyl;

where $R^{15}$ and $R^{16}$ have respectively identical or different meanings within a molecule of the formula (Ia); and where when $R^{15}$ and $R^{16}$ have different meanings within a molecule of formula (Ia), regions of respectively identical meanings follow each other; and $A^3$ represents ($C_6$-$C_{20}$)-alkyl; ($C_1$-$C_8$)-alkoxy-($C_1$-$C_4$)-alkyl; hydroxy-($C_1$-$C_4$)-alkoxy-($C_1$-$C_4$)-alkyl; cyclohexyl; cyclohexyl-($C_1$-$C_4$)-alkyl; N-methylpiperazinyl, benzothiazolyl, D-($C_1$-$C_4$)-alkyl, where D represents naphthyl or morpholine; or a group of formula (11);

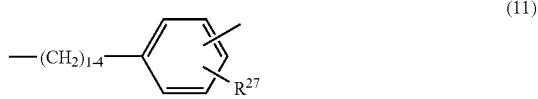
(11)

where $R^{26}$ and $R^{27}$ each independently represent hydrogen, chlorine, fluorine or ($C_1$-$C_4$)-alkoxy, particularly methoxy.

Examples of compounds of formula (Ia) are the compounds of formulae (Ia1) to (Ia29)

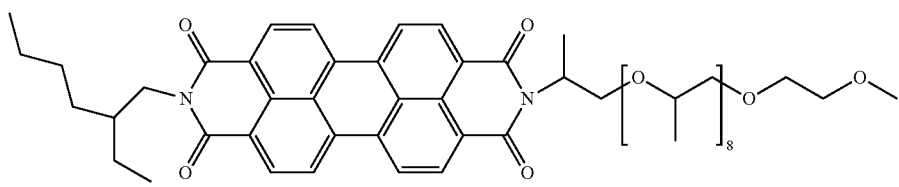
(Ia1)

(Ia2)

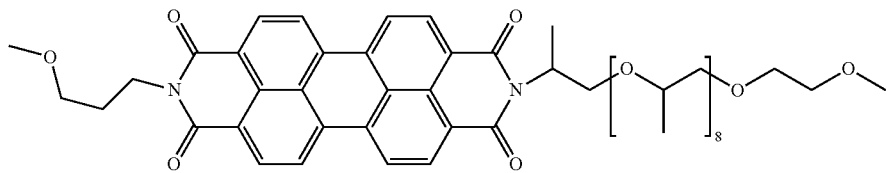
(Ia3)

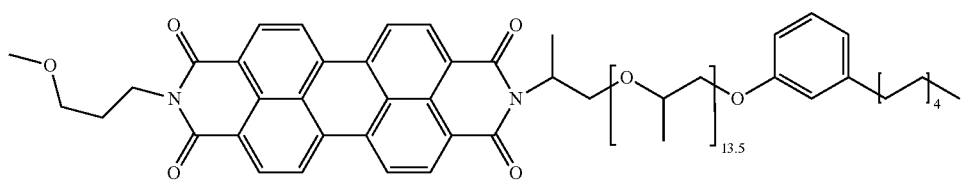
(Ia4)

-continued
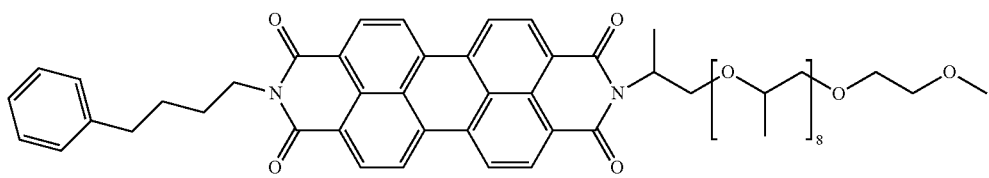
(Ia5)
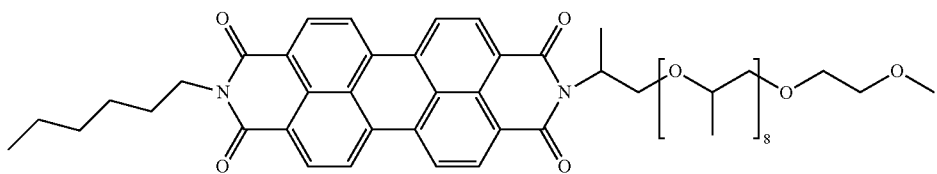
(Ia6)
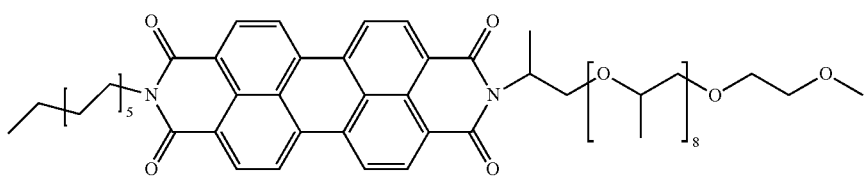
(Ia7)
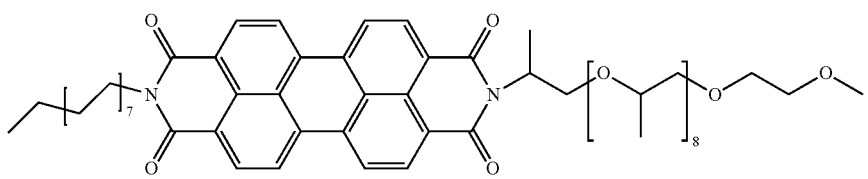
(Ia8)
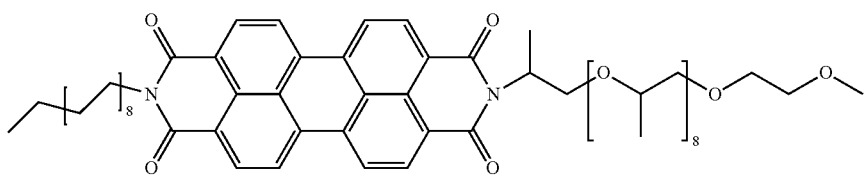
(Ia9)
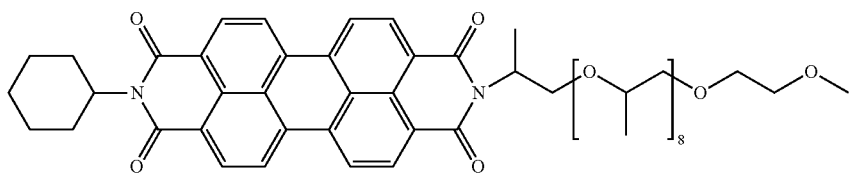
(Ia10)
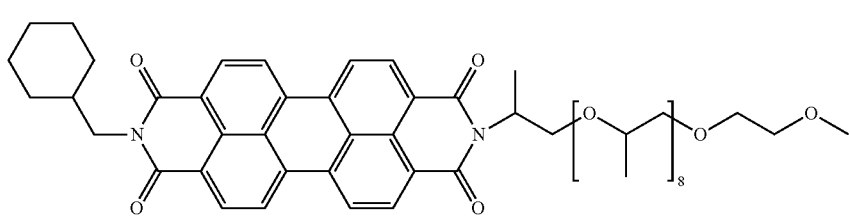
(Ia11)
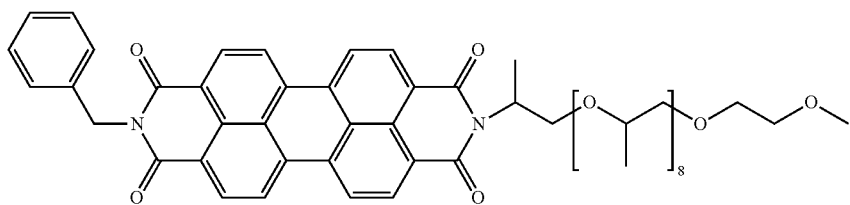
(Ia12)

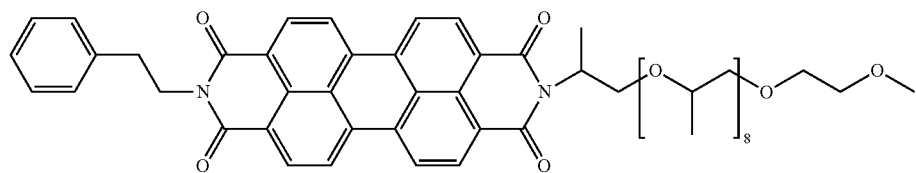
(Ia13)
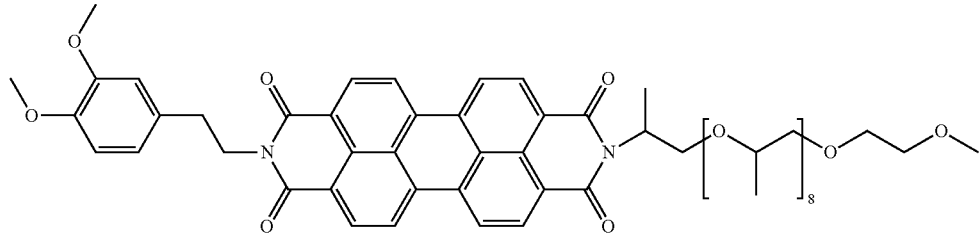
(Ia14)
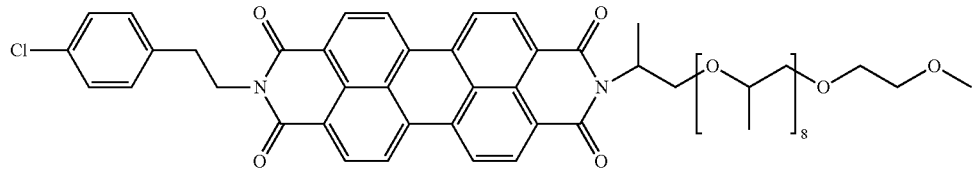
(Ia15)
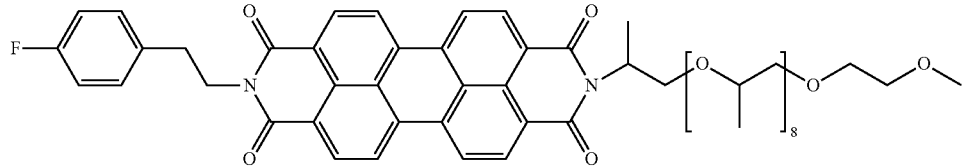
(Ia16)
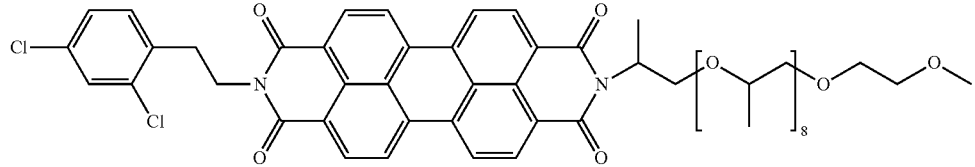
(Ia17)
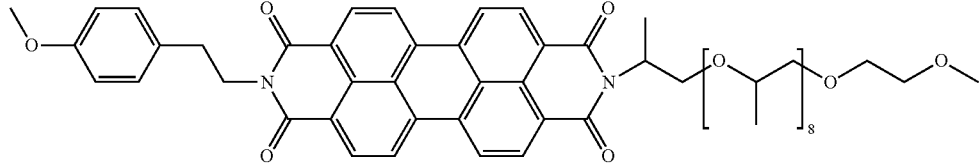
(Ia18)
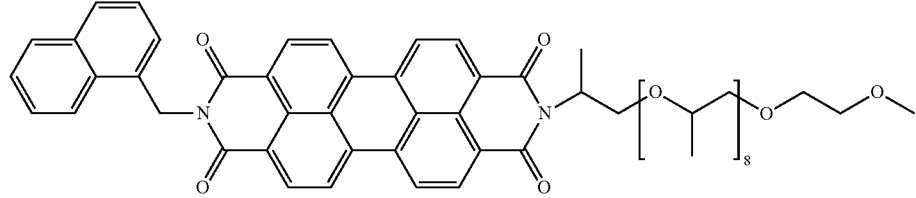
(Ia19)
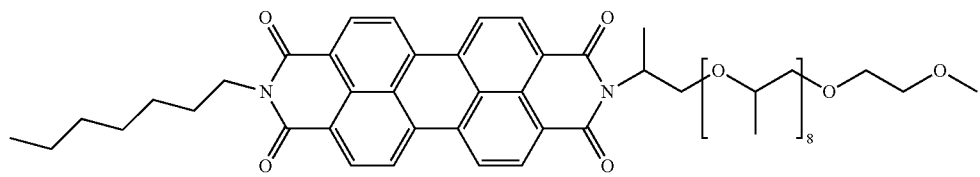
(Ia20)

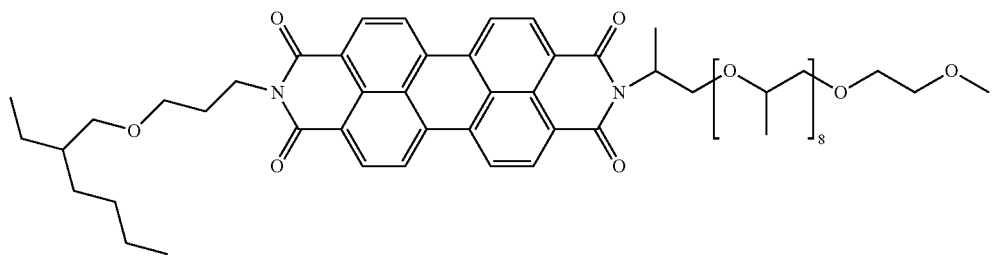
(Ia21)
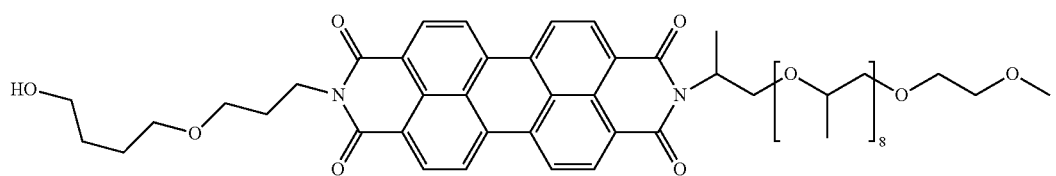
(Ia22)
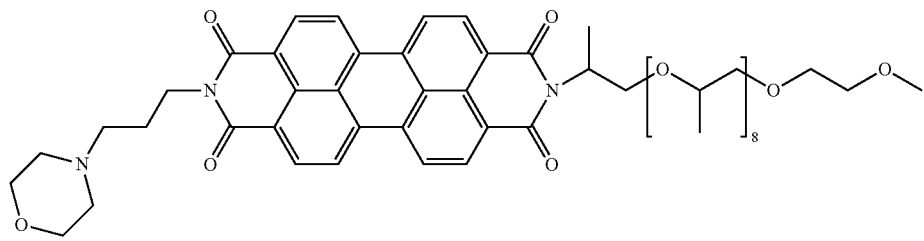
(Ia23)
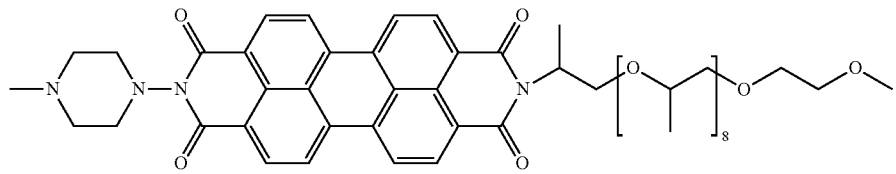
(Ia24)
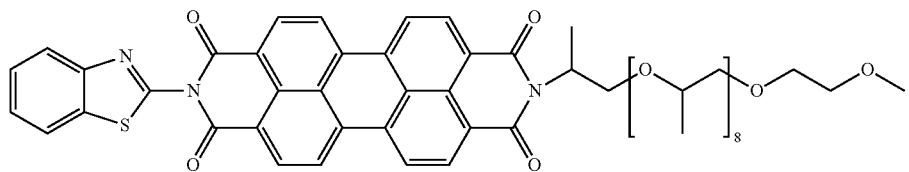
(Ia25)
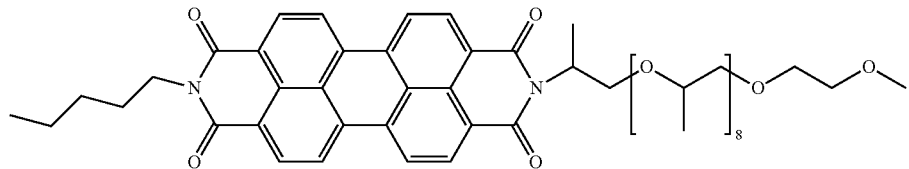
(Ia26)
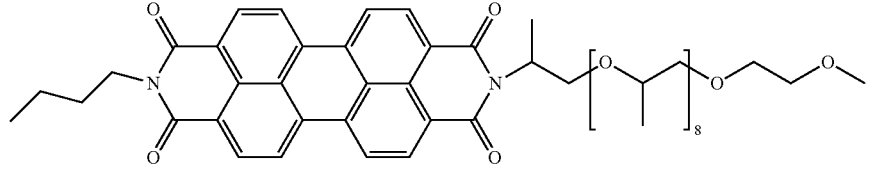
(Ia27)
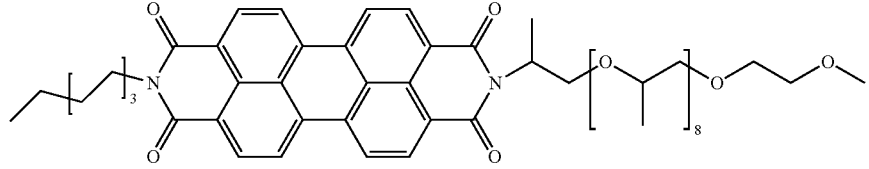
(Ia28)

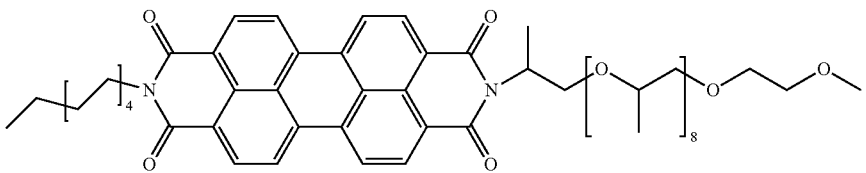
(Ia29)

Further preferred dyes of formula (I) according to the present invention conform to formula (Ib)

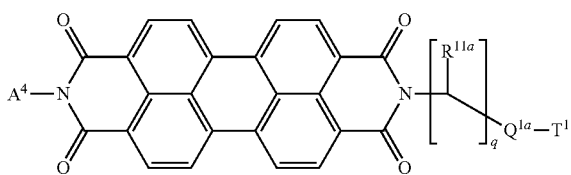
(Ib)

where $A^4$ represents a group Ar as defined above;

$T^1$ represents hydrogen, $(C_1$-$C_{35})$alkyl, aryl, aryloxy, hydroxyl, $(C_1$-$C_{35})$-alkoxy or $(C_1$-$C_{35})$-alkyl-aryloxy; and $Q^{1a}$, $R^{11a}$ and q are each as defined above.

In particularly preferred compounds of formula (Ib), $T^1$ represents $(C_1$-$C_{35})$-alkoxy, hydroxyl, $(C_1$-$C_{35})$-alkyl or $(C_1$-$C_{35})$-alkyl-aryloxy;

$R^{11a}$ represents hydrogen or $(C_1$-$C_{15})$alkyl;

q represents 1, 2 or 3;

$Q^{1a}$ represents a group of formula (7) where r represents a rational number from 8 to 100 and has identical or different meanings within a molecule of formula (Ib);

$R^{15}$ and $R^{16}$ each independently represent hydrogen or $(C_1$-$C_{35})$-alkyl and where $R^{15}$ and $R^{16}$ have Identical or different meanings within a molecule of formula (Ib); and where when $R^{15}$ and $R^{16}$ have different meanings within a molecule of formula (Ib), these different meanings are randomly distributed or regions of respectively identical meanings follow each other;

$A^4$ represents a group $A^{4a}$ where $A^{4a}$ represents a formula (1a) or (2a)

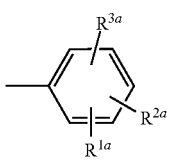
(1a)

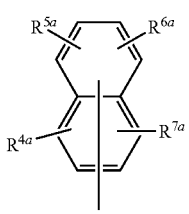
(2a)

where $R^{1a}$ to $R^{3a}$ each independently represent hydrogen; $(C_1$-$C_{35})$-alkyl; $(C_2$-$C_{35})$-alkyl interrupted by one or more hetero atoms, vinylsulfonyl, hydroxyethylsulfonyl, trifluoromethyl; cyclo-$(C_5$-$C_6)$-alkyl; aryl; halogen; cyano; nitro; hydroxyl; $(C_1$-$C_{35})$-alkoxy; aryl-$(C_1$-$C_{35})$-alkoxy, aryloxy; $(C_2$-$C_{35})$-acyl; $(C_2$-$C_{35})$-acylamino; $(C_1$-$C_{35})$-alkylsulfonylamino; arylsulfonylamino; arylcarbonylamino; carbamoyl; N-mono-$(C_1$-$C_{35})$-alkyl-carbamoyl; N,N-di-$(C_1$-$C_{35})$-alkyl-carbamoyl; N-monoaryl-carbamoyl; N,N-diaryl-carbamoyl; $(C_1$-$C_{35})$-alkoxycarbonyl; aryloxycarbonyl; aminocarbonylamino; sulfamoyl; N-mono-$(C_1$-$C_{35})$-alkyl-sulfamoyl; N,N-di-$(C_1$-$C_{35})$-alkyl-sulfamoyl;

N-monoaryl-sulfamoyl; N,N-diaryl-sulfamoyl; aminosulfonylamino; $(C_1$-$C_{35})$-alkylthio; arylthio; $(C_1$-$C_{35})$-alkylsulfonyl or arylsulfonyl;

$R^{4a}$ to $R^{7a}$ each independently represent hydrogen, vinylsulfonyl or hydroxyethylsulfonyl; and $R^{1a}$ to $R^{7a}$ each additionally represent a substituent of formula (2a) or (3a)

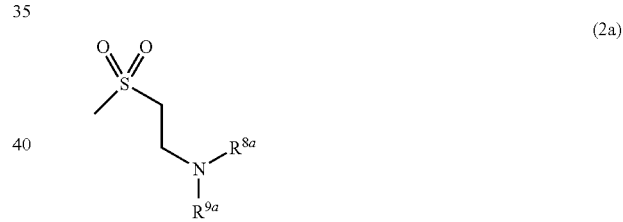
(2a)

(3a)

where $R^{8a}$ to $R^{10a}$ each independently represent $(C_5$-$C_6)$-cycloalkyl; heterocycloalkyl having 5 or 6 ring members; aryl; $(C_1$-$C_{35})$-alkyl; $(C_2$-$C_{35})$-alkyl Interrupted by one or more hetero atoms; $(C_1$-$C_{35})$-alkyl substituted by one or more substituents $G^3$; or $(C_2$-$C_{35})$-alkyl interrupted by one or more hetero atoms and substituted by one or more substituents $G^3$; and $R^{8a}$ and $R^{9a}$ may each also represent hydrogen;

$G^3$ represents trifluoromethyl; cyclo-$(C_5$-$C_6)$-alkyl; aryl; heteroaryl having 5 or 6 ring members; heterocycloalkyl having 5 or 6 ring members; hydroxyl; $(C_1$-$C_{35})$-alkoxy; aryloxy; $(C_2$-$C_{35})$-acyl or arylcarbonyl; and aryl represents a group of formula (9b) or a group of formula (10c)

(10c)

In very particularly preferred compounds of formula (Ib),
$T^1$ represents $(C_1-C_{15})$-alkoxy, particularly methoxy; or $(C_1-C_{10})$-alkyl-phenoxy;
$R^{11a}$ represents hydrogen or $(C_1-C_4)$alkyl, particularly methyl;
q represents 2;
$Q^{1a}$ represents a group of formula (7) where r is a rational number from 8 to 35 and has identical or different meanings within a molecule of formula (Ib);
$R^{15}$ and $R^{16}$ each independently represent hydrogen or $(C_1-C_4)$-alkyl, particularly methyl;
where $R^{15}$ and $R^{16}$ have respectively identical or different meanings within a molecule of the formula (Ib); and where when $R^{15}$ and $R^{16}$ have different meanings within a molecule of formula (Ib), regions of respectively identical meanings follow each other; and
$A^4$ represents naphthyl; vinylsulfonyl- or hydroxyethylsulfonyl-substituted naphthyl; or a group of formula (12)

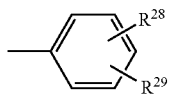
(12)

where
$R^{28}$ and $R^{29}$ each independently represent hydrogen; $(C_1-C_{15})$-alkyl, for example methyl; trifluoromethyl; fluorine, acetylamino; vinylsulfonyl; hydroxyethylsulfonyl; aminosulfonyl; phenyl; chlorophenyl; phenoxy; chlorophenoxy; or a group of formula (13)

(13)

where
$R^{30}$ represents hydrogen; $(C_1-C_6)$-alkyl, for example butyl or hexyl; or $(C_1-C_4)$-alkoxy-$(C_1-C_4)$-alkyl, for example methoxyethyl; and
$R^{31}$ represents $(C_1-C_{18})$-alkyl, for example butyl, hexyl or octadecyl; $(C_1-C_8)$-alkoxy-$(C_1-C_4)$-alkyl, for example methoxyethyl; or hydroxy-$(C_1-C_4)$-alkoxy-$(C_1-C_4)$alkyl, for example hydroxybutoxypropyl.

Compounds of formula (Ib) conform for example to formula (Iba)

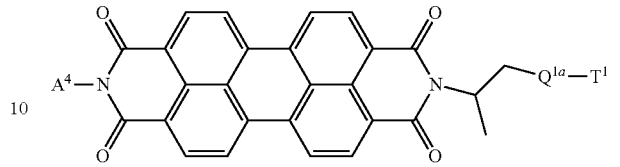
(Iba)

where
$T^1$ represents $(C_1-C_{15})$-alkoxy, particularly methoxy; or $(C_1-C_{10})$-alkyl-phenoxy;
$Q^{1a}$ represents a group of formula (7) where r is a rational number from 8 to 35 and has identical or different meanings within a molecule of formula (Iba);
$R^{15}$ and $R^{16}$ each independently represent hydrogen or $(C_1-C_4)$-alkyl, particularly methyl;
where $R^{15}$ and $R^{16}$ have respectively identical or different meanings within a molecule of the formula (Iba); and where when $R^{15}$ and $R^{16}$ have different meanings within a molecule of formula (Iba), regions of respectively identical meanings follow each other; and
$A^4$ represents naphthyl; vinylsulfonyl- or hydroxyethylsulfonyl-substituted naphthyl; or a group of formula (12)

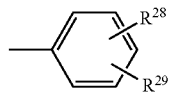
(12)

where
$R^{28}$ and $R^{29}$ each independently represent hydrogen; $(C_1-C_{15})$-alkyl, for example methyl; trifluoromethyl; fluorine, acetylamino; vinylsulfonyl; hydroxyethylsulfonyl; aminosulfonyl; phenyl; chlorophenyl; phenoxy; chlorophenoxy; or a group of formula (13)

(13)

where
$R^{30}$ represents hydrogen; $(C_1-C_6)$-alkyl, for example butyl or hexyl; or $(C_1-C_4)$-alkoxy-$(C_1-C_4)$-alkyl, for example methoxyethyl; and
$R^{31}$ represents $(C_1-C_{18})$-alkyl, for example butyl, hexyl or octadecyl; $(C_1-C_8)$-alkoxy-$(C_1-C_4)$-alkyl, for example methoxyethyl; or hydroxy-$(C_1-C_4)$-alkoxy-$(C_1-C_4)$alkyl, for example hydroxybutoxypropyl.

Examples of compounds of formula (Ib) are the compounds of formulae (Ib1) to (Ib28)

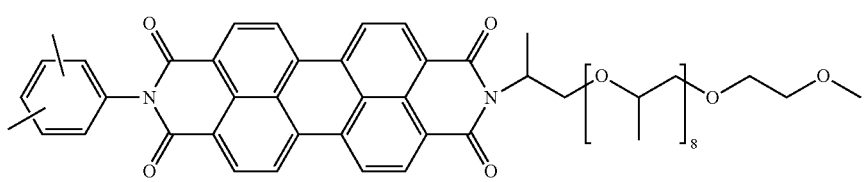
(Ib1)

-continued
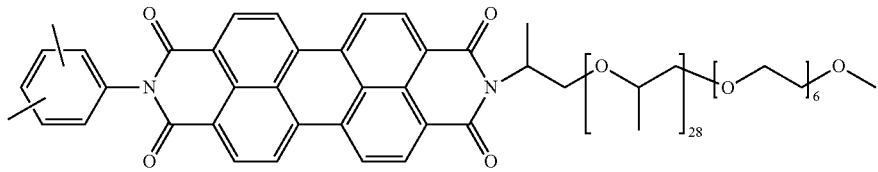
(Ib2)
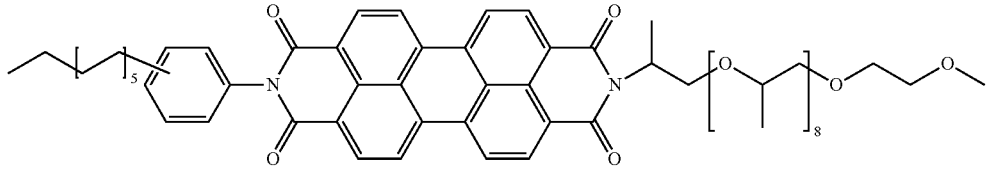
(Ib3)
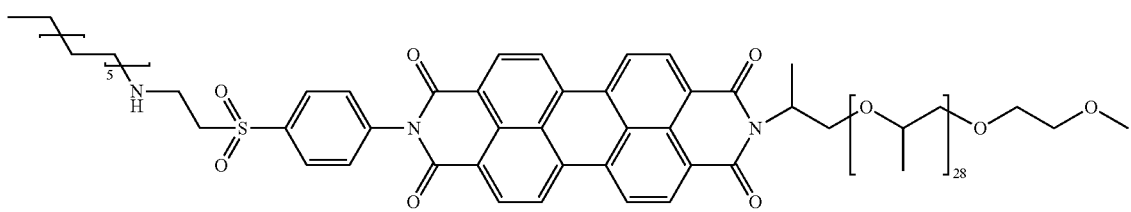
(Ib4)
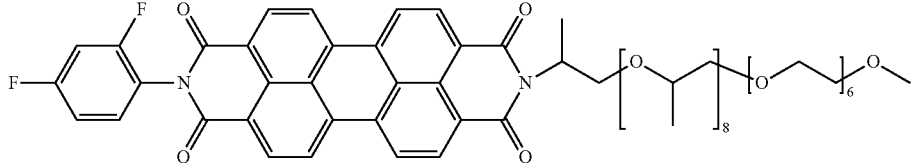
(Ib5)
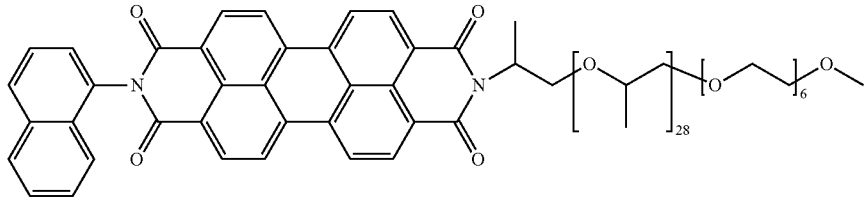
(Ib6)
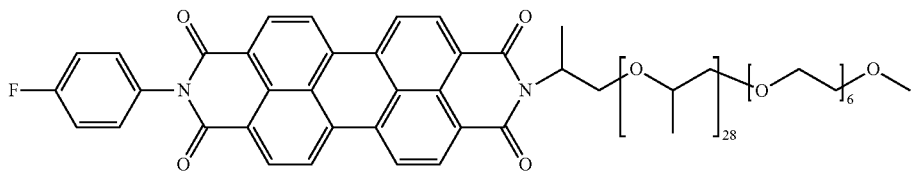
(Ib7)
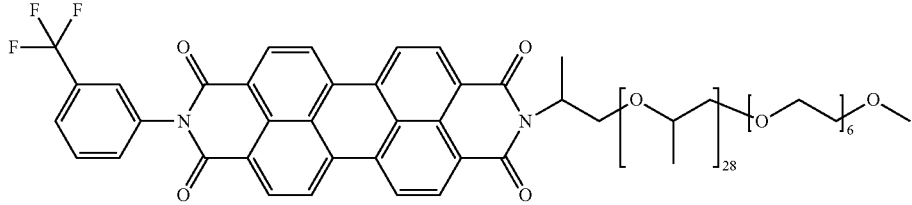
(Ib8)
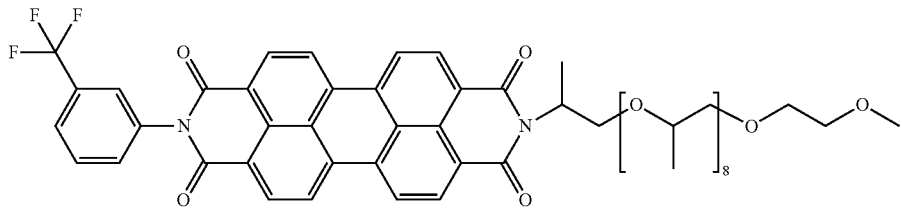
(Ib9)

-continued
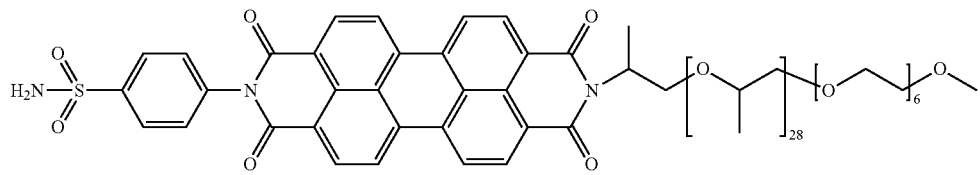
(Ib10)
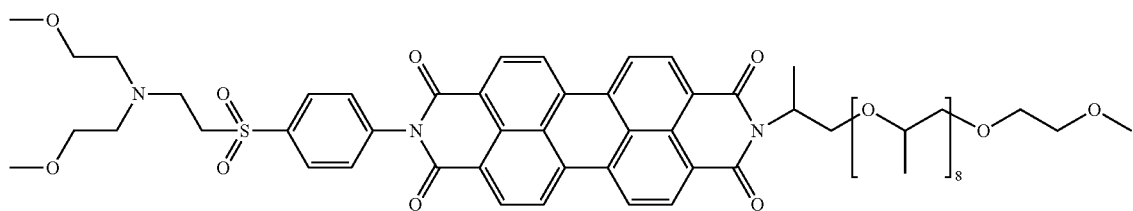
(Ib11)
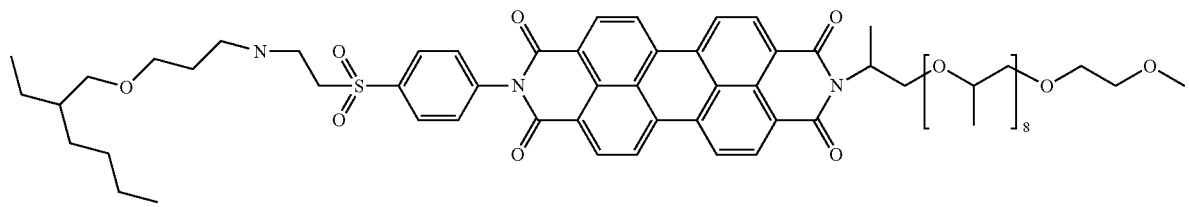
(Ib12)
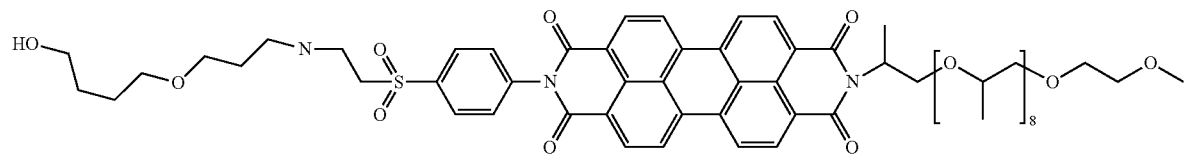
(Ib13)
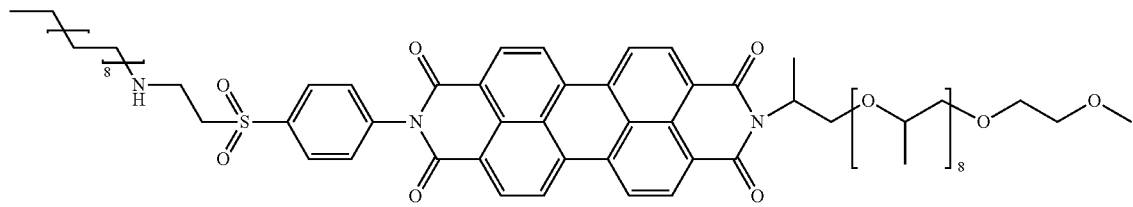
(Ib14)
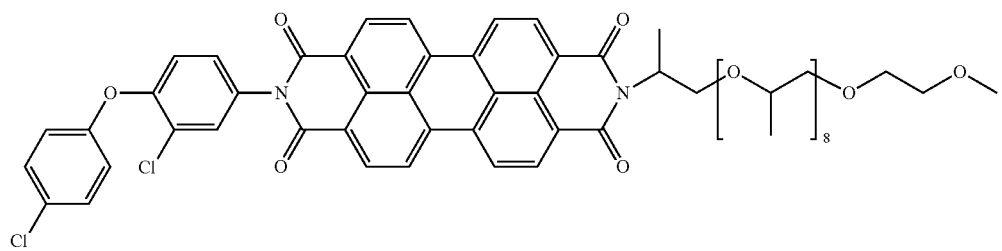
(Ib15)
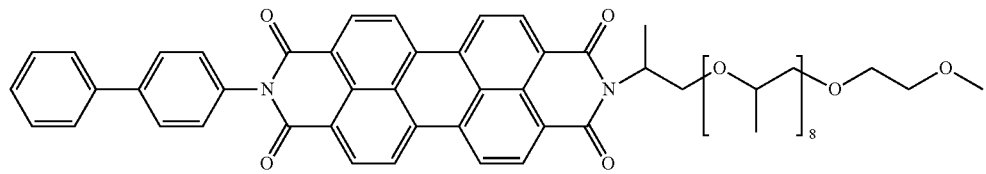
(Ib16)

-continued
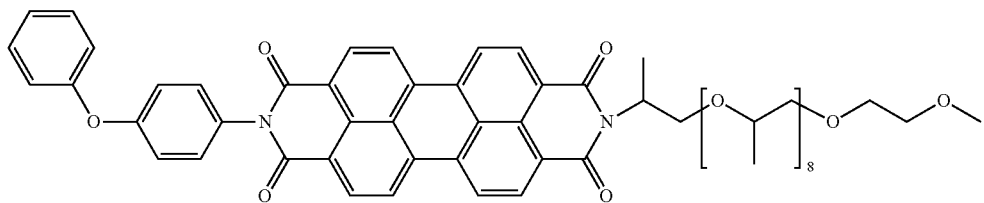
(Ib17)
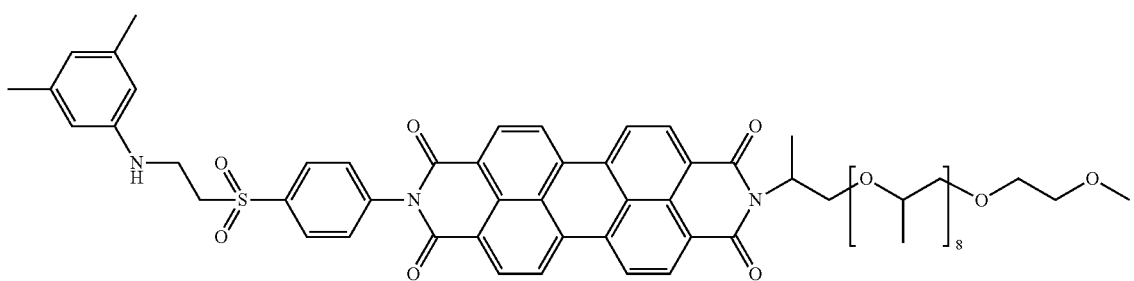
(Ib18)
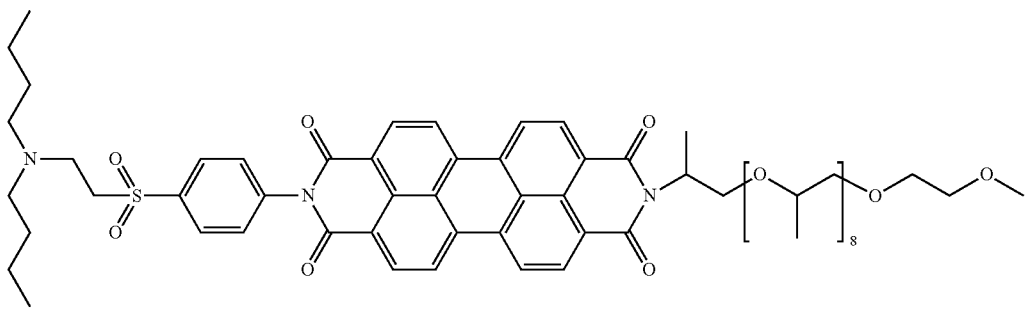
(Ib19)
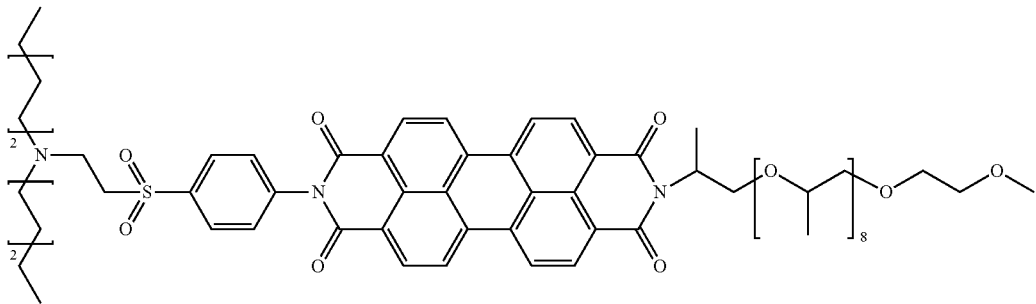
(Ib20)
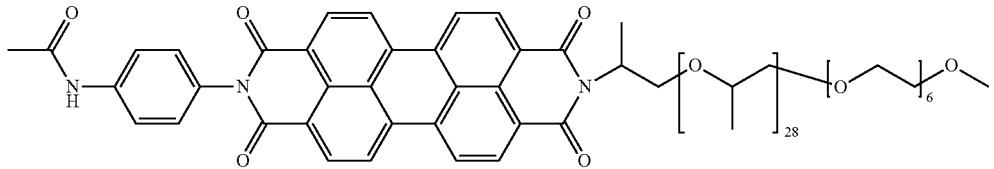
(Ib21)

-continued
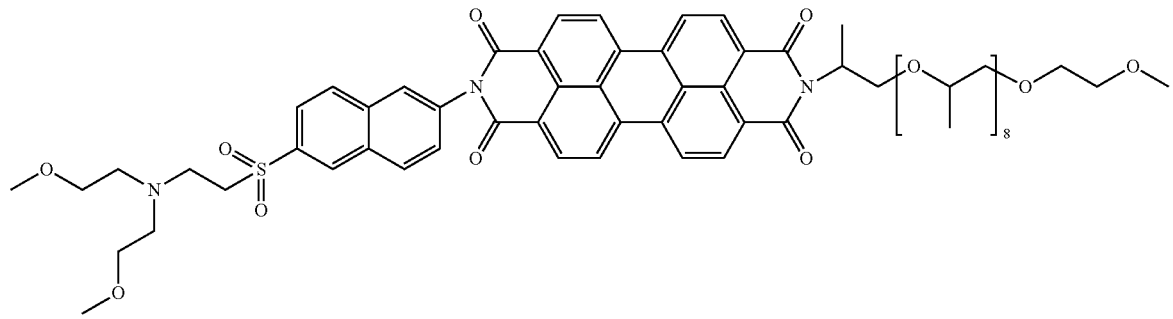
(Ib22)
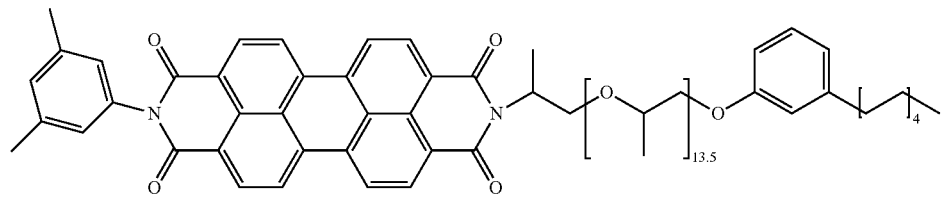
(Ib23)
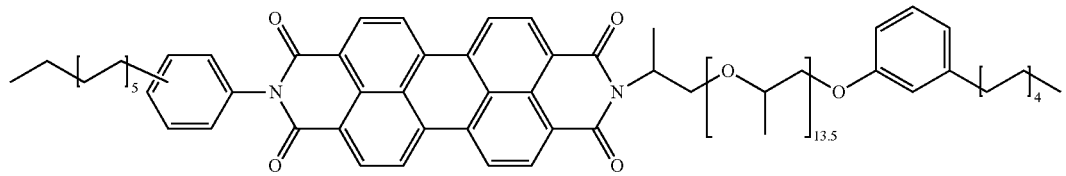
(Ib24)
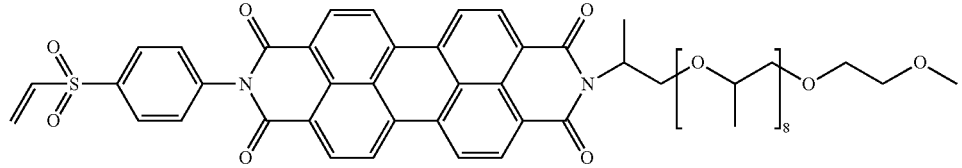
(Ib25)
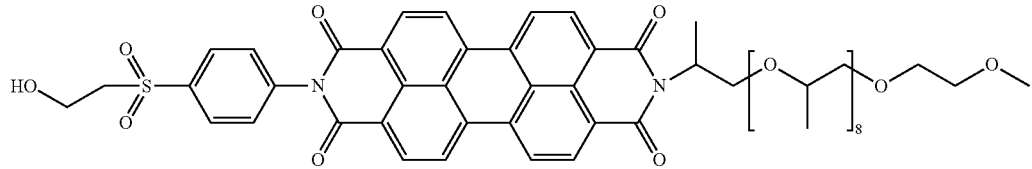
(Ib26)
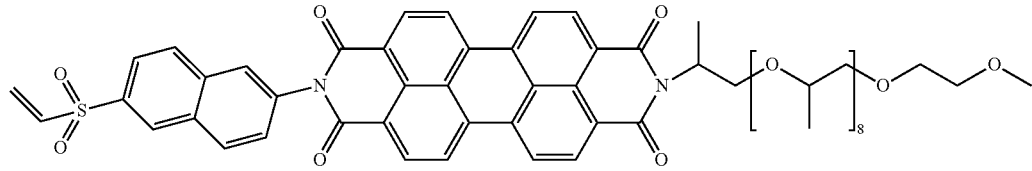
(Ib27)
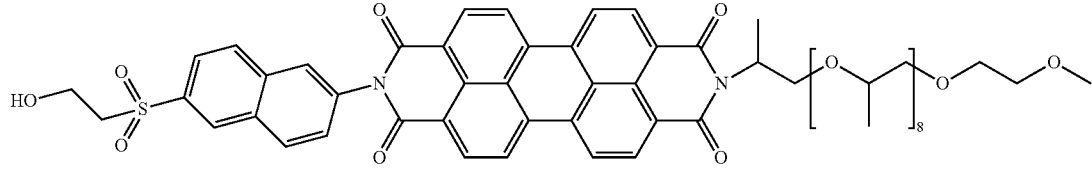
(Ib28)

Further preferred dyes of formula (1) according to the present invention conform to formula (Ic)

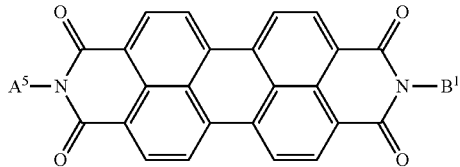

where
B$^1$ represents a group of formula (4a)

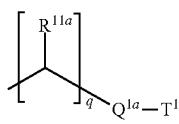

and
A$^5$ represents a group of formula (4b)

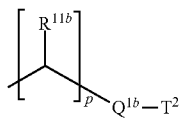

where
R$^{11a}$ and R$^{11b}$ each independently have one of the meanings of R$^{11}$;
p and q each independently represent a number from 1 to 10;
Q$^{1a}$ and Q$^{1b}$ each independently have one of the meanings of Q$^1$; and
T$^1$ and T$^2$ each independently represent hydrogen, (C$_1$-C$_{35}$)alkyl, aryl, aryloxy, hydroxyl, (C$_1$-C$_{35}$)-alkoxy or (C$_1$-C$_{35}$)-alkyl-aryloxy.

In particularly preferred compounds of formula (Ic),
T$^1$ and T$^2$ each independently represent (C$_1$-C$_{35}$)-alkoxy, hydroxyl, (C$_1$-C$_{35}$)-alkyl or (C$_1$-C$_{35}$)-alkyl-aryloxy;
R$^{11a}$ and R$^{11b}$ each independently represent hydrogen or (C$_1$-C$_{15}$)-alkyl;
q and p each independently represent 1, 2 or 3; and
Q$^{1a}$ and Q$^{1b}$ each independently represent a group of formula (7) where r is a rational number from 8 to 100 in the case of Q$^{1a}$ and from 1 to 100 in the case of Q$^{1b}$ and has respectively identical or different meanings within a molecule of formula (Ic);

R$^{15}$ and R$^{16}$ each independently represent hydrogen or (C$_1$-C$_{35}$)-alkyl and where R$^{15}$ and R$^{16}$ have identical or different meanings within a molecule of formula (Ic); and
where when R$^{15}$ and R$^{16}$ have different meanings within a molecule of formula (Ic), these different meanings are randomly distributed or regions of respectively identical meanings follow each other.

In very particularly preferred compounds of formula (Ic),
T$^1$ and T$^2$ each independently represent (C$_1$-C$_{15}$)-alkoxy, particularly methoxy; or
(C$_1$-C$_{10}$)-alkyl-phenoxy;
R$^{11a}$ and R$^{11b}$ each independently represent hydrogen or (C$_1$-C$_4$)alkyl, particularly methyl;
q and p each represent 2;
Q$^{1a}$ and Q$^{1b}$ each independently represent a group of formula (7) where r is a rational number from 8 to 40 in the case of Q$^{1a}$ and from 1 to 10 in the case of Q$^{1b}$ and has identical or different meanings within a molecule of formula (Ic) in each case;
R$^{15}$ and R$^{16}$ each independently represent hydrogen or (C$_1$-C$_4$)-alkyl, particularly methyl;
where R$^{15}$ and R$^{16}$ have respectively identical or different meanings within a molecule of formula (Ic); and where when R$^{15}$ and R$^{16}$ have different meanings within a molecule of formula (Ic), regions of respectively identical meanings follow each other.

Compounds of formula (Ic) conform for example to formula (Ica)

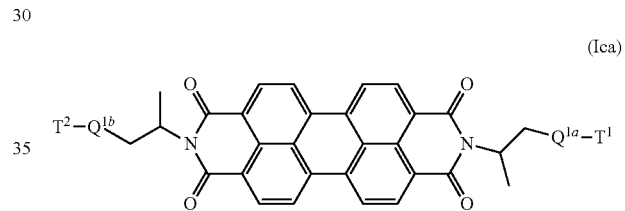

where
T$^1$ and T$^2$ each independently represent (C$_1$-C$_{15}$)-alkoxy, particularly methoxy; or (C$_1$-C$_{10}$)-alkyl-phenoxy;
Q$^{1a}$ and Q$^{1b}$ each independently represent a group of formula (7) where r is a rational number from 8 to 40 in the case of Q$^{1a}$ and from 1 to 10 in the case of Q$^{1b}$ and has identical or different meanings within a molecule of formula (Ica) in each case;
R$^{15}$ and R$^{16}$ each independently represent hydrogen or (C$_1$-C$_4$)-alkyl, particularly methyl;
where R$^{15}$ and R$^{16}$ have respectively identical or different meanings within a molecule of formula (Ica); and where when R$^{15}$ and R$^{16}$ have different meanings within a molecule of formula (Ica), regions of respectively identical meanings follow each other.

Compounds of formula (Icb)

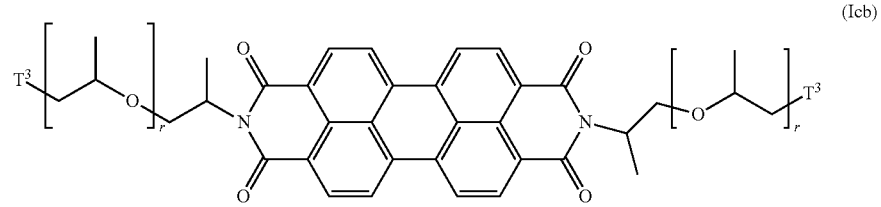

where r represents a rational number from 1 to 200 and is as defined above and $T^3$ represents hydroxyl or $(C_1-C_4)$-alkoxy, are preferably excluded from the scope of formula (1).
Examples of compounds of formula (Ic) are the compounds of formulae (Ic1) to (Ic7)
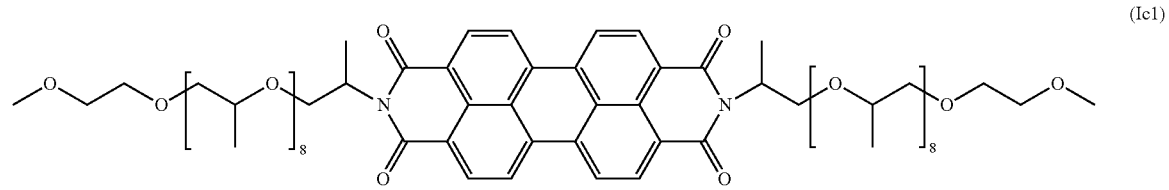
(Ic1)
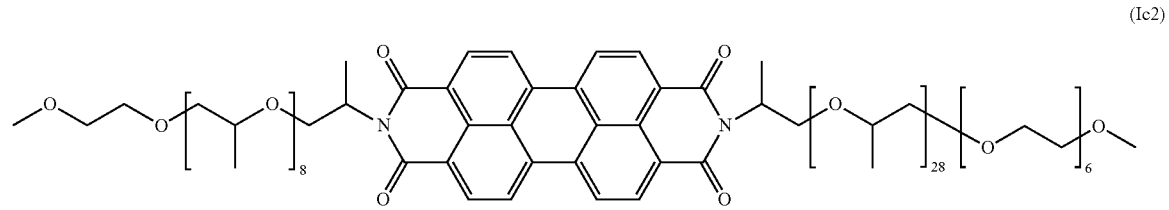
(Ic2)
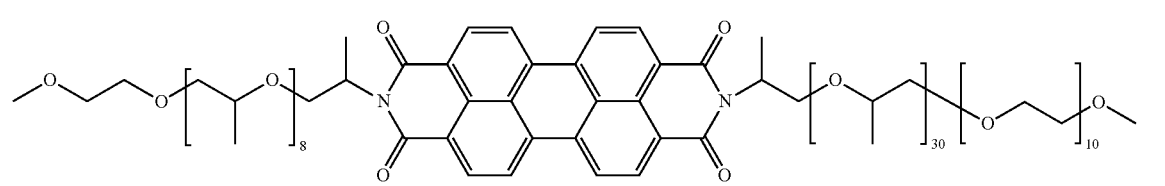
(Ic3)
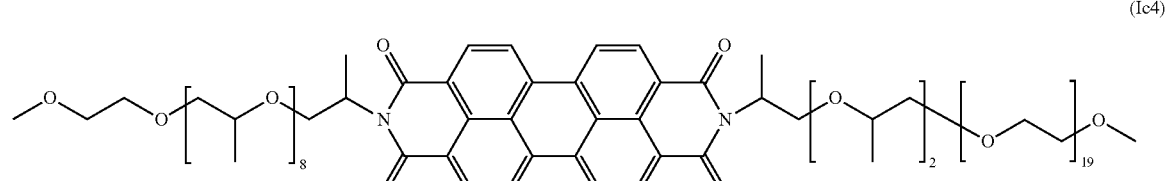
(Ic4)
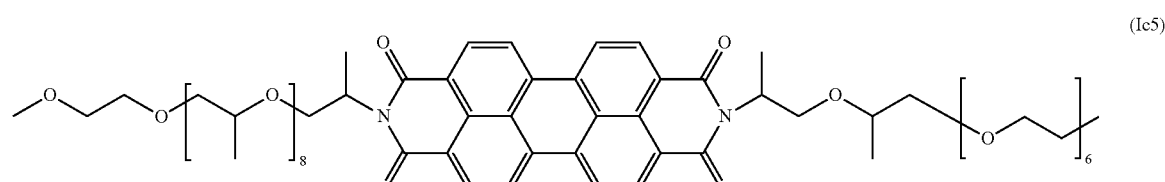
(Ic5)
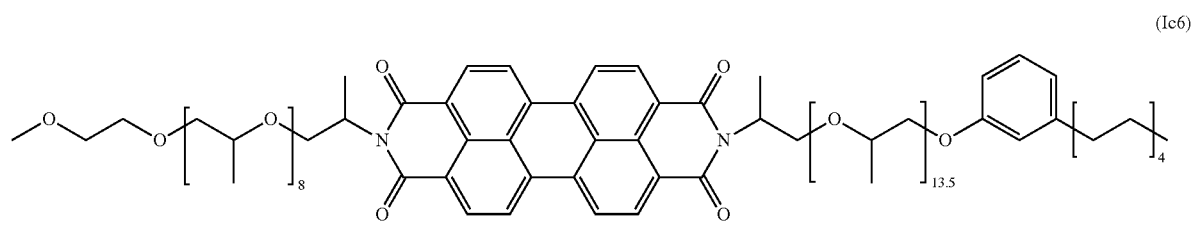
(Ic6)
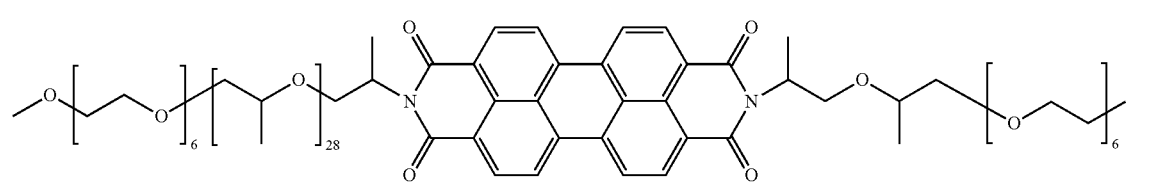
(Ic7)

Further preferred dyes of formula (I) according to the present invention conform to formula (Id)

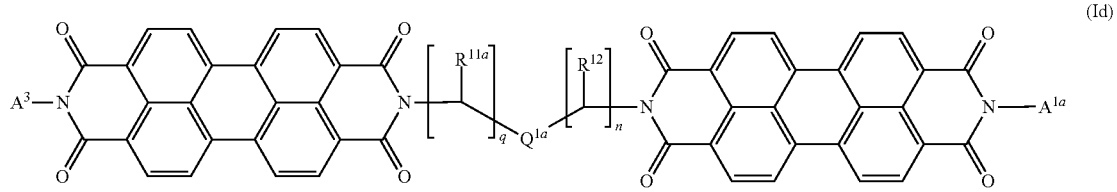

(Id)

where
$R^{11a}$ and $R^{12}$ each independently have one of the meanings of $R^{11}$;
q represents a number from 1 to 10;
n represents a number from 0 to 10;
$A^{1a}$ has one of the meanings of $A^3$, independently of $A^3$; and
$A^3$ and $Q^{1a}$ are each as defined above.
In the compounds of formula (Id), $A^{1a}$ and $A^3$ are identical or different, preferably identical.
In particularly preferred compounds of formula (Id),
$R^{11a}$ and $R^{12}$ each independently represent hydrogen or ($C_1$-$C_{15}$)alkyl;
q represents 1, 2 or 3;
n represents 0, 1, 2, or 3;
$Q^{1a}$ represents a group of formula (7) where r represents a rational number from 1 to 100 and has identical or different meanings within a molecule of formula (Id);
$R^{15}$ and $R^{16}$ each independently represent hydrogen or ($C_1$-$C_{35}$)-alkyl and where $R^{15}$ and $R^{16}$ have identical or different meanings within a molecule of formula (Id); and
where when $R^{15}$ and $R^{16}$ have different meanings within a molecule of formula (Id), these different meanings are randomly distributed or regions of respectively identical meanings follow each other; and
$A^{1a}$ and $A^3$ each independently represent the group $A^{3a}$ where $A^{3a}$ is as defined above.
In very particularly preferred compounds of formula (Id),
q represents 2 or 3;
n represents 0 or 1;
$R^{11a}$ and $R^{12}$ each independently represent hydrogen or methyl;
$Q^{1a}$ represents a group of formula (7) where r represents a rational number from 2 to 68 and has identical or different meanings within a molecule of formula (Id);
$R^{15}$ and $R^{16}$ each independently represent hydrogen or ($C_1$-$C_4$)-alkyl, particularly methyl;
where $R^{15}$ and $R^{16}$ have identical or different meanings within a molecule of formula (Id); and
where when $R^{15}$ and $R^{16}$ have different meanings within a molecule of formula (Id), regions of respectively identical meanings follow each other; and
$A^{1a}$ and $A^3$ each independently represent ($C_{10}$-$C_{20}$)-alkyl; cyclohexyl; N-methylpiperazinyl; benzothiazolyl; or ($C_1$-$C_4$)-alkyl substituted by cyclohexyl, morpholinyl, ($C_1$-$C_4$)-alkoxy, particularly methoxy, hydroxy-($C_1$-$C_4$)-alkoxy, naphthyl or a group of formula (14)

(14)

where
$R^{32}$ and $R^{33}$ each independently represent hydrogen, fluorine, chlorine or ($C_1$-$C_4$)-alkoxy, particularly methoxy.
Examples of compounds of formula (Id) are the compounds of formulae (Id1) to (Id40)

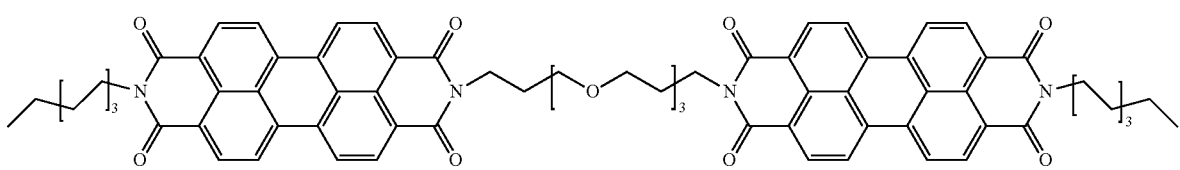

(Id1)

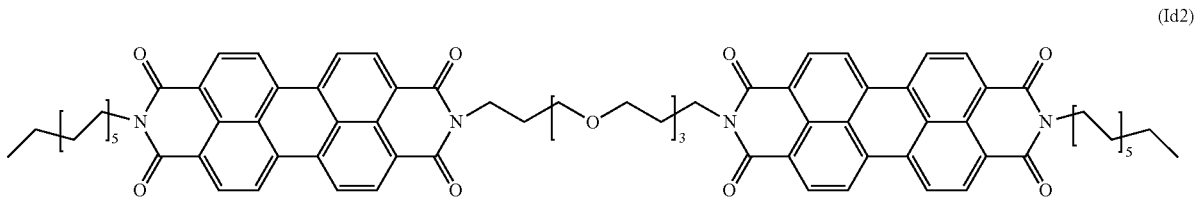

(Id2)

-continued
(Id3)
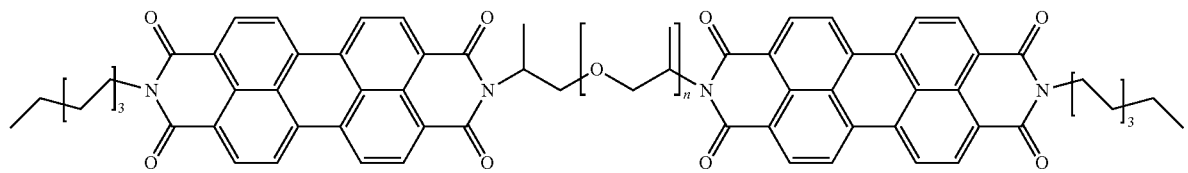
n = ca. 2.5
(Id4)
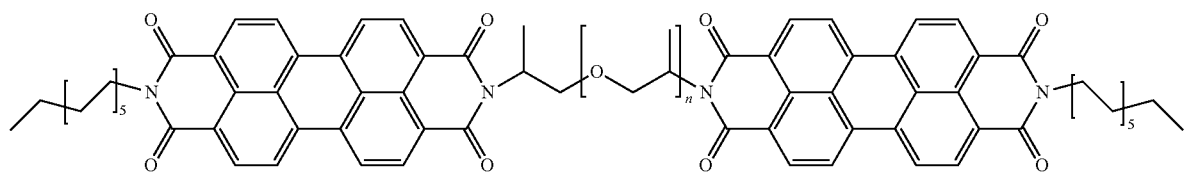
n = ca. 2.5
(Id5)
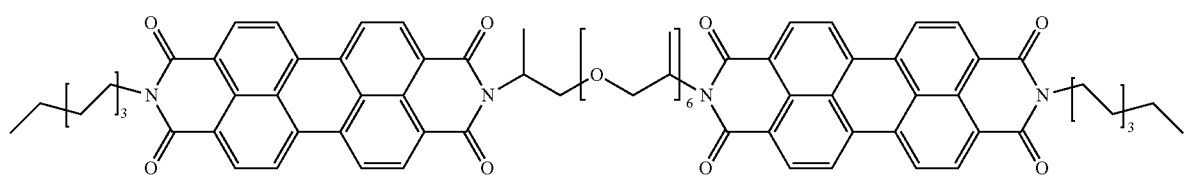
(Id6)
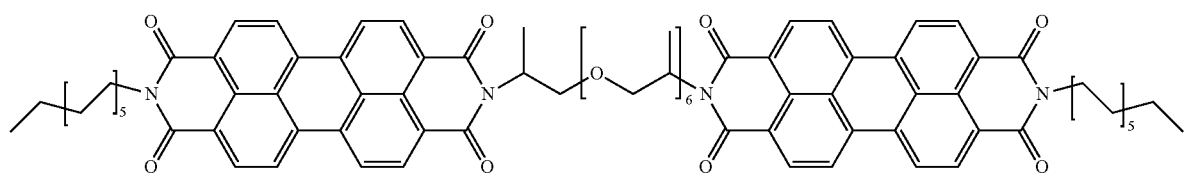
(Id7)
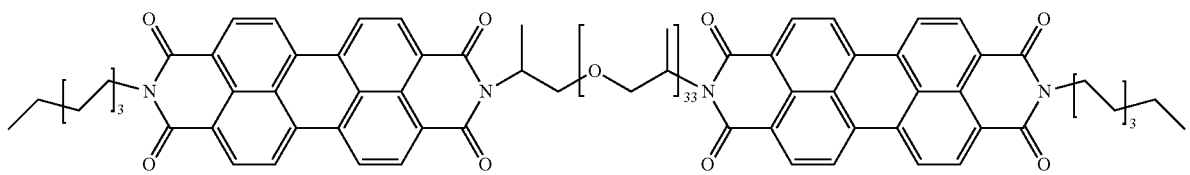
(Id8)
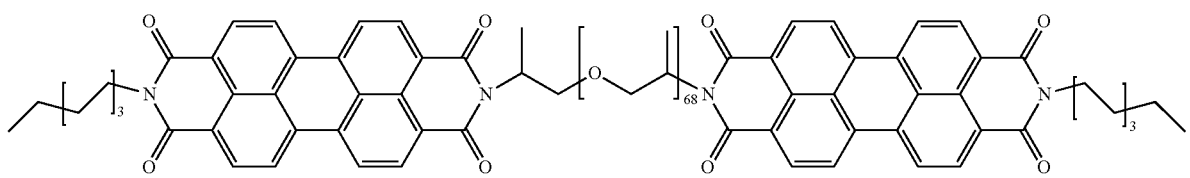
(Id9)
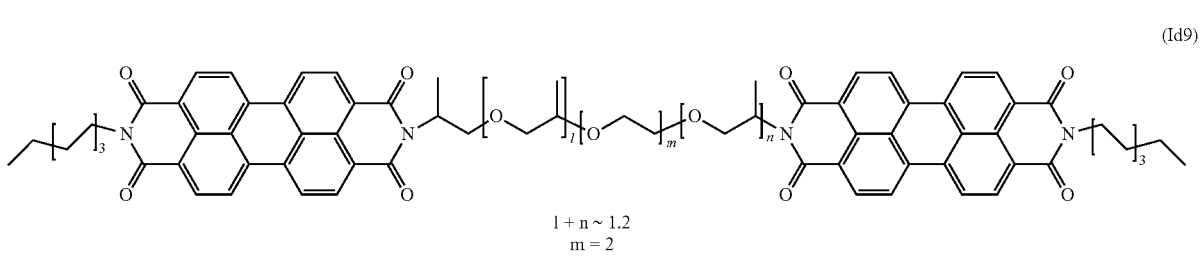
l + n ~ 1.2
m = 2

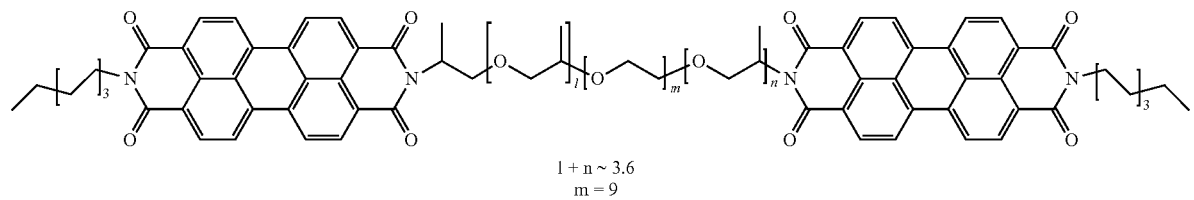
(Id10)
l + n ~ 3.6
m = 9
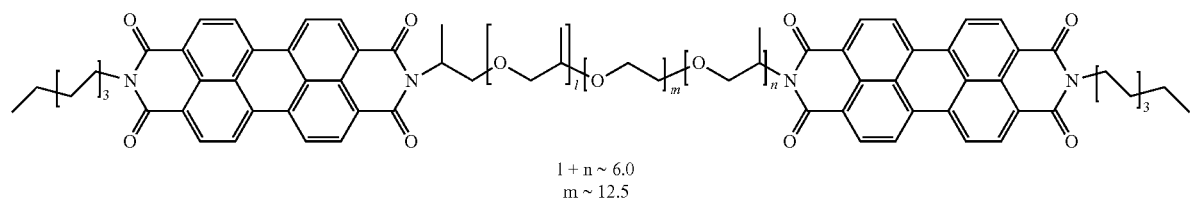
(Id11)
l + n ~ 6.0
m ~ 12.5
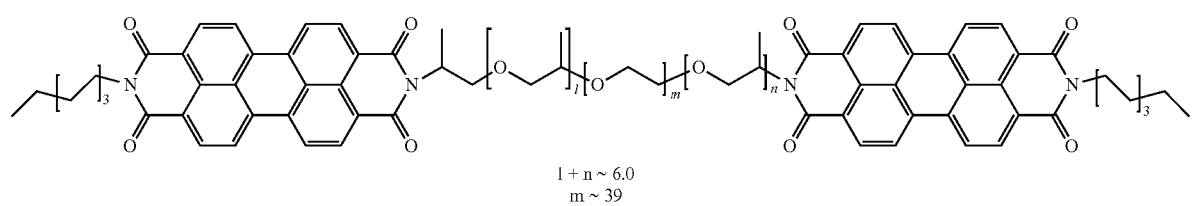
(Id12)
l + n ~ 6.0
m ~ 39
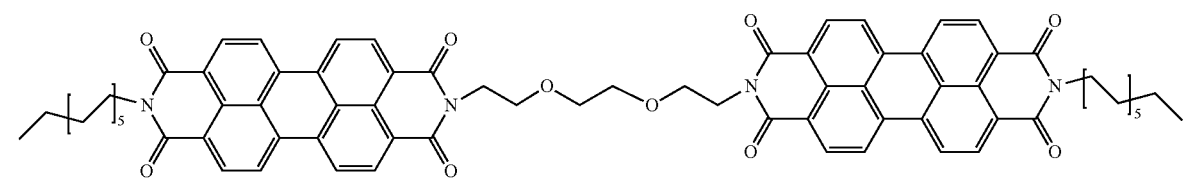
(Id13)
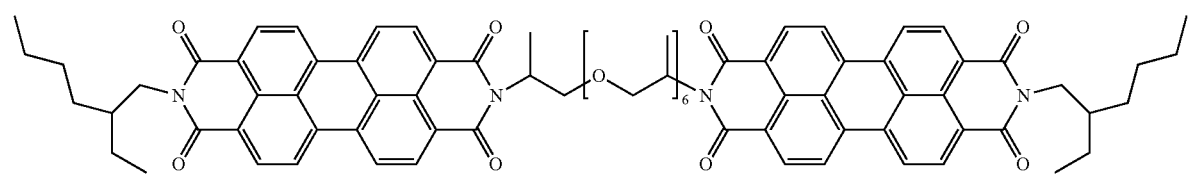
(Id14)
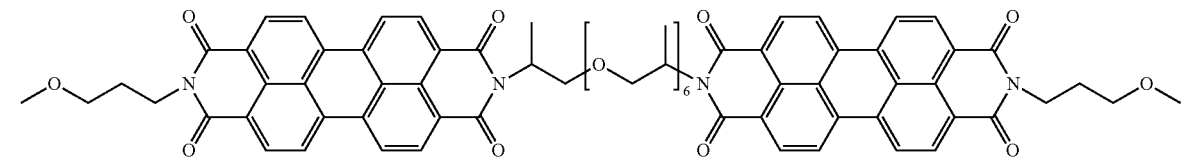
(Id15)
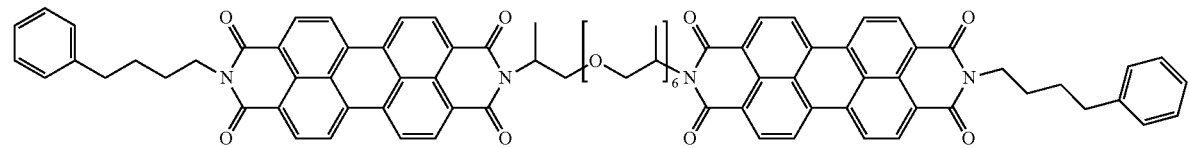
(Id16)

-continued
(Id17)
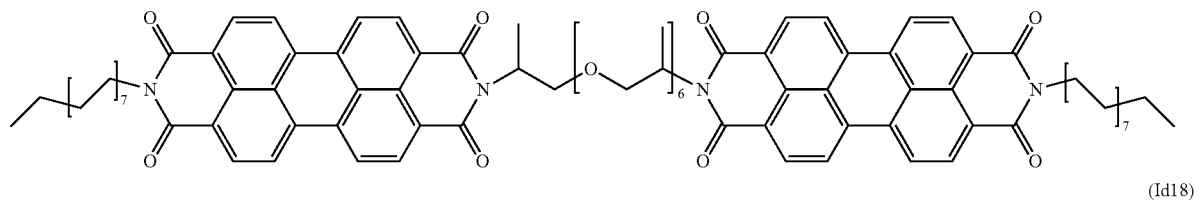
(Id18)
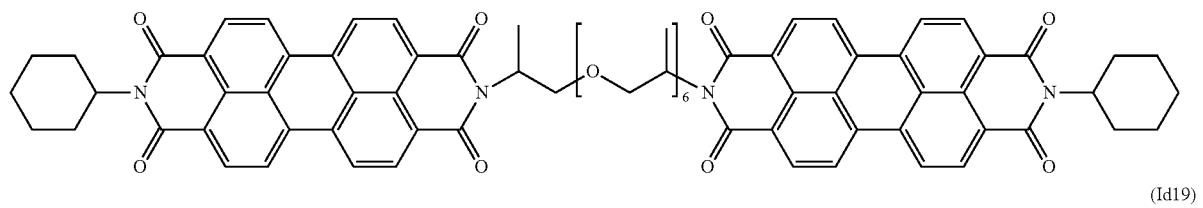
(Id19)
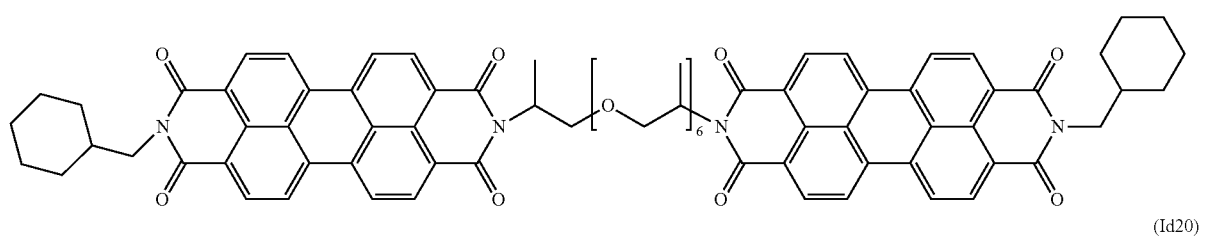
(Id20)
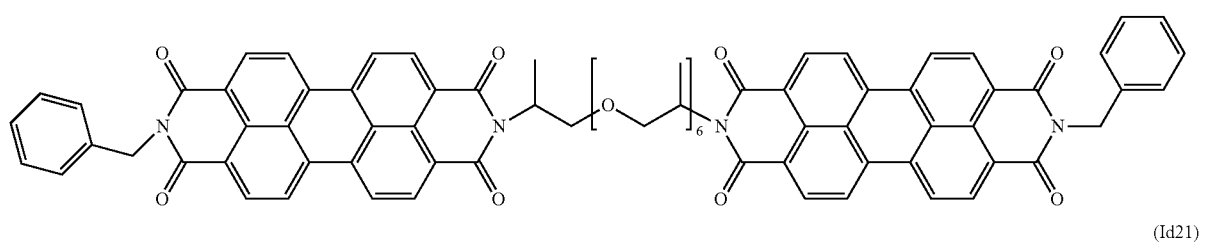
(Id21)
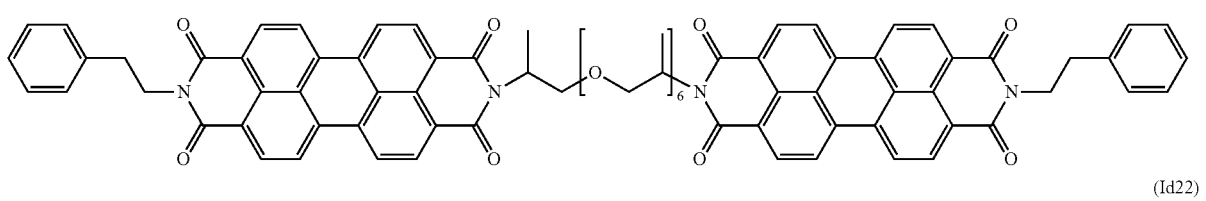
(Id22)
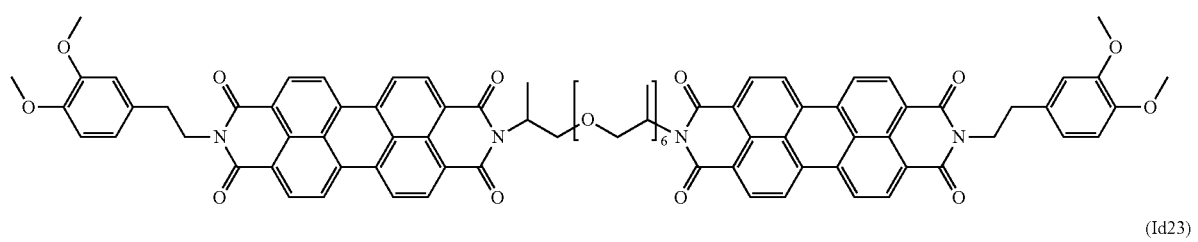
(Id23)
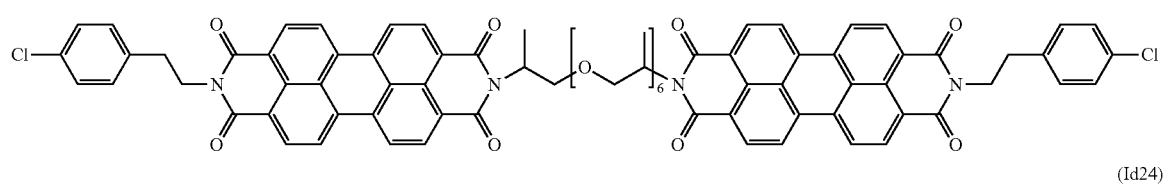
(Id24)
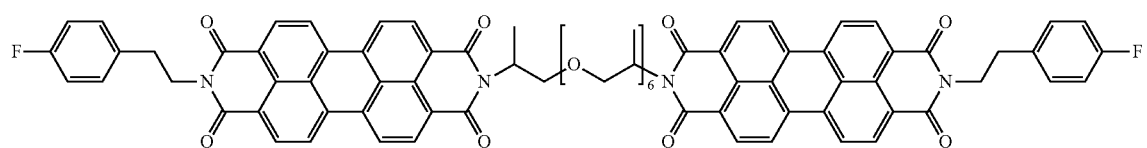

-continued
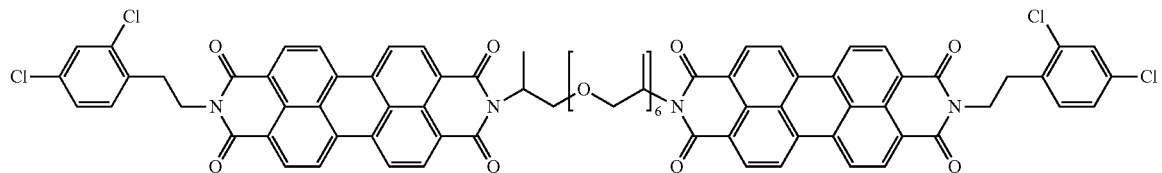
(Id25)
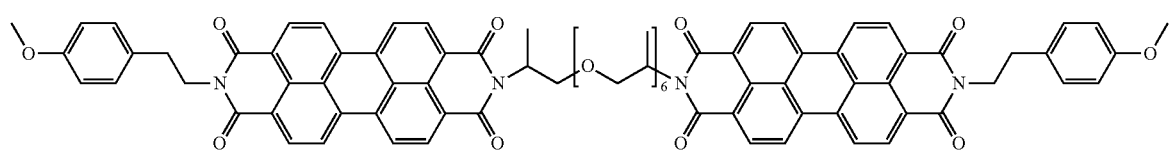
(Id26)
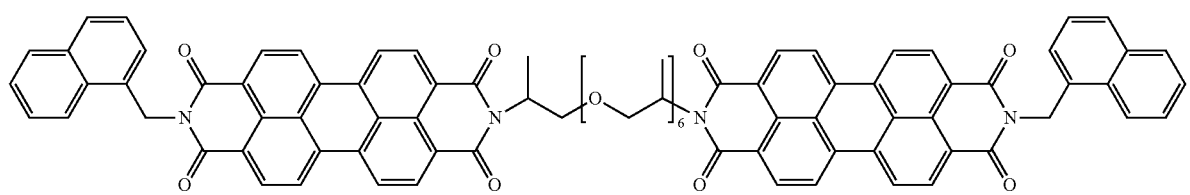
(Id27)
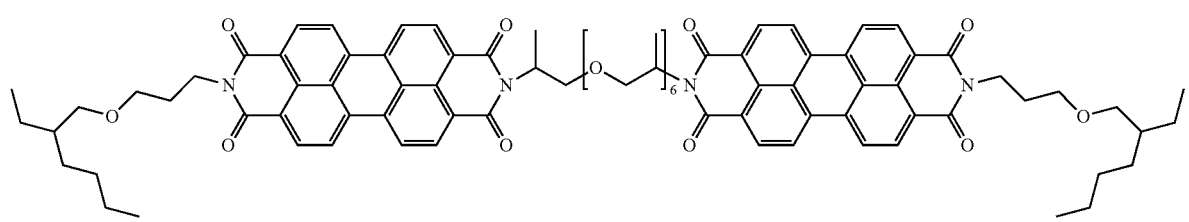
(Id28)
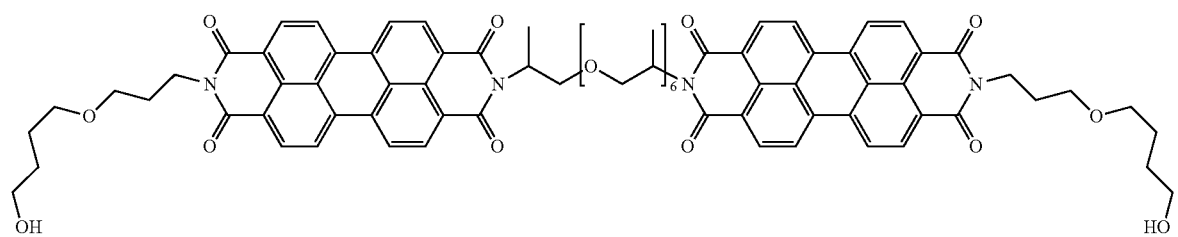
(Id29)
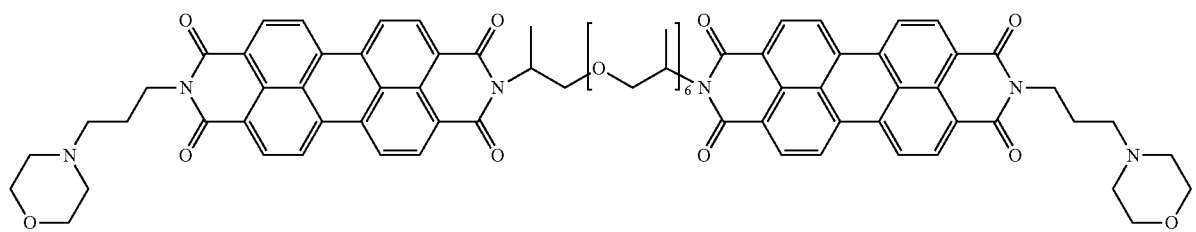
(Id30)
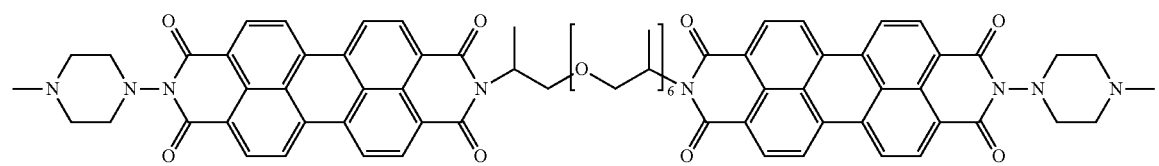
(Id31)

-continued
(Id32)
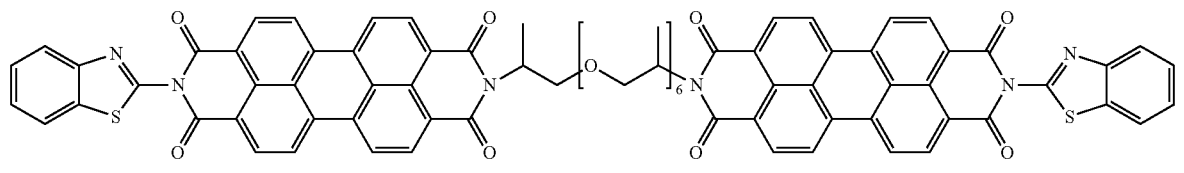
(Id33)
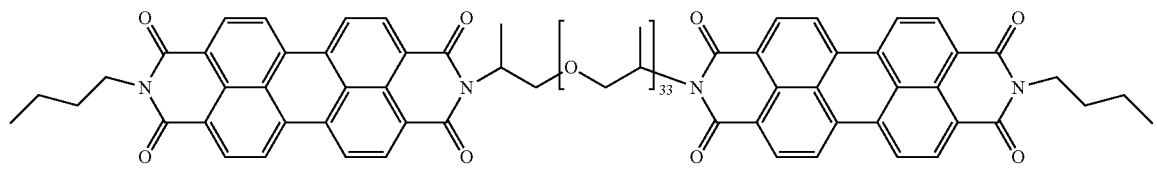
(Id34)
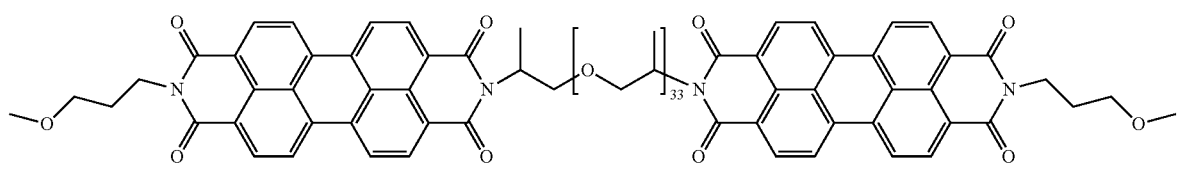
(Id35)
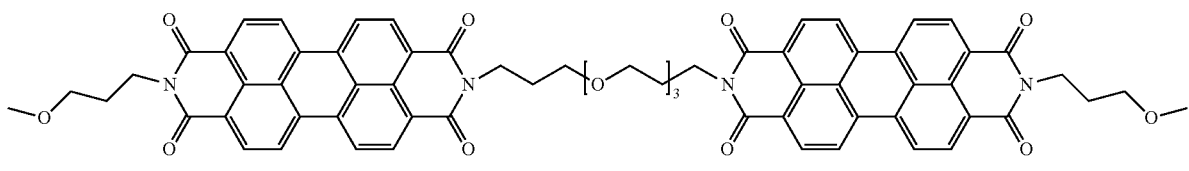
(Id36)
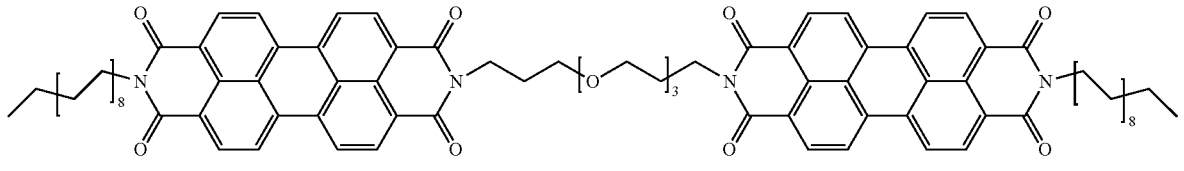
(Id37)
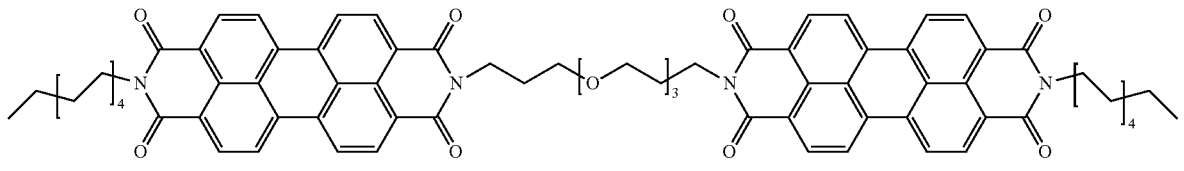
(Id38)
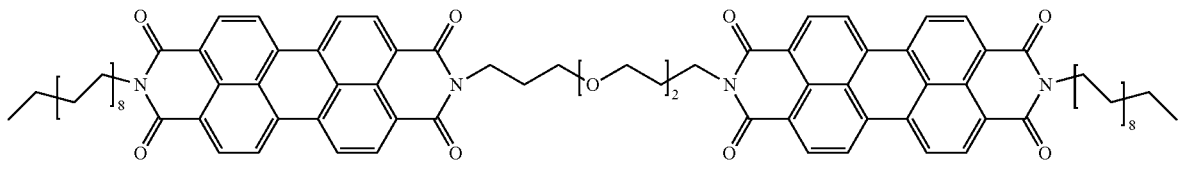
(Id39)
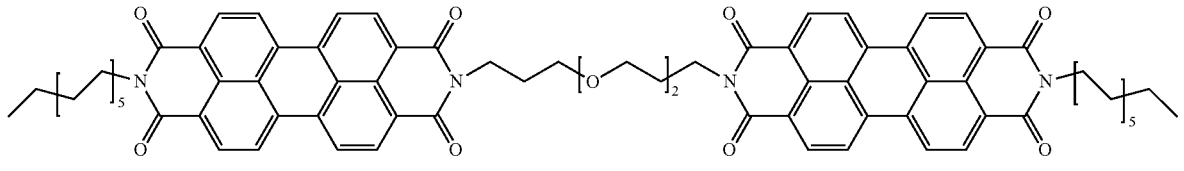

-continued (Id40)

Further preferred dyes of formula (I) according to the present invention conform to formula (Ie)

(Ie)

where
$R^{11a}$ and $R^{12}$ each independently have one of the meanings of $R^{11}$;
q represents a number from 1 to 10;
n represents a number from 0 to 10;
$A^{1b}$ has one of the meanings of $A^4$ independently of $A^4$; and
$A^4$ and $Q^{1a}$ are as defined above.

In the compounds of formula (Ie), $A^{1b}$ and $A^4$ are identical or different, preferably Identical.

In particularly preferred compounds of formula (Ie),
$R^{11a}$ and $R^{12}$ each independently represent hydrogen or $(C_1\text{-}C_{15})$alkyl;
q represents 1, 2 or 3;
n represents 0, 1, 2, or 3;
$Q^{1a}$ represents a group of formula (7) where r represents a rational number from 1 to 100 and has identical or different meanings within a molecule of formula (Ie);
$R^{15}$ and $R^{16}$ each independently represent hydrogen or $(C_1\text{-}C_{35})$-alkyl and where $R^{15}$ and $R^{16}$ have identical or different meanings within a molecule of formula (Id); and
where when $R^{15}$ and $R^{16}$ have different meanings within a molecule of formula (Id), these different meanings are randomly distributed or regions of respectively identical meanings follow each other; and
$A^4$ and $A^{1b}$ each independently represent the group $A^{4a}$ where $A^{4a}$ is as defined above.

In very particularly preferred compounds of formula (Ie),
q represents 2 or 3;
n represents 0 or 1;
$R^{11a}$ and $R^{12}$ each independently represent hydrogen or methyl;
$Q^{1a}$ represents a group of formula (7) where r represents a rational number from 3 to 33 and has identical or different meanings within a molecule of formula (Ie);

$R^{15}$ and $R^{16}$ each independently represent hydrogen or $(C_1\text{-}C_4)$-alkyl, in particular methyl;
where $R^{15}$ and $R^{16}$ have Identical or different meanings within a molecule of formula (Ie); and where when $R^{15}$ and $R^{16}$ have different meanings within a molecule of formula (Ie), regions of respectively identical meanings follow each other; and
$A^4$ and $A^{1b}$ each Independently represent naphthyl; vinylsulfonyl- or hydroxyethylsulfonyl-substituted naphthyl; or a group of formula (12a)

(12)

where
$R^{28a}$ and $R^{29a}$ each independently represent hydrogen; $(C_1\text{-}C_{15})$-alkyl, for example methyl or dodecyl; trifluoromethyl; fluorine; vinylsulfonyl; hydroxyethylsulfonyl; aminosulfonyl; phenyl; phenoxy; chlorophenoxy; or a group of formula (13a)

$$—SO_2—CH_2CH_2—NR^{30a}R^{31a} \quad (13a)$$

where
$R^{30a}$ represents hydrogen; or $(C_1\text{-}C_4)$-alkoxy-$(C_1\text{-}C_4)$-alkyl, for example methoxyethyl; and
$R^{31a}$ represents $(C_1\text{-}C_{12})$-alkyl, for example dodecyl; $(C_1\text{-}C_8)$-alkoxy-$(C_1\text{-}C_4)$-alkyl, for example methoxyethyl; or hydroxy-$(C_1\text{-}C_4)$-alkoxy-$(C_1\text{-}C_4)$alkyl, for example hydroxybutoxypropyl.

Examples of compounds of formula (Ie) are the compounds of formulae (Ie1) to (Ie24)

(Ie1)

-continued
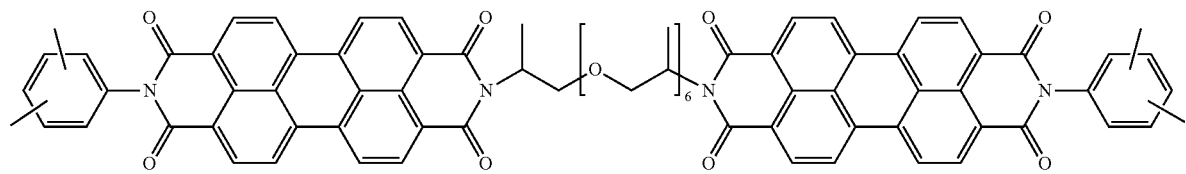
(Ie2)
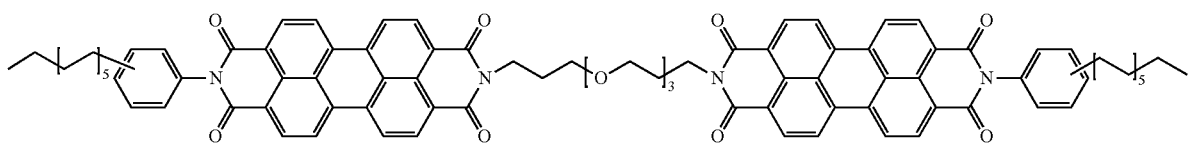
(Ie3)
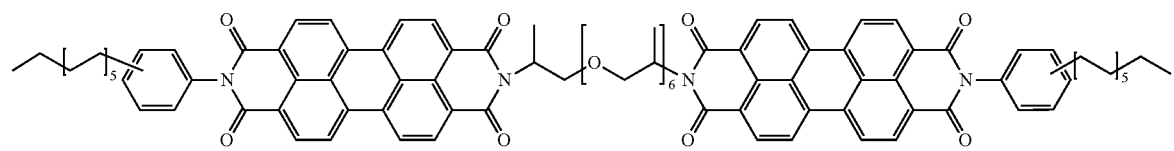
(Ie4)
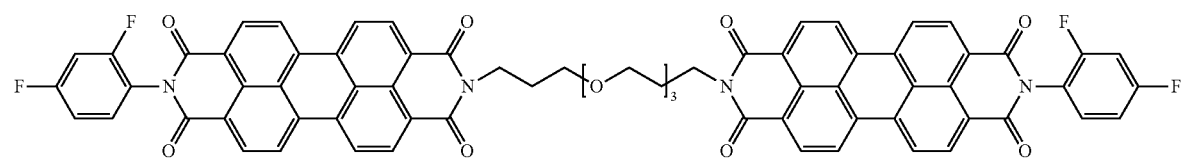
(Ie5)
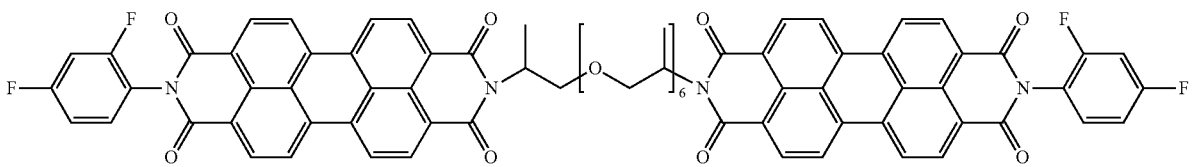
(Ie6)
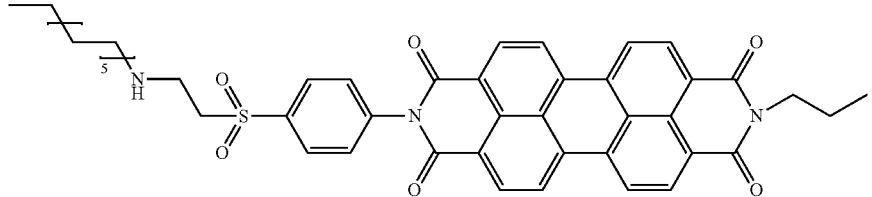
(Ie7)
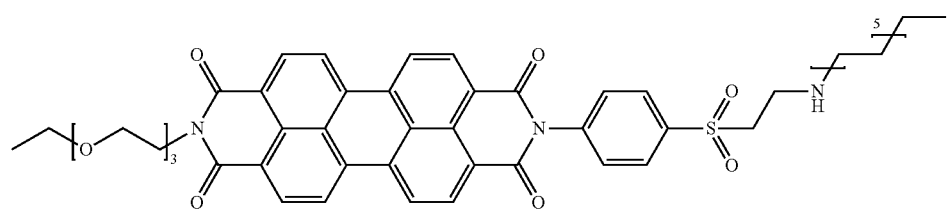
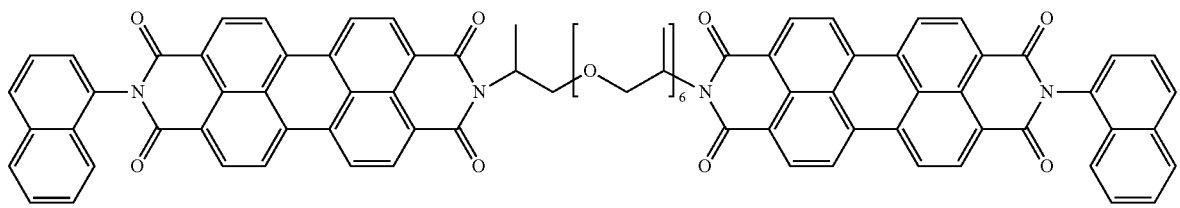
(Ie8)

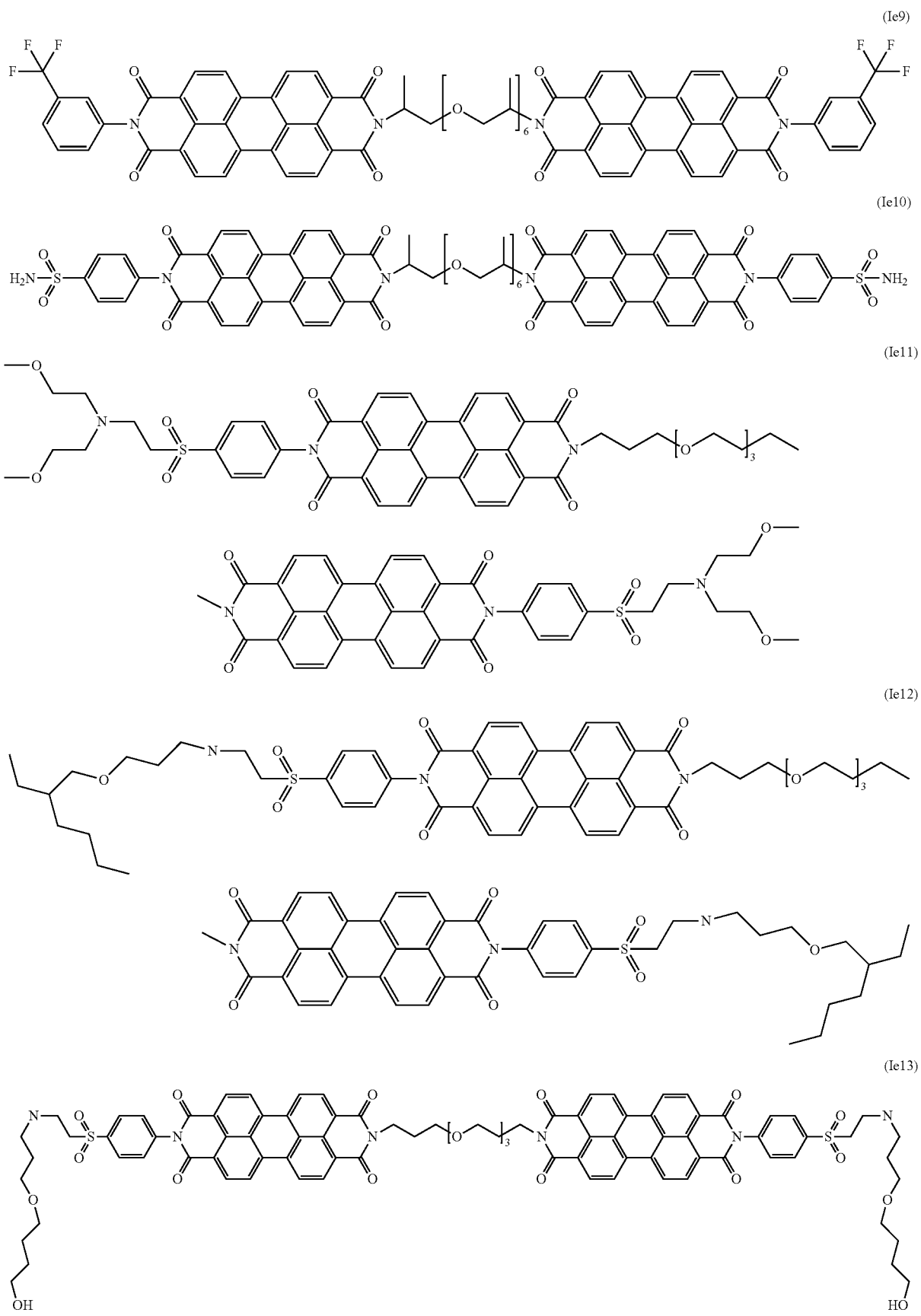

-continued
(Ie14)
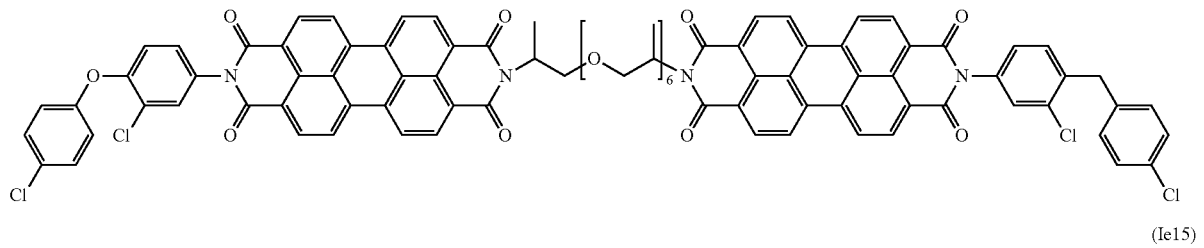
(Ie15)
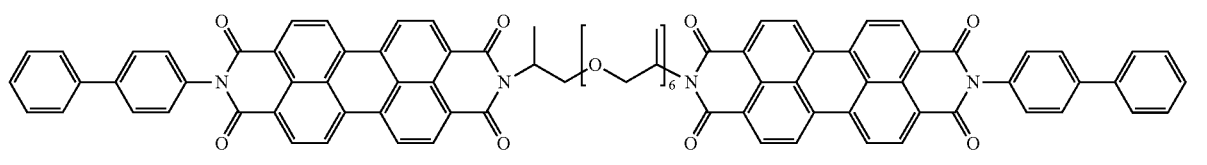
(Ie16)
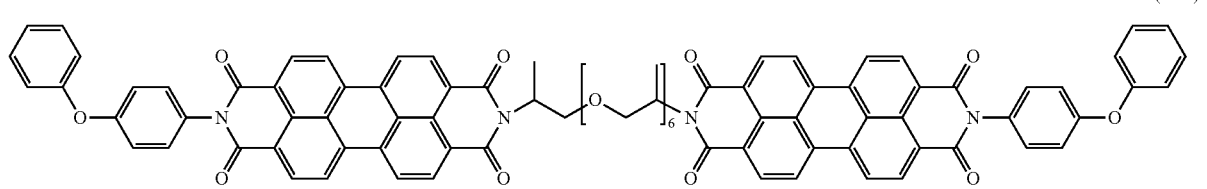
(Ie17)
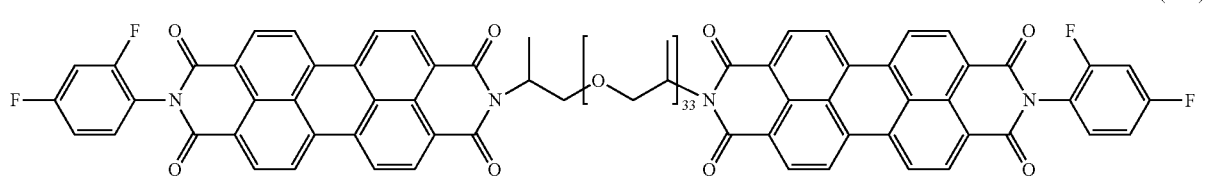
(Ie18)
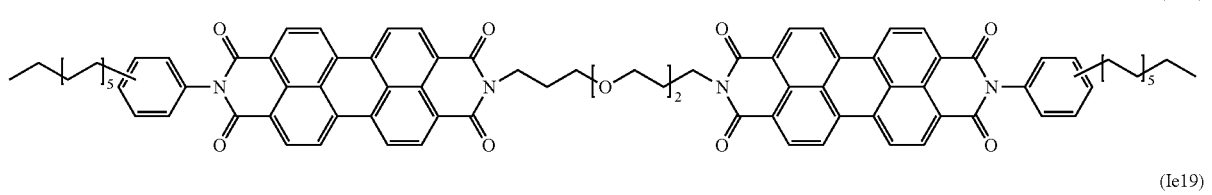
(Ie19)
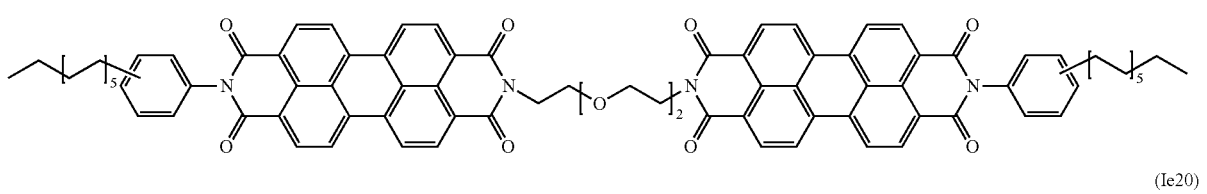
(Ie20)
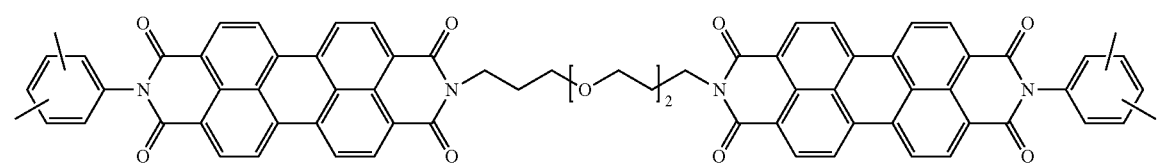
(Ie21)
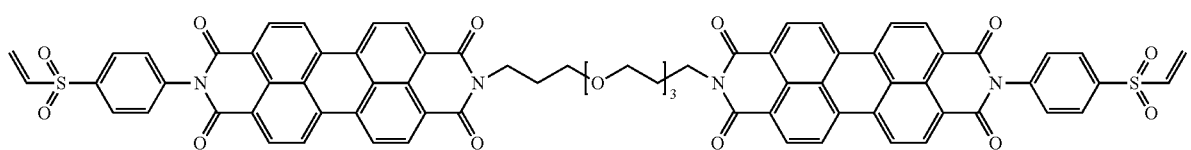

-continued

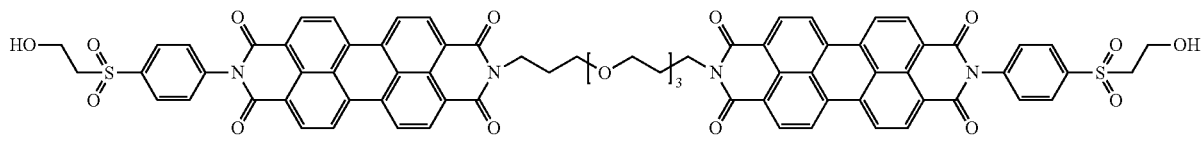
(Ie22)

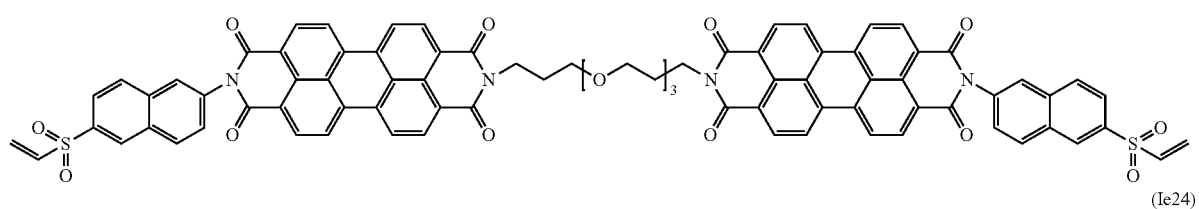
(Ie23)

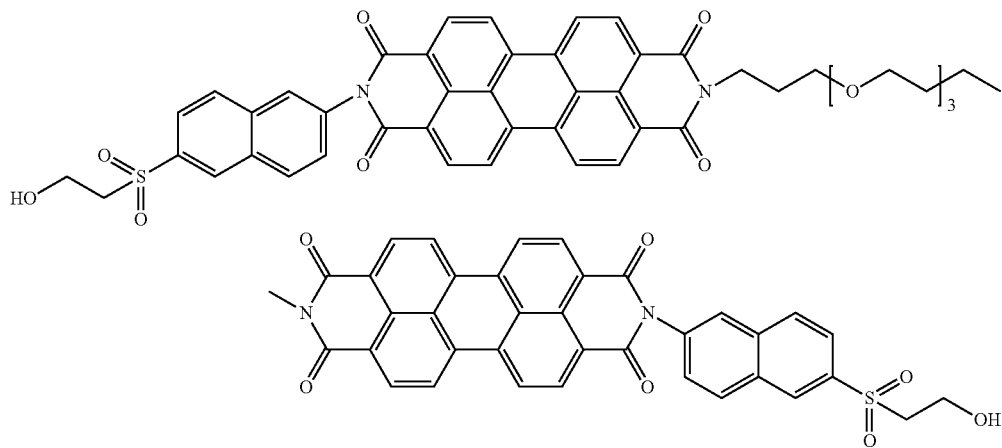
(Ie24)

Further preferred dyes of formula (I) according to the present invention conform to formula (If)

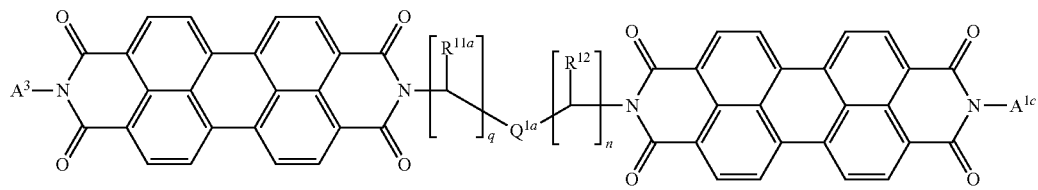
(If)

where
$A^{1c}$ represents a group of formula (4c)

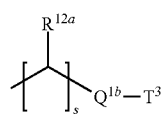
(4c)

and
$A^5$ represents a group of formula (4d)

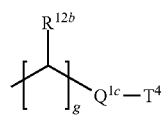
(4d)

where
$R^{11a}$, $R^{12}$, $R^{12a}$ and $R^{12b}$ each independently have one of the meanings of $R^{11}$;
q, s and g each independently represent a number from 1 to 10;
n represents a number from 0 to 10;
$T^3$ and $T^4$ each Independently represent hydrogen, ($C_1$-$C_{35}$)alkyl, aryl, aryloxy, ($C_1$-$C_{35}$)-alkoxy or ($C_1$-$C_{35}$)-alkyl-aryloxy;
$Q^{1b}$ and $Q^{1c}$ each have one of the meanings of $Q^{1a}$ independently of $Q^{1a}$; and
$Q^{1a}$ is as defined above.
In the compounds of formula (If), $A^{1c}$ and $A^5$ are identical or different, preferably identical.
In particularly preferred compounds of formula (If), $R^{11a}$, $R^{12}$, $R^{12a}$ and $R^{12b}$ each independently represent hydrogen or ($C_1$-$C_{15}$)alkyl;
q, s and g each independently represent 1, 2 or 3;
n represents 0, 1, 2, or 3;
$T^3$ and $T^4$ each independently represent ($C_1$-$C_{35}$)-alkoxy, ($C_1$-$C_{35}$)-alkyl or ($C_1$-$C_{35}$)-alkyl-aryloxy;

$Q^{1a}$, $Q^{1b}$ and $Q^{1c}$ each independently represent a group of formula (7) where r represents a rational number from 1 to 100 and has identical or different meanings within a molecule of formula (If);

$R^{15}$ and $R^{16}$ each independently represent hydrogen or $(C_1\text{-}C_{35})$-alkyl and where $R^{15}$ and $R^{16}$ have identical or different meanings within a molecule of formula (Id); and where when $R^{15}$ and $R^{16}$ have different meanings within a molecule of formula (Id), these different meanings are randomly distributed or regions of respectively identical meanings follow each other.

In very particularly preferred compounds of formula (If),
s and g each represent 2;
q represents 2 or 3;
n represents 0 or 1;
$R^{11a}$, $R^{12}$, $R^{12a}$ and $R^{12b}$ each independently represent hydrogen or methyl;

$Q^{1a}$ represents a group of formula (7) where r represents a rational number from 2 to 33 and has identical or different meanings within a molecule of formula (If);

$Q^{1b}$ and $Q^{1c}$ each independently represent a group of formula (7) where r represents a rational number from 1 to 9 and has identical or different meanings within a molecule of formula (If);

$R^{15}$ and $R^{16}$ each independently represent hydrogen or $(C_1\text{-}C_4)$-alkyl, in particular methyl;

where $R^{15}$ and $R^{16}$ have identical or different meanings within a molecule of formula (If); and where when $R^{15}$ and $R^{16}$ have different meanings within a molecule of formula (If), regions of respectively identical meanings follow each other; and $T^3$ and $T^4$ each independently represent $(C_1\text{-}C_{15})$-alkoxy or nonylphenoxy.

Examples of compounds of formula (If) are the compounds of formulae (If1) to (If11)

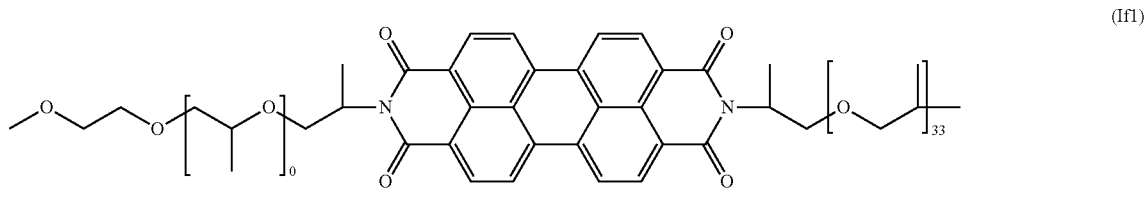

(If1)

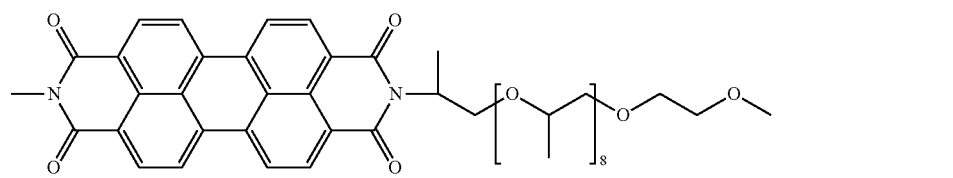

(If2)

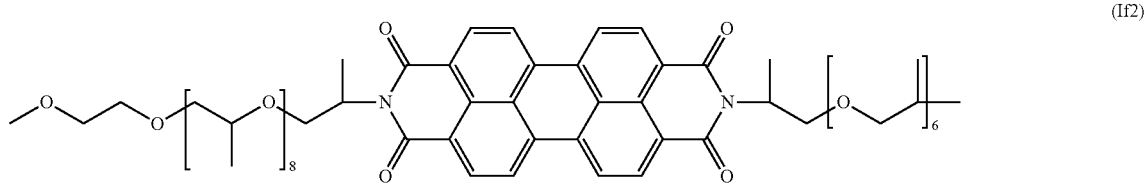

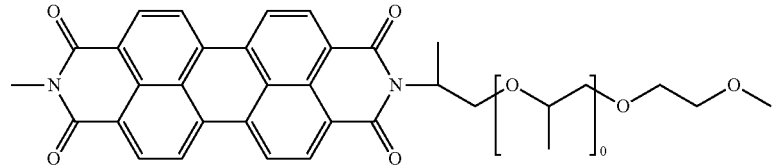

(If3)

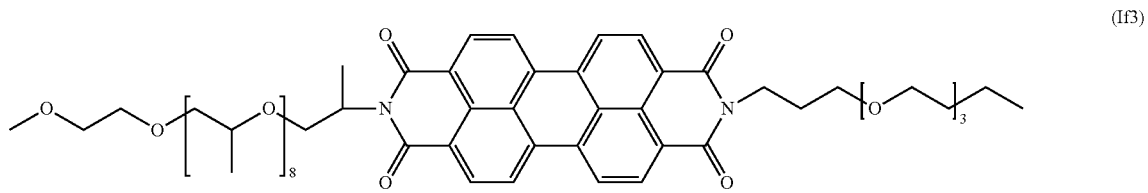

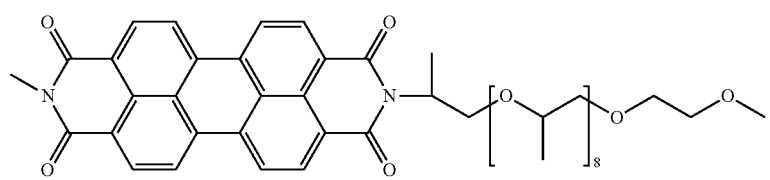

-continued
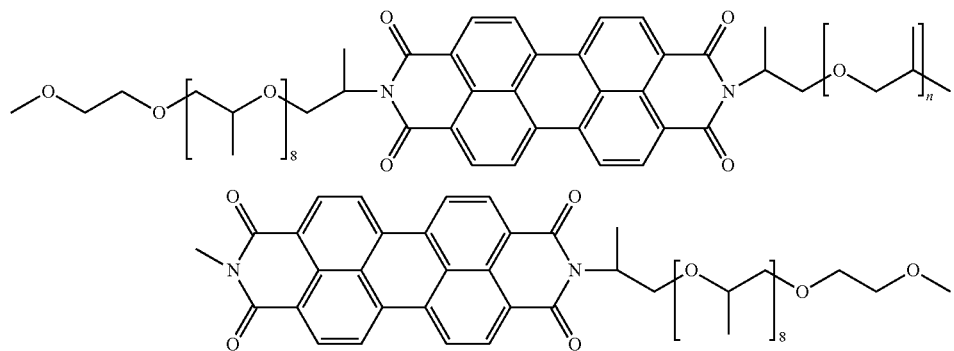
(If4)
n = ca. 2.5
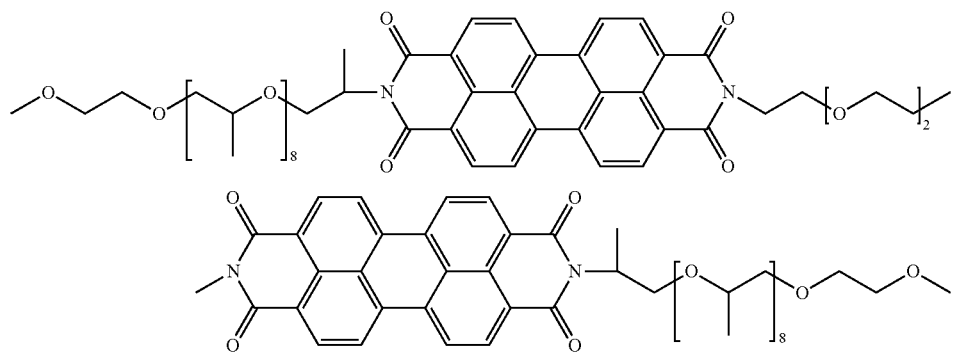
(If5)
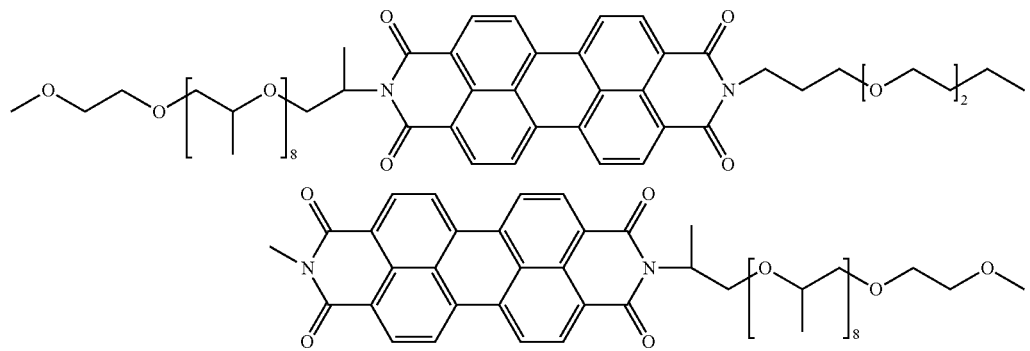
(If6)
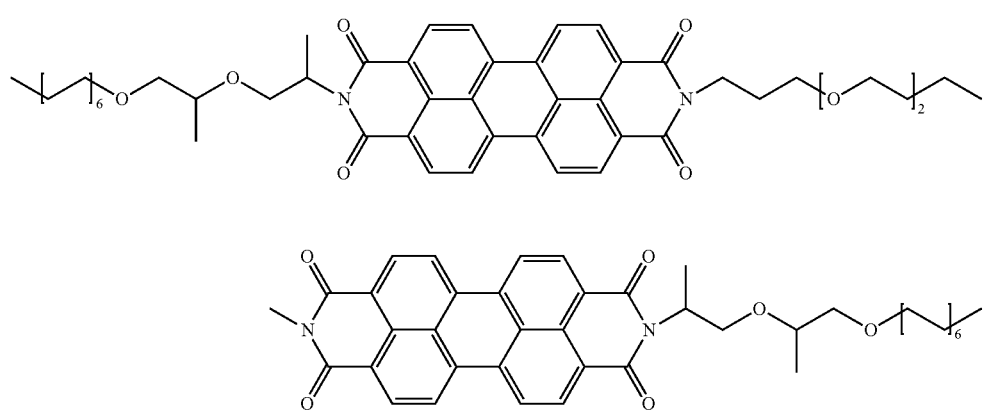
(If7)

-continued
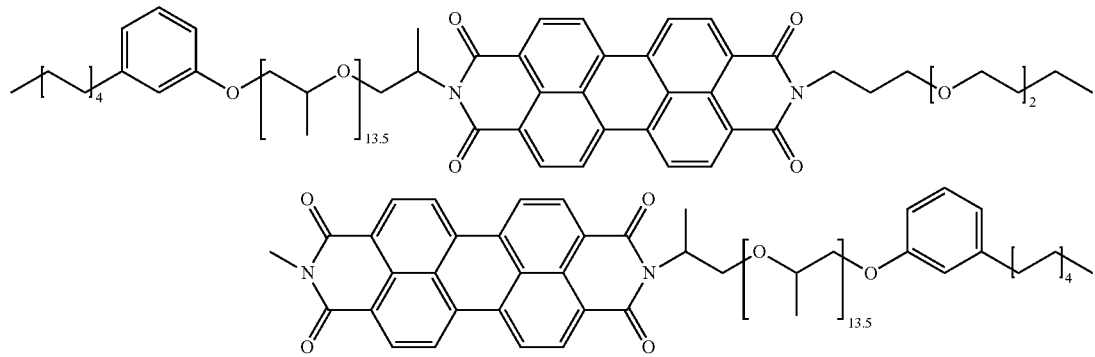
(If8)
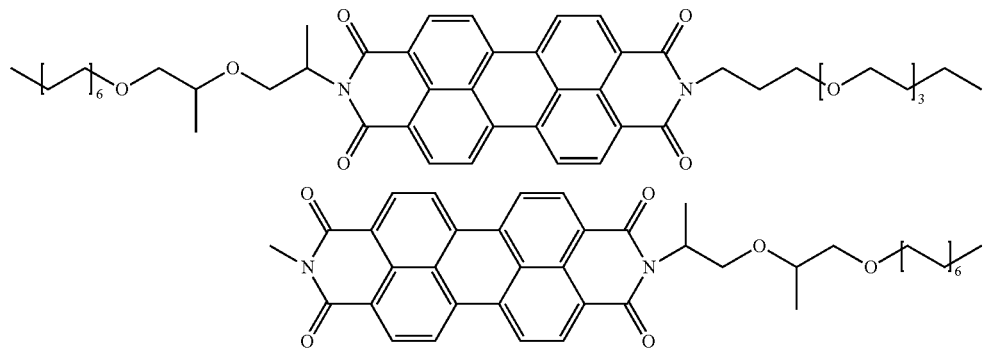
(If9)
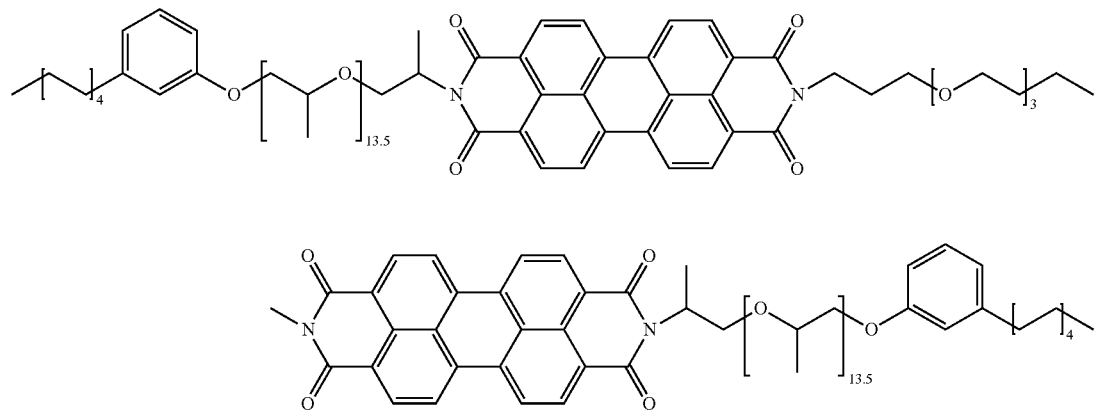
(If10)
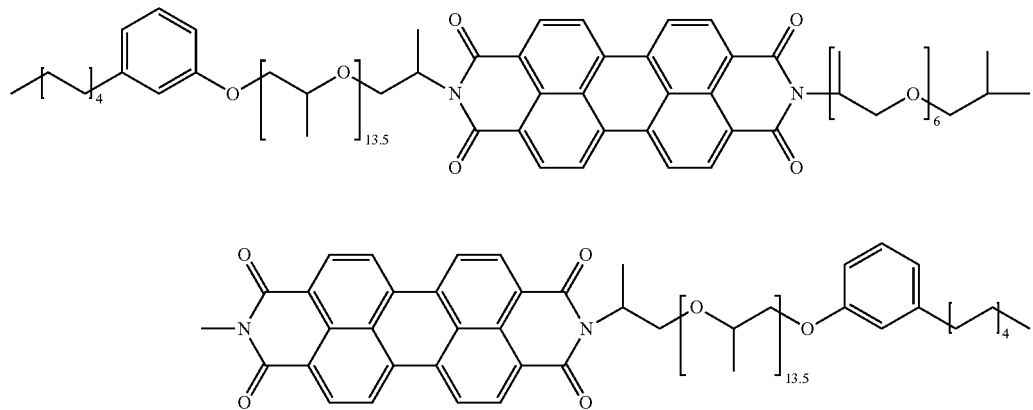
(If11)

Further preferred dyes of formula (I) according to the present invention conform to formula (Ig)

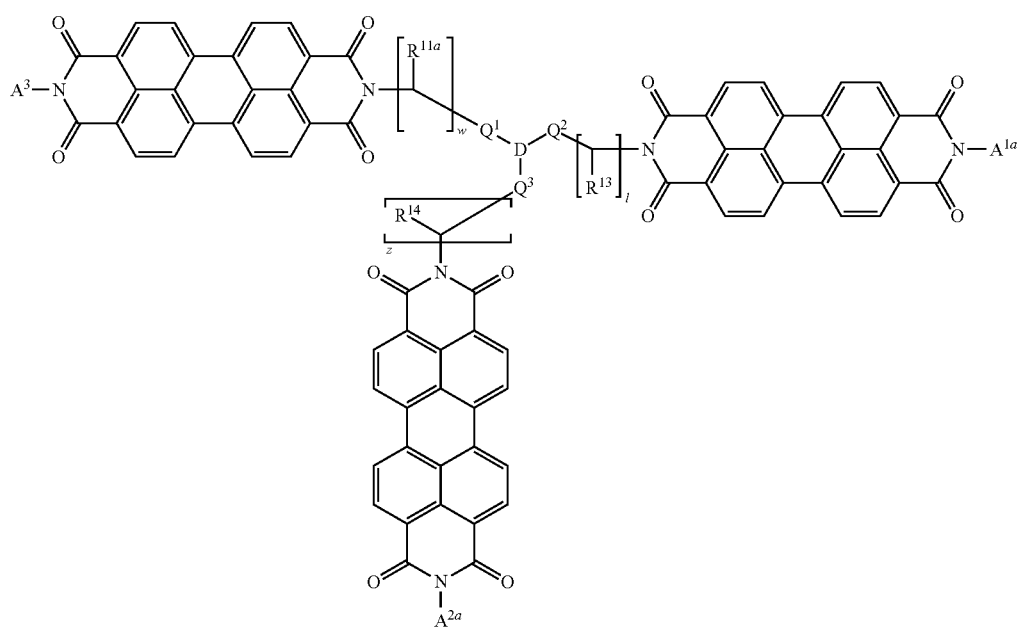

where
$R^{13}$ and $R^{14}$ each Independently have one of the meanings of $R^{11a}$ independently of $R^{11a}$;
t, w and z each independently represent a number from 0 to 10;
$Q^2$ and $Q^3$ each independently have one of the meanings of $Q^1$ independently of $Q^1$;
D represents a group of formula (8a)

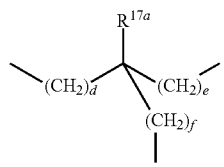

where
$R^{17a}$ represents hydrogen or $(C_1-C_{35})$-alkyl; and
d, a and f independently represent a number from 0 to 5;
$A^{1a}$ and $A^{2a}$ each independently have one of the meanings of A3 independently of $A^3$; and
$A^3$, $R^{11a}$ and $Q^1$ are each as defined above.
In particularly preferred compounds of formula (Ig),
$R^{11a}$, $R^{13}$ and $R^{14}$ each independently represent hydrogen or $(C_1-C_{15})$alkyl;
t, w and z each independently represent 0, 1 or 2;
$Q^1$, $Q^2$ and $Q^3$ each independently represent a group of formula (7) where r represents a rational number from 1 to 100 and has identical or different meanings within a molecule of formula (Ig);
$R^{15}$ and $R^{16}$ each independently represent hydrogen or $(C_1-C_{35})$-alkyl and where $R^{15}$ and $R^{16}$ have identical or different meanings within a molecule of formula (Ig); and where when $R^{15}$ and $R^{16}$ have different meanings within a molecule of formula (Ig), these different meanings are randomly distributed or regions of respectively identical meanings follow each other;
D represents a group of formula (8a) where $R^{17a}$ represents $(C_1-C_4)$-alkyl and d, e and f each independently represent a number from 0 to 5; and
$A^3$, $A^{1a}$ and $A^{2a}$ each independently represent the group $A^{3a}$ where $A^{3a}$ is as defined above, In very particularly preferred compounds of formula (Ig),
t, w and z each represent 0;
$Q^1$, $Q^2$ and $Q^3$ each independently represent a group of formula (7) where the sum total of the indices r in $Q^1$, $Q^2$ and $Q^3$ represents a rational number from 5 to 6 and has identical or different meanings within a molecule of formula (Ig);
$R^{15}$ and $R^{16}$ each independently represent hydrogen or $(C_1-C_4)$-alkyl, particularly methyl;
where $R^{15}$ and $R^{16}$ have respectively identical or different meanings within a molecule of formula (Ig); and where when $R^{15}$ and $R^{16}$ have different meanings within a molecule of formula (Ig), regions of respectively identical meanings follow each other;
$A^{1a}$, $A^{2a}$ and $A^3$ each represent $(C_6-C_{12})$-alkyl; $(C_1-C_8)$-alkoxy-$(C_1-C_4)$-alkyl; cyclohexyl;
N-methylpiperazinyl, benzothiazolyl or $D^1$-$(C_1-C_4)$-alkyl where $D^1$ represents naphthyl, morpholinyl, phenyl, fluorophenyl or dimethoxyphenyl;
$R^{17a}$ represents ethyl; and
d, e and f each represent 1.

Examples of compounds of formula (Ig) are the compounds of formulae (Ig1) to (Ig15)
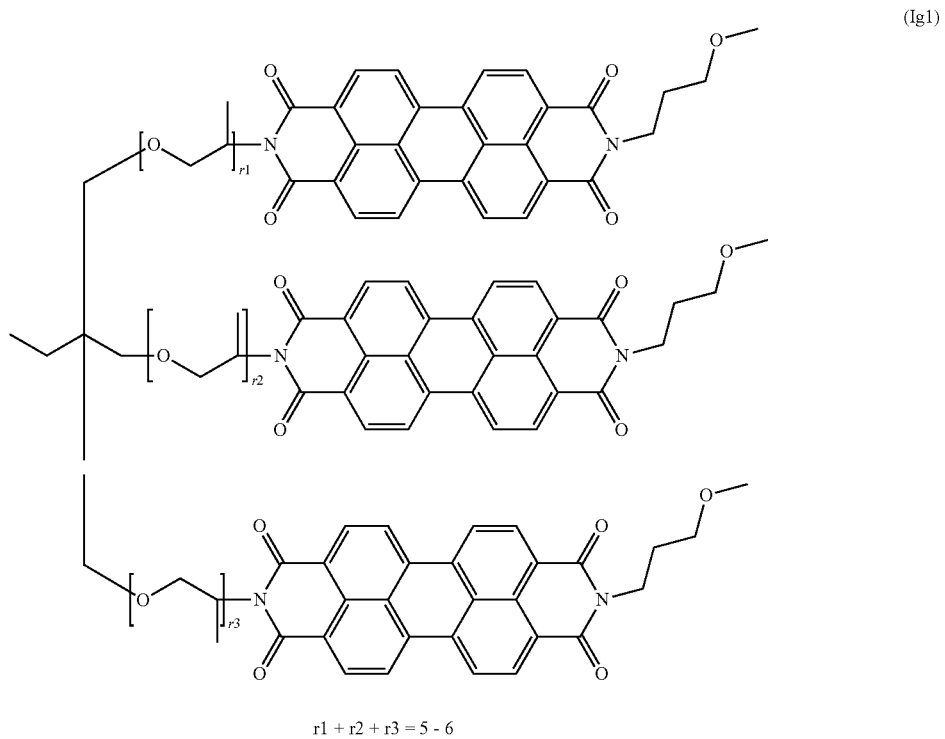
(Ig1)
r1 + r2 + r3 = 5 - 6
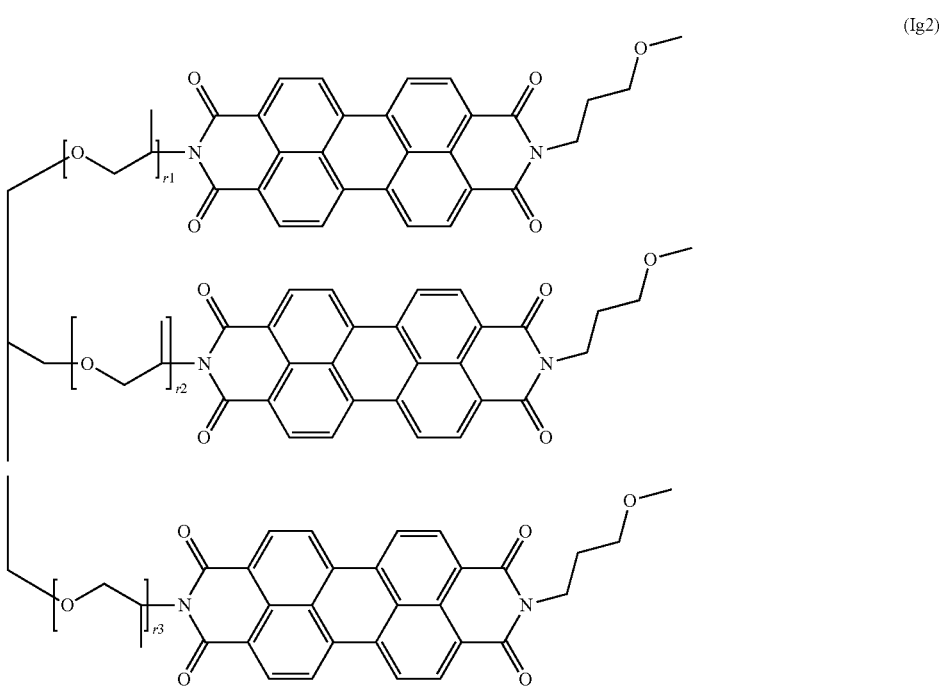
(Ig2)
r1 + r2 + r3 = 50

-continued
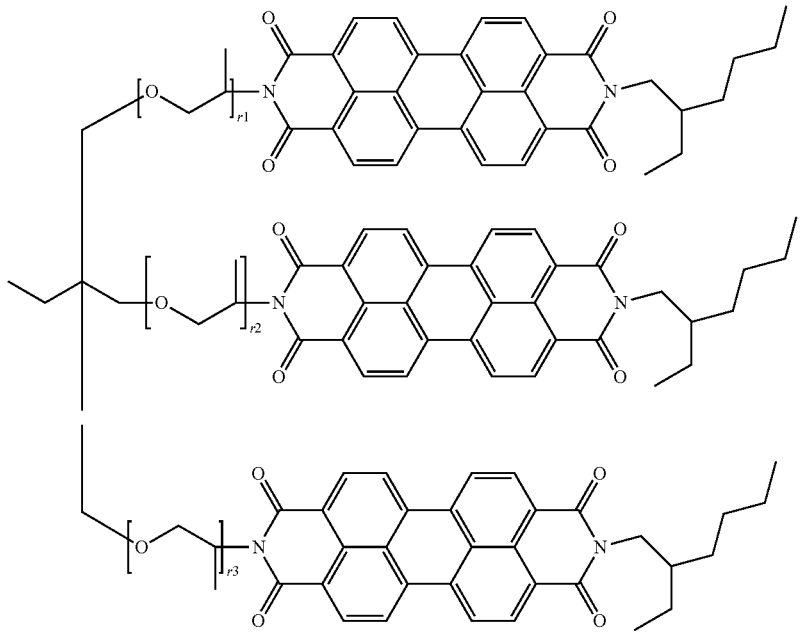
(Ig3)
r1 + r2 + r3 = 5 - 6
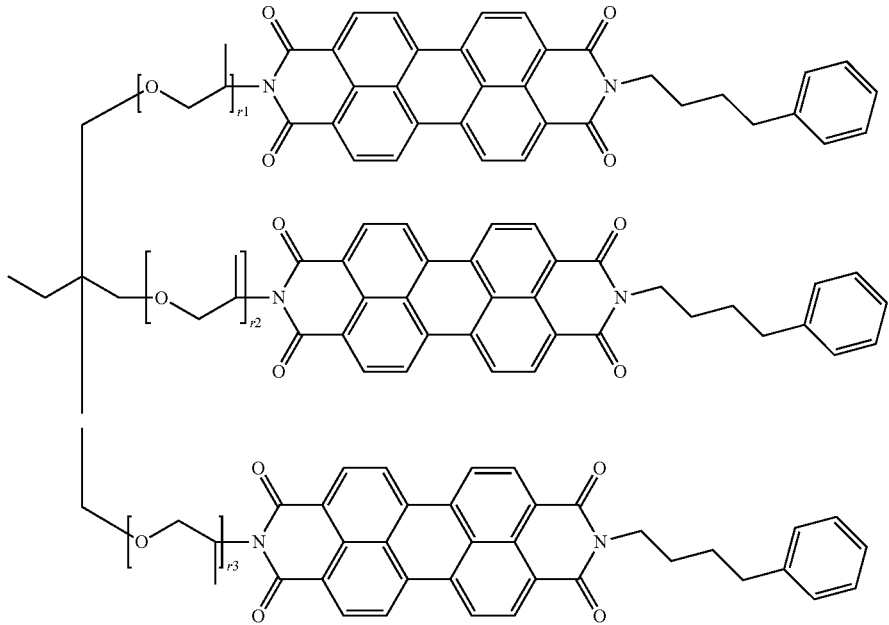
(Ig4)
r1 + r2 + r3 = 5 - 6

(Ig5)
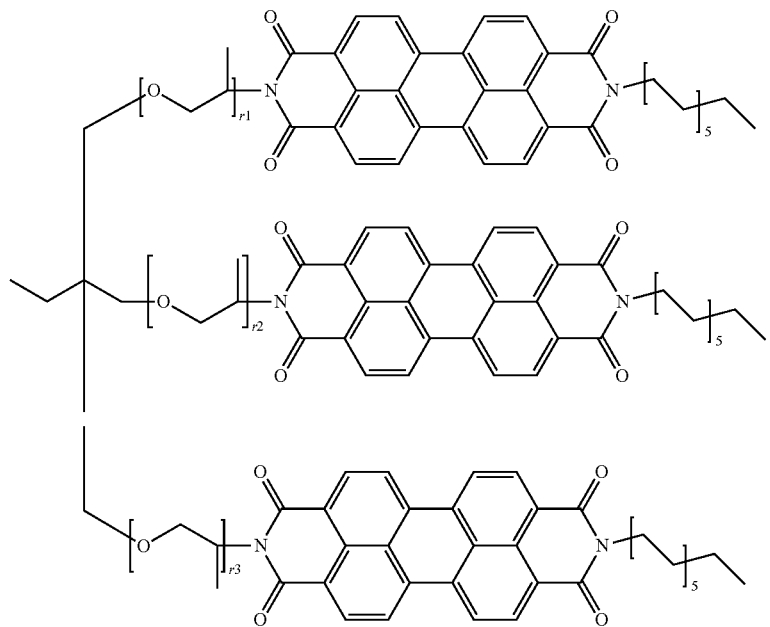
r1 + r2 + r3 = 5 - 6
(Ig6)
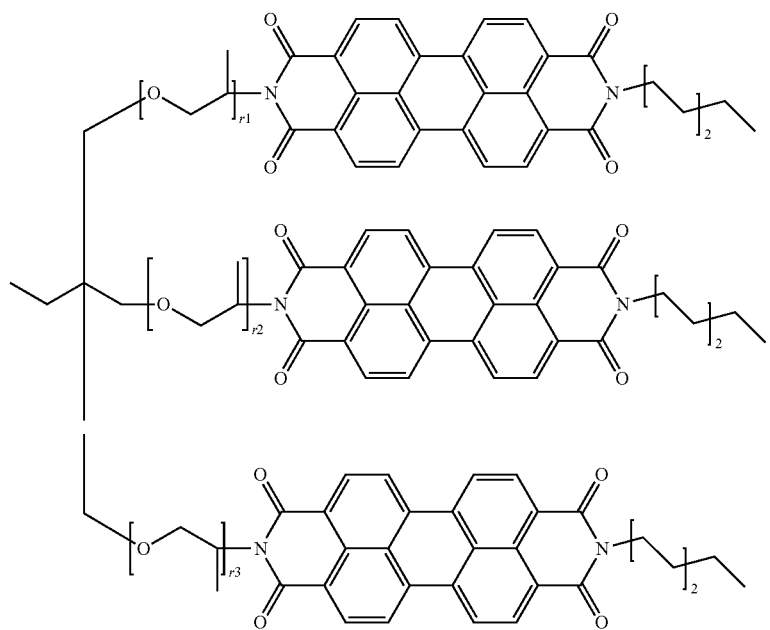
r1 + r2 + r3 = 5 - 6

(Ig7)
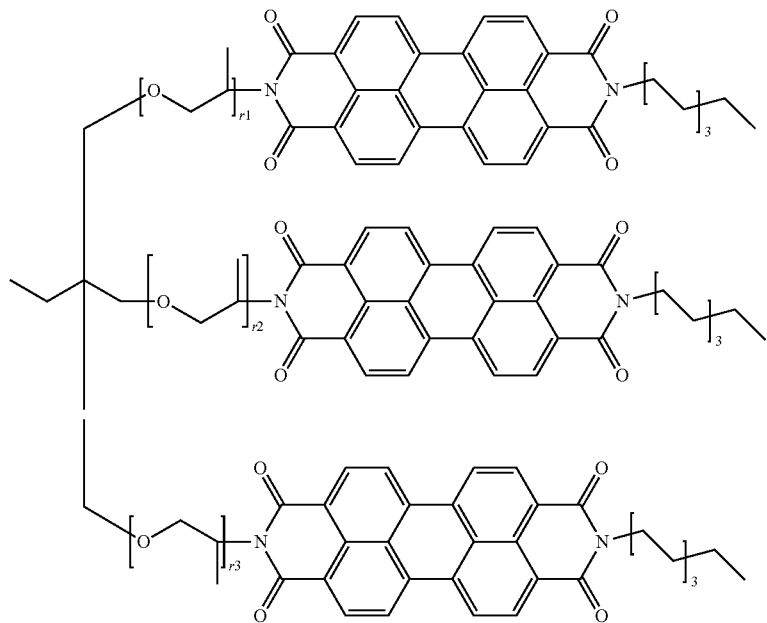
r1 + r2 + r3 = 5 - 6
(Ig8)
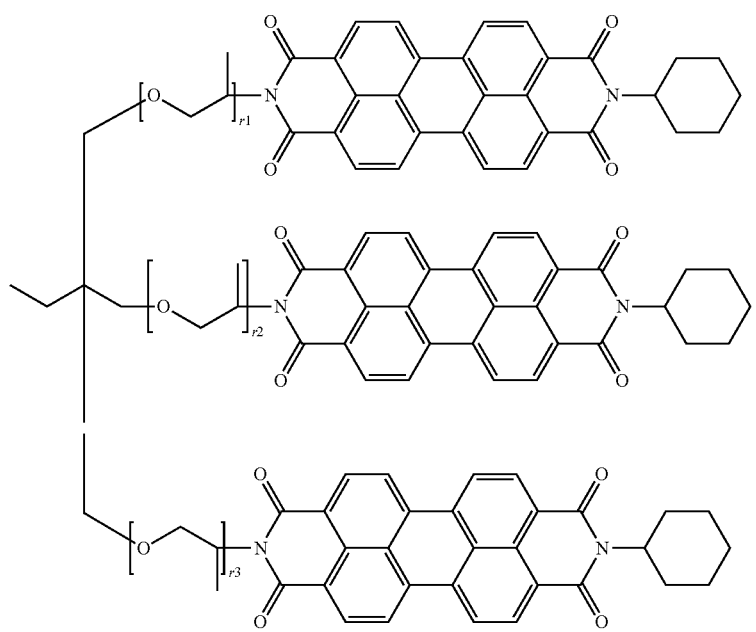
r1 + r2 + r3 = 5 - 6

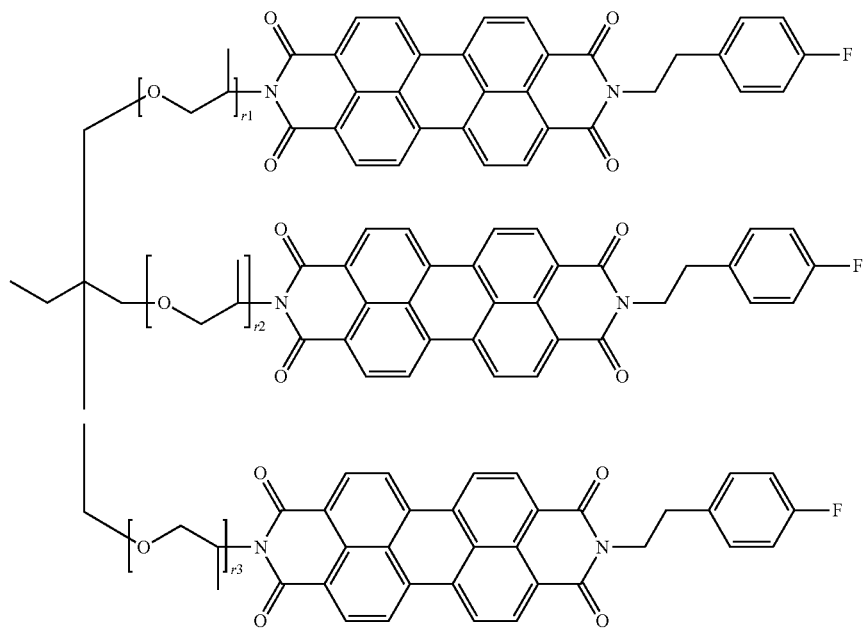
(Ig9)
r1 + r2 + r3 = 5 - 6
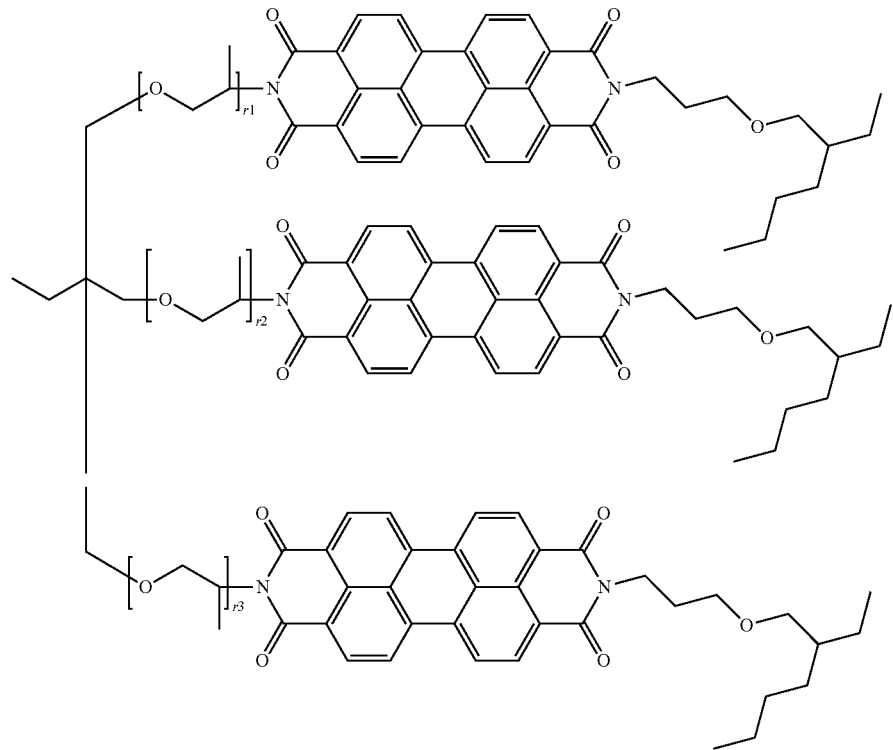
(Ig10)
r1 + r2 + r3 = 5 - 6

(Ig11)
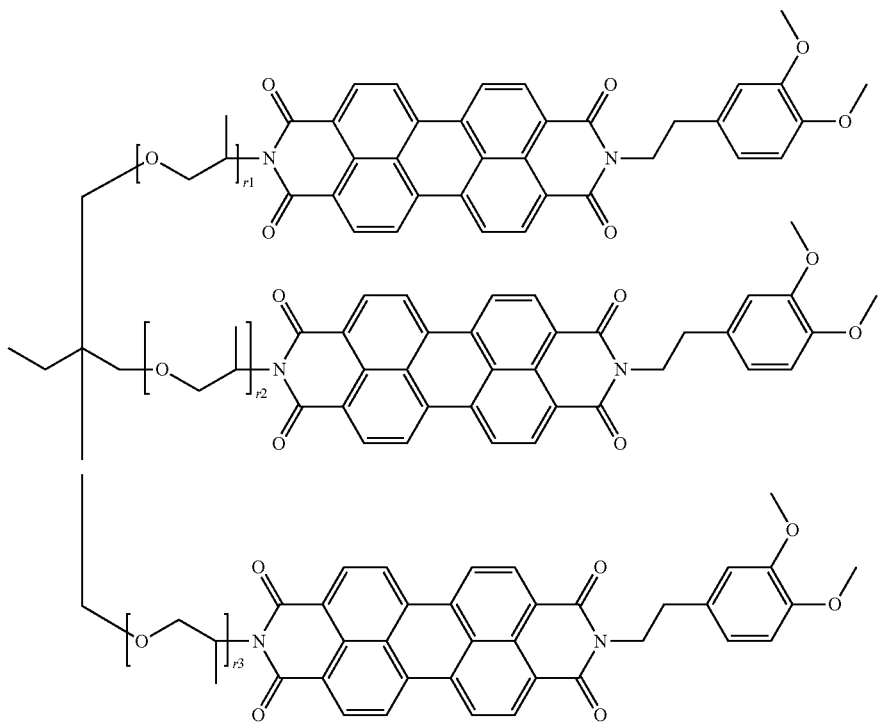
r1 + r2 + r3 = 5 - 6
(Ig12)
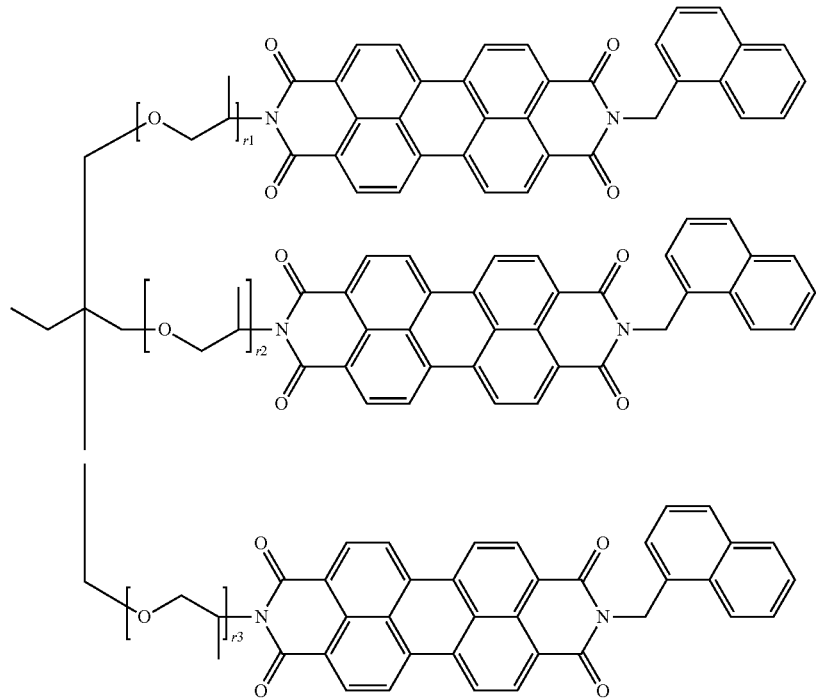
r1 + r2 + r3 = 5 - 6

-continued
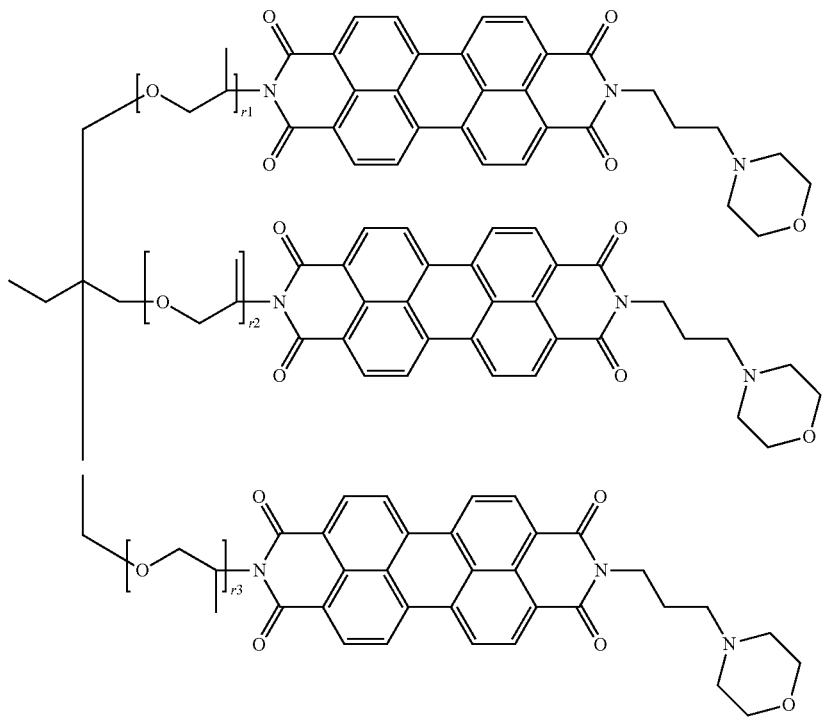
(Ig13)
r1 + r2 + r3 = 5 - 6
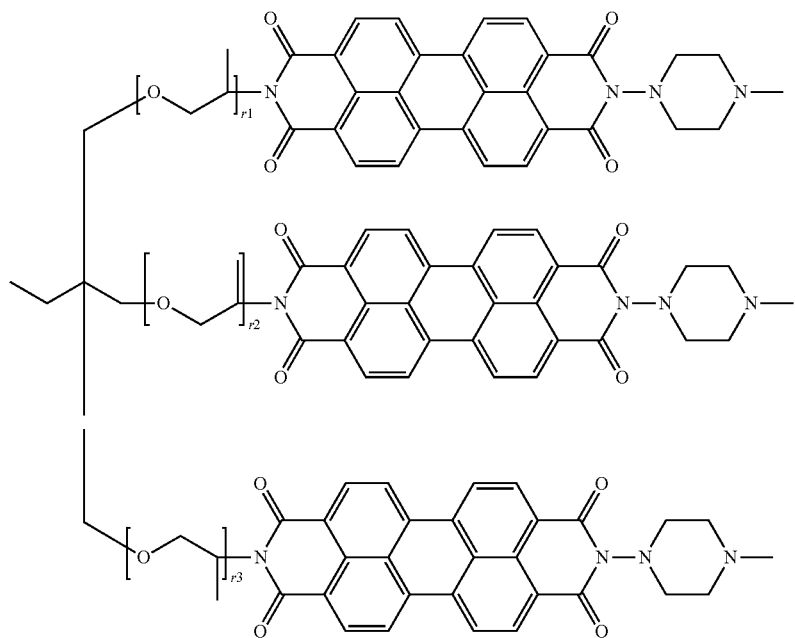
(Ig14)
r1 + r2 + r3 = 5 - 6

(Ig15)
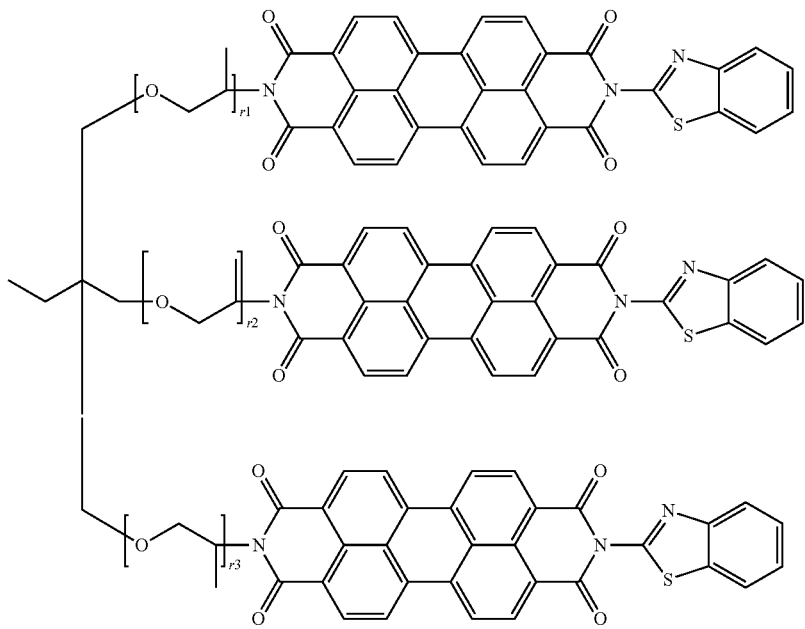
r1 + r2 + r3 = 5 - 6
Further preferred dyes of formula (I) according to the present invention conform to formula (Ih)
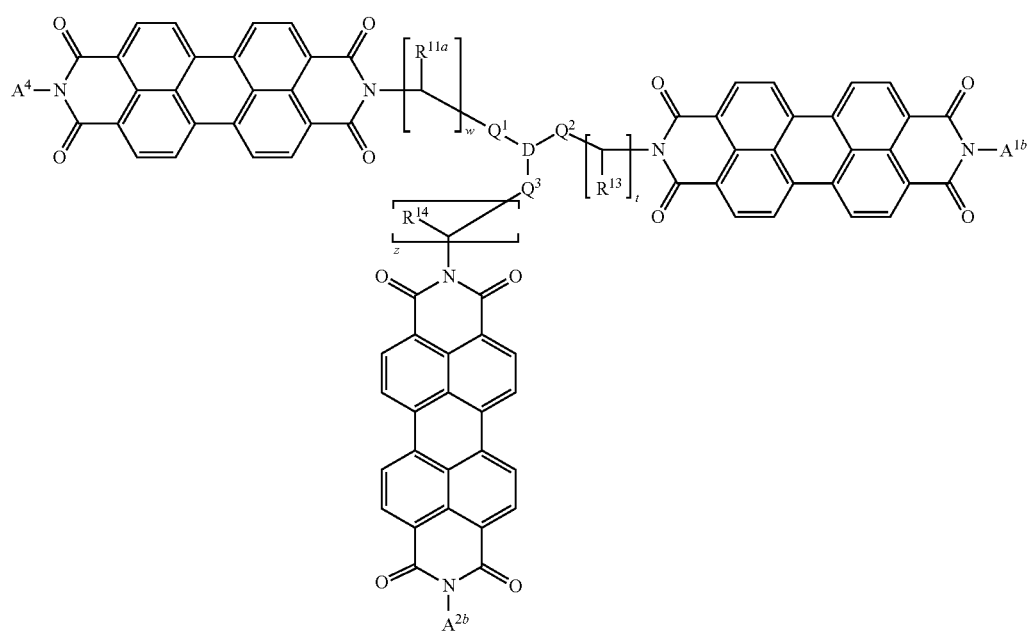
(Ih)

where $R^{13}$ and $R^{14}$ each independently have one of the meanings of $R^{11a}$ independently of $R^{11a}$, t, w and z each independently represent a number from 0 to 10;

$Q^2$ and $Q^3$ each independently have one of the meanings of $Q^1$ independently of $Q^1$;

D represents a group of formula (8a)

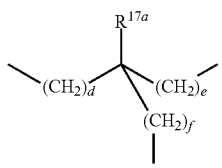
(8a)

where $R^{17a}$ represents hydrogen or $(C_1-C_{35})$-alkyl; and d, e and f independently represent a number from 0 to 5;

$A^{1b}$ and $A^{1b}$ each independently have one of the meanings of $A^4$ independently of $A^4$; and $A^4$, $R^{11a}$ and $Q^1$ are each as defined above.

In particularly preferred compounds of formula (Ih), $R^{11a}$, $R^{13}$ and $R^{14}$ each independently represent hydrogen or $(C_1-C_{15})$alkyl;

t, w and z each independently represent 0, 1 or 2;

$Q^1$, $Q^2$ and $Q^3$ each independently represent a group of formula (7) where r represents a rational number from 1 to 100 and has identical or different meanings within a molecule of formula (Ih);

$R^{15}$ and $R^{16}$ each independently represent hydrogen or $(C_1-C_{35})$-alkyl and where $R^{15}$ and $R^{16}$ have identical or different meanings within a molecule of formula (Ih); and where when $R^{15}$ and $R^{16}$ have different meanings within a molecule of formula (Ih), these different meanings are randomly distributed or regions of respectively identical meanings follow each other;

D represents a group of formula (8a) where $R^{17a}$ represents $(C_1-C_4)$-alkyl and d, e and f each independently represent a number from 0 to 5; and $A^4$, $A^{1b}$ and $A^{2b}$ each independently represent the group $A^{4a}$ where $A^{4a}$ is as defined above, In very particularly preferred compounds of formula (Ih), t, w and z each represent 0;

$Q^1$, $Q^2$ and $Q^3$ each independently represent a group of formula (7) where the sum total of the indices r in $Q^1$, $Q^2$ and $Q^3$ represents a rational number from 5 to 50 and has identical or different meanings within a molecule of formula (Ig);

$R^{15}$ and $R^{16}$ each independently represent hydrogen or $(C_1-C_4)$-alkyl, particularly methyl;

where $R^{15}$ and $R^{16}$ have respectively identical or different meanings within a molecule of formula (Ig); and where when $R^{15}$ and $R^{16}$ have different meanings within a molecule of formula (Ig), regions of respectively identical meanings follow each other;

$A^{1b}$, $A^{2b}$ and $A^4$ each represent naphthyl; vinylsulfonyl- or hydroxyethylsulfonyl-substituted naphthyl; or a group of formula (12)

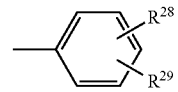
(12)

where $R^{28}$ and $R^{29}$ each independently represent hydrogen; $(C_1-C_{15})$-alkyl, for example methyl; trifluoromethyl; chlorine; fluorine, vinylsulfonyl; hydroxyethylsulfonyl; phenyl; chlorophenoxy; or a group of formula (13)

$$-SO_2-CH_2CH_2-NR^{30}R^{31} \qquad (13)$$

where $R^{30}$ represents hydrogen; or $(C_1-C_4)$-alkoxy-$(C_1-C_4)$-alkyl, for example methoxyethyl; and $R^{31}$ represents $(C_1-C_{12})$-alkyl, for example dodecyl; $(C_1-C_8)$-alkoxy-$(C_1-C_4)$-alkyl, for example methoxyethyl; hydroxy-$(C_1-C_4)$-alkoxy-$(C_1-C_4)$alkyl, for example hydroxybutoxypropyl; or dimethylphenyl;

$R^{17a}$ represents hydrogen or ethyl; and d, e and f each represent 1.

Examples of compounds of formula (Ih) are the compounds of formulae (Ih1) to (Ih9)

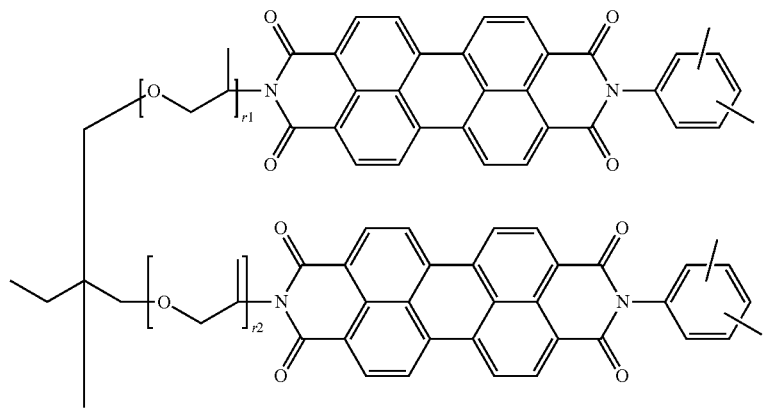
(Ih1)

-continued
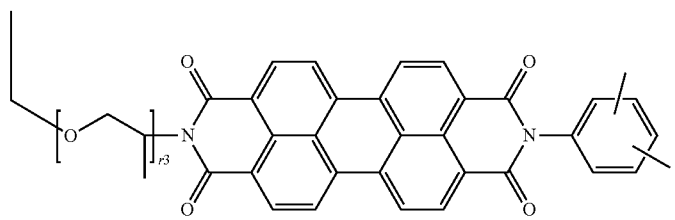
r1 + r2 + r3 = 5 - 6
(Ih2)
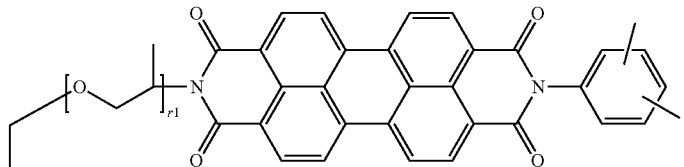
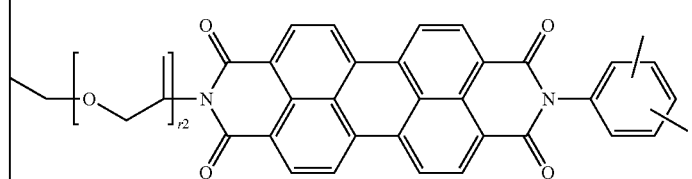
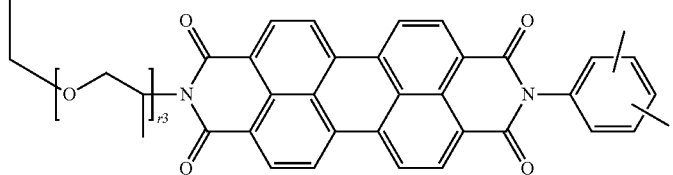
r1 + r2 + r3 = 50
(Ih3)
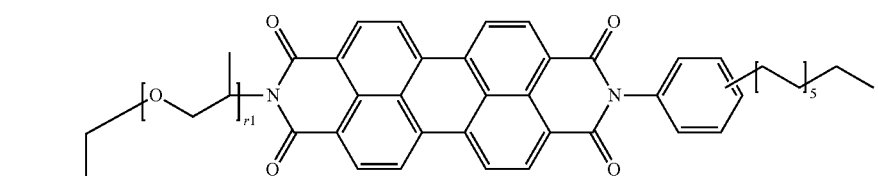
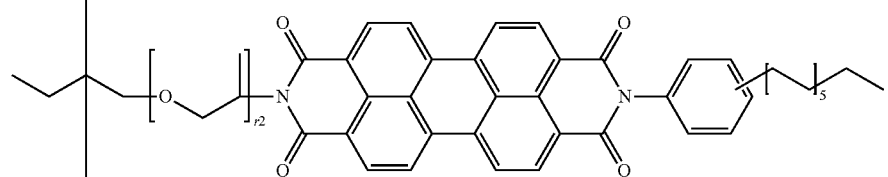
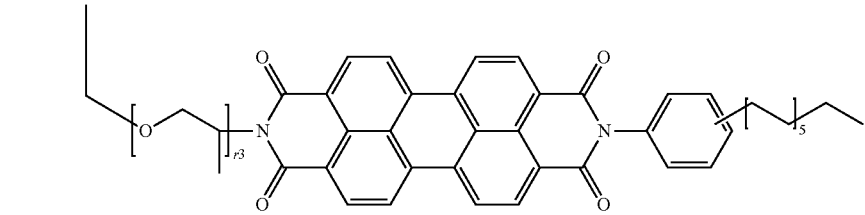
r1 + r2 + r3 = 5 - 6

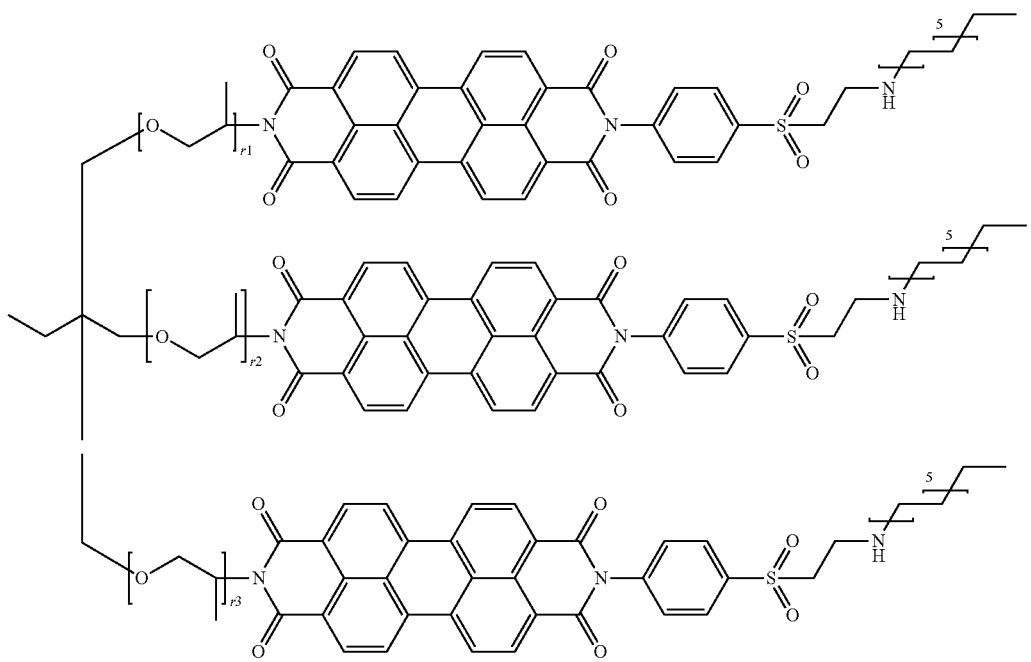
(Ih4)
r1 + r2 + r3 = 5 - 6
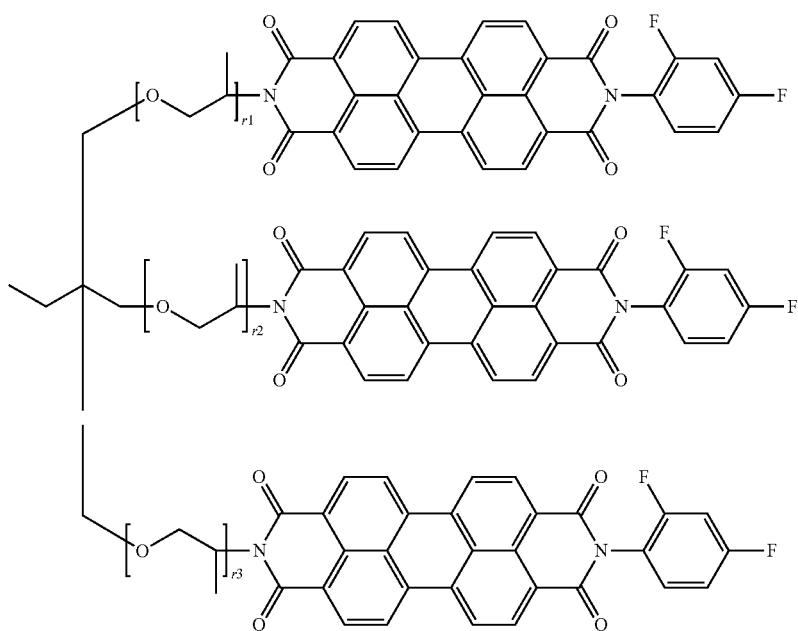
(Ih5)
r1 + r2 + r3 = 5 - 6

(Ih6)
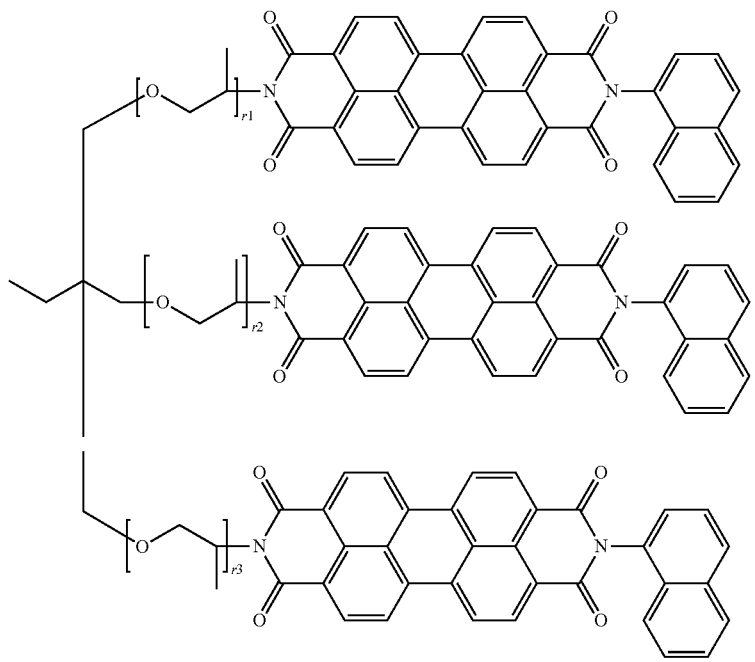
r1 + r2 + r3 = 5 - 6
(Ih7)
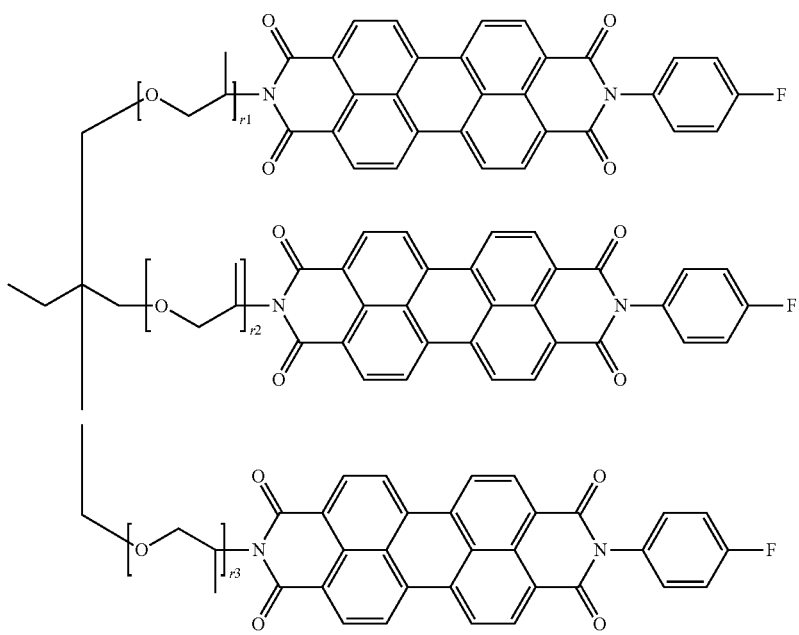
r1 + r2 + r3 = 5 - 6

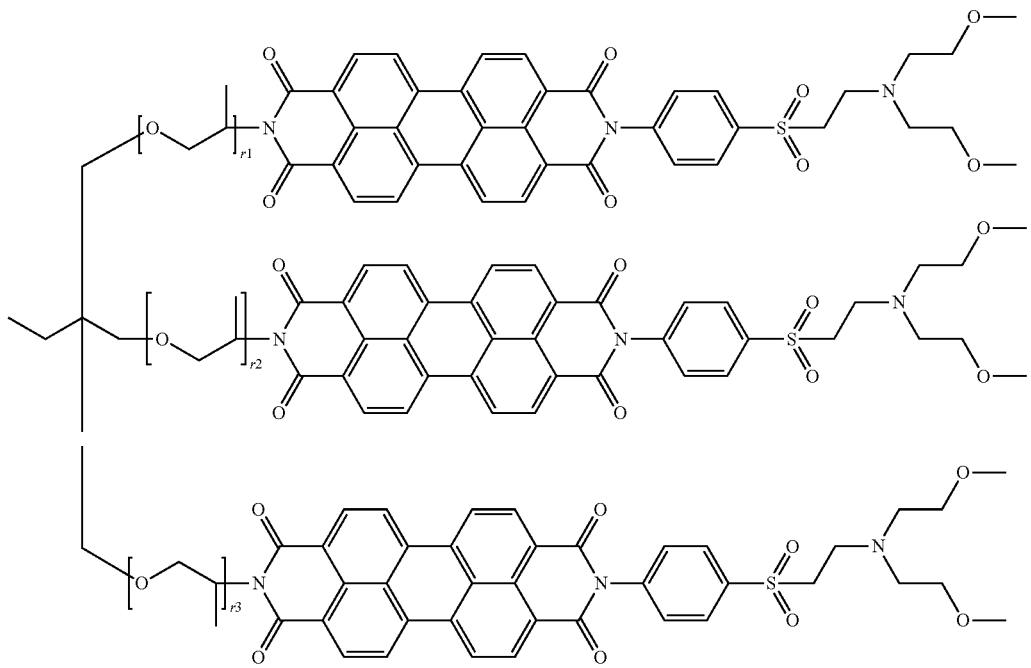
(Ih8)
r1 + r2 + r3 = 5 - 6
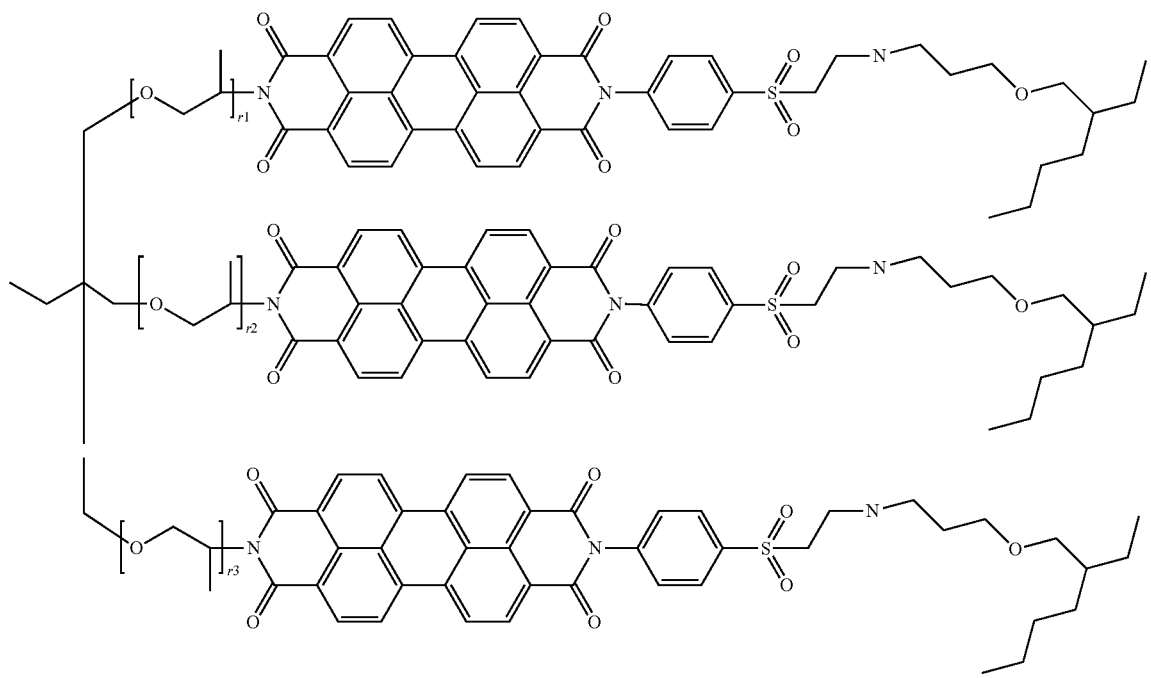
(Ih9)
r1 + r2 + r3 = 5 - 6

-continued
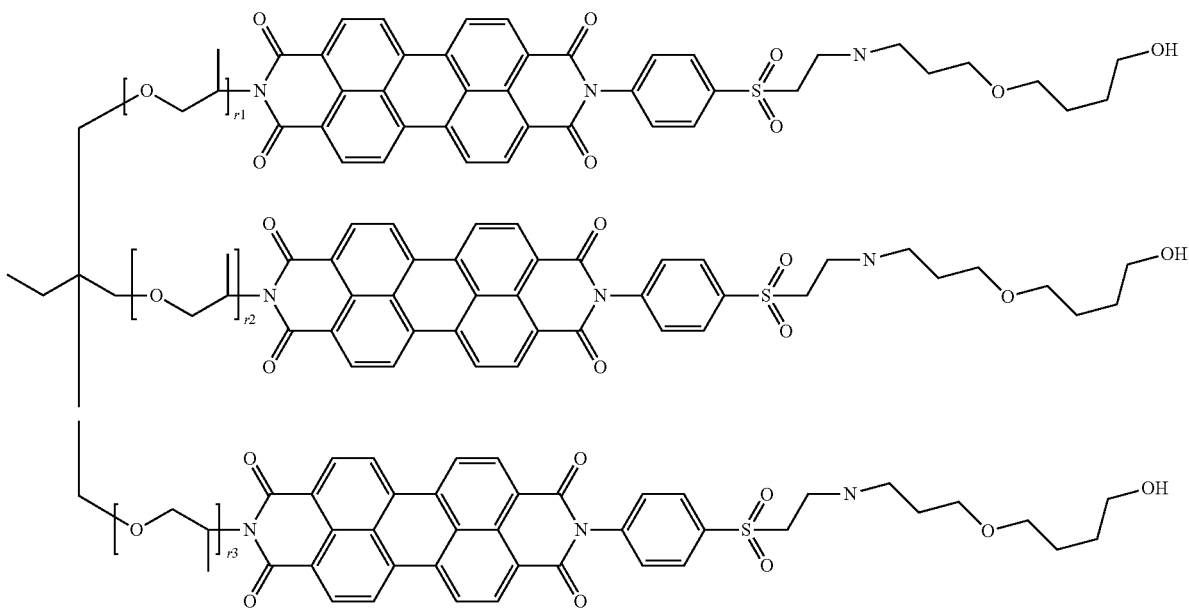
(Ih10)
r1 + r2 + r3 = 5 - 6
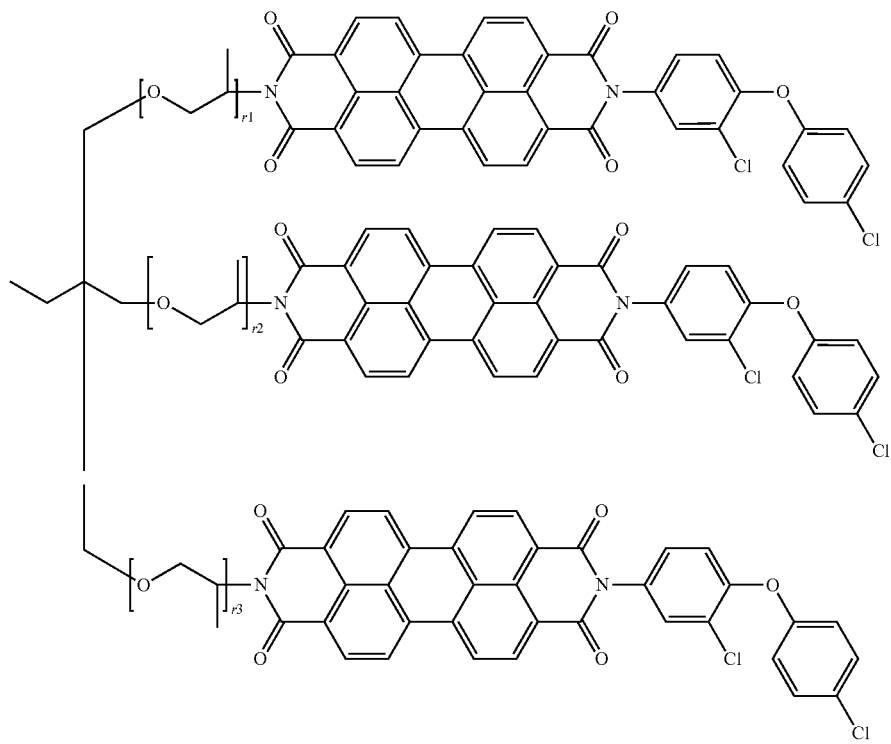
(Ih11)
r1 + r2 + r3 = 5 - 6

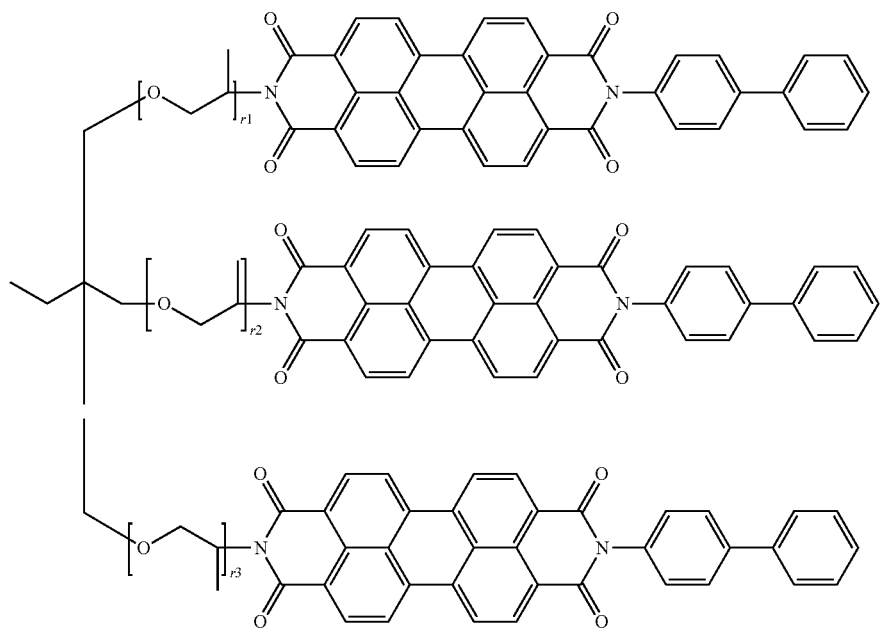
(Ih12)
r1 + r2 + r3 = 5 - 6
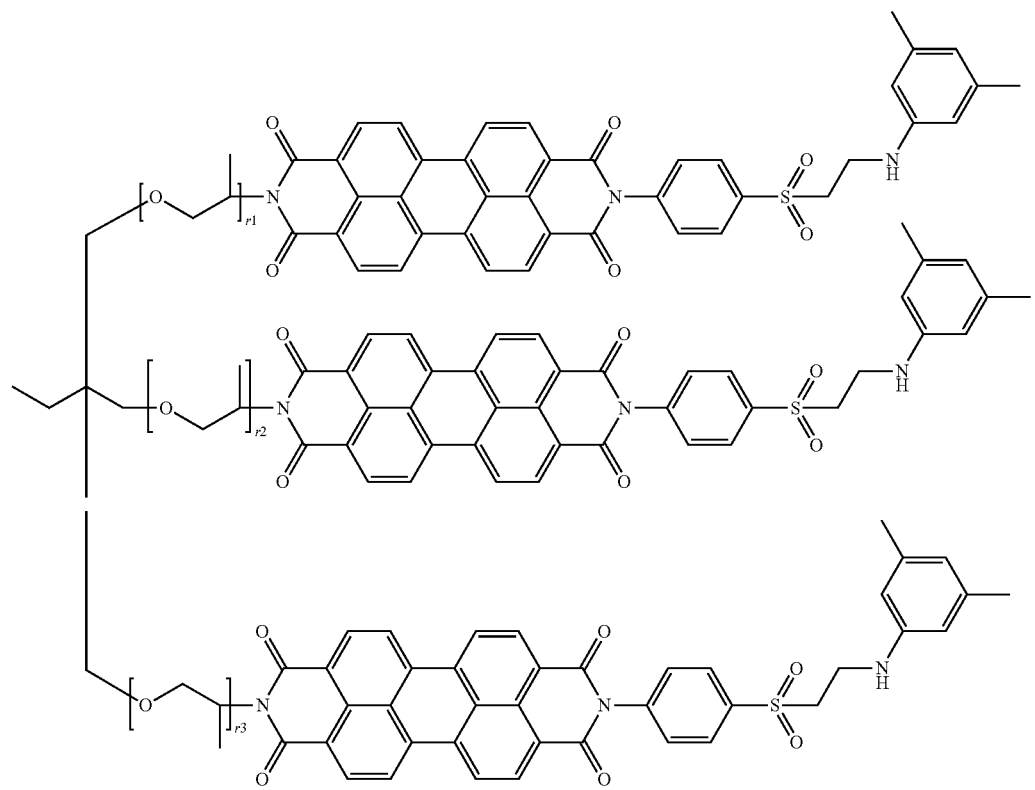
(Ih13)
r1 + r2 + r3 = 5 - 6

(Ih14)
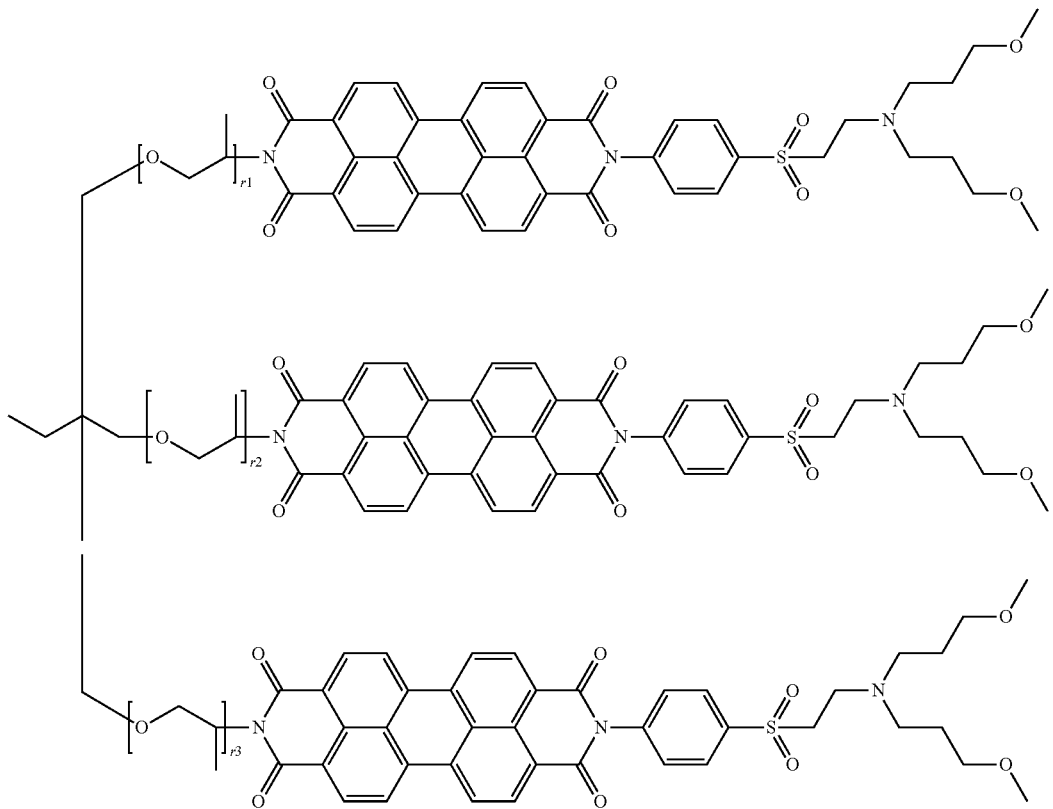
r1 + r2 + r3 = 5 - 6
(Ih15)
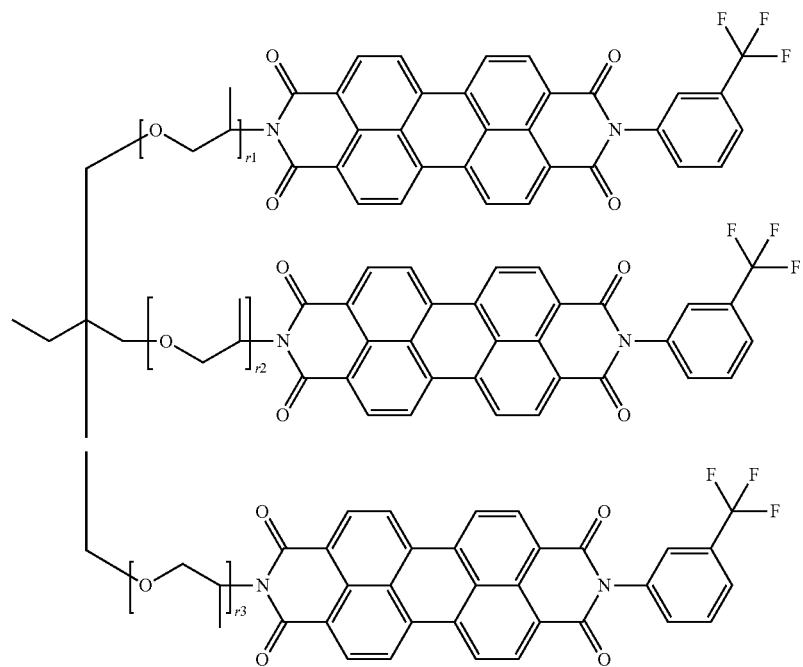
r1 + r2 + r3 = 5 - 6

(Ih16)
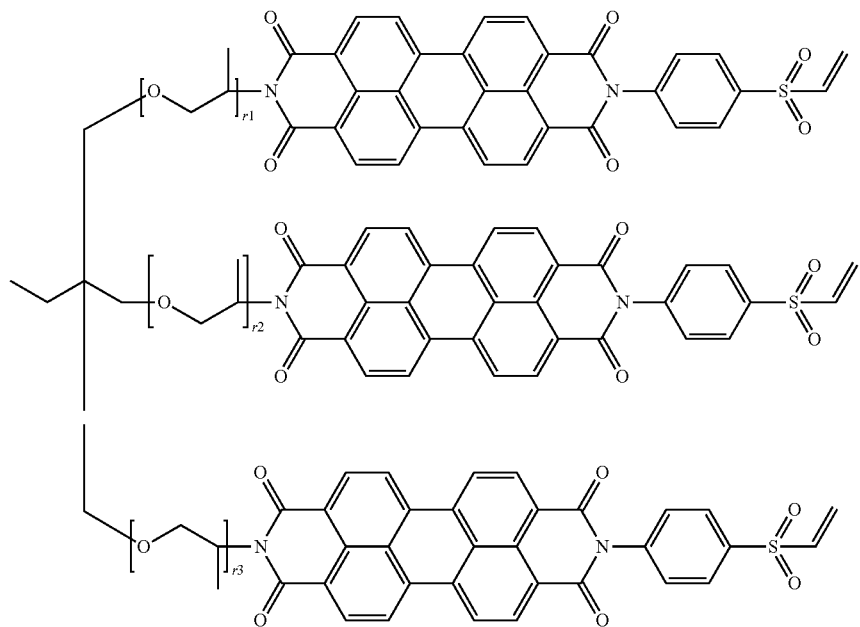
r1 + r2 + r3 = 5 - 6
(Ih17)
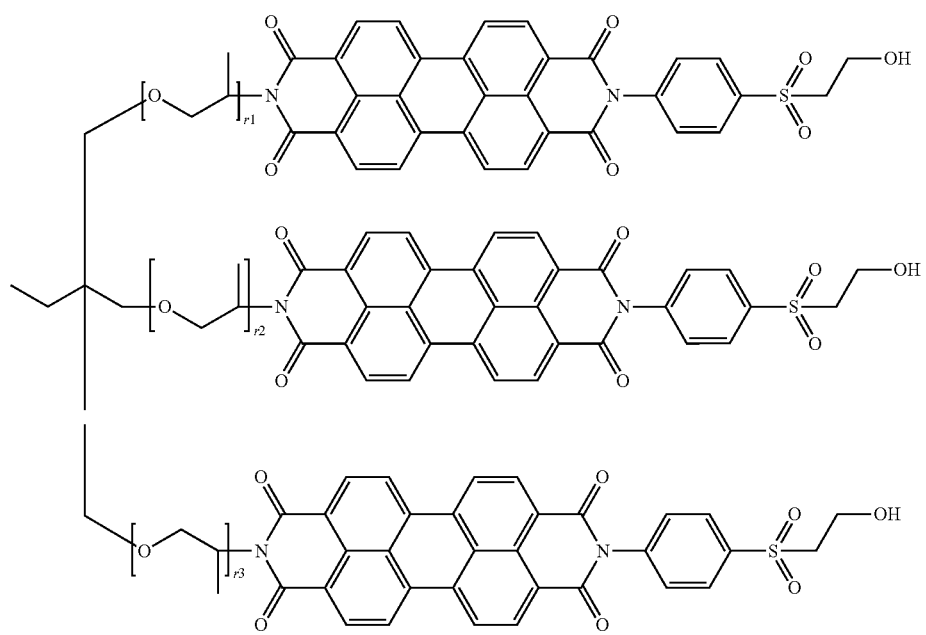
r1 + r2 + r3 = 5 - 6

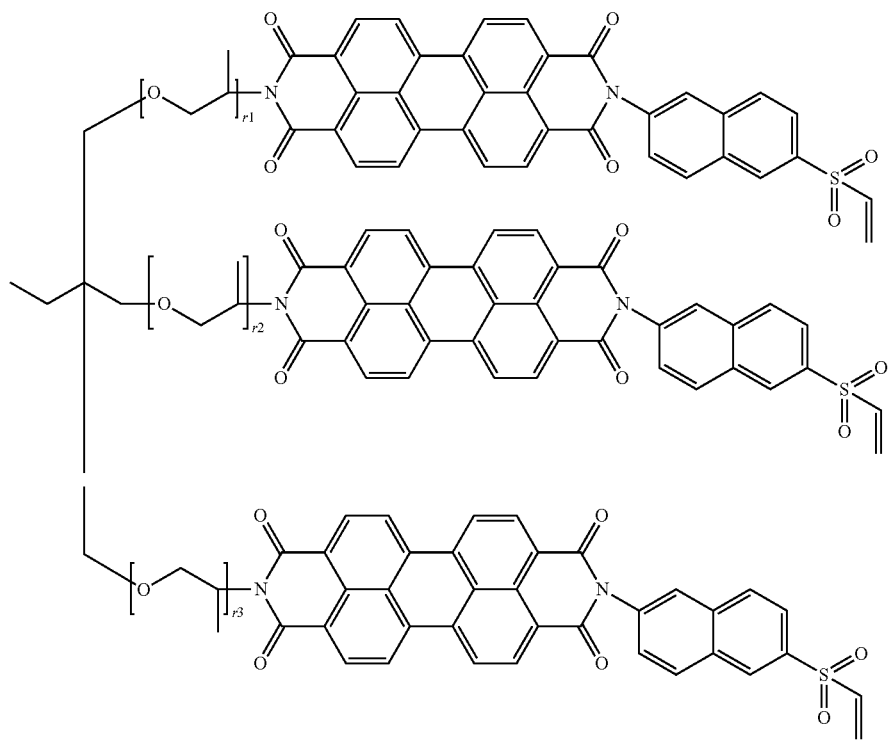
(Ih18)
r1 + r2 + r3 = 5 - 6
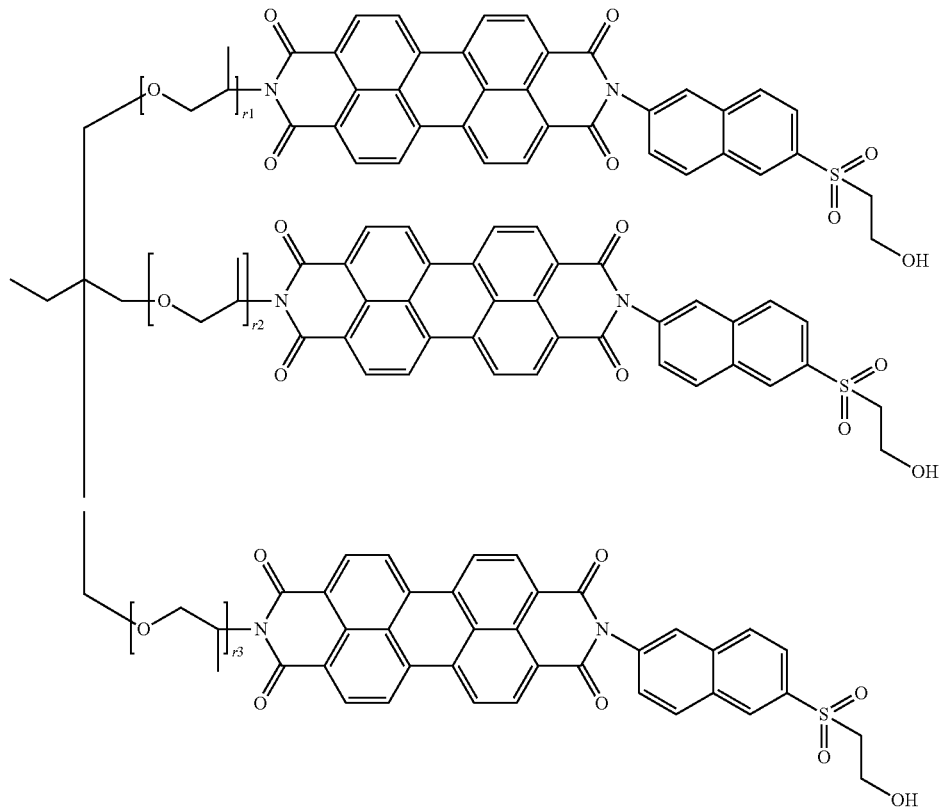
(Ih19)
r1 + r2 + r3 = 5 - 6

The dyes of formula (I) are obtainable by condensing the compound of formula (II)

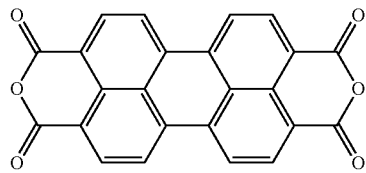

(II)

or the compound of formula (VI)

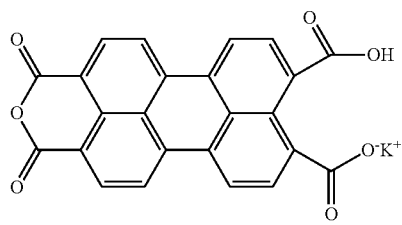

with a compound of formula (III) and a compound of formula (IV)

 (III)

 (IV)

where A and B are each as defined above.

These condensation reactions are preferably carried out at temperatures of 80 to 280° C., more preferably at 90 to 220° C., preferably in the presence of a catalyst. Suitable catalysts are quinoline, piperazine, pyridine, picolines or heavy metal salts, preferably zinc salts, most preferably zinc acetate.

The reaction can be carried out without solvent, in an inert solvent or in a mixture of inert solvents.

When no solvent is used, the reaction is advantageously carried out using an excess of the starting compounds used. Useful solvents include alcohols such as, for example, n-butanol, n-pentanol, 1-methoxy-2-propanol, 2-ethylhexanol, 2-methyl-1-butanol, isoamyl alcohol, benzyl alcohol, cyclohexanol, glycols and derivatives thereof such as for example ethylene glycol diethyl ether, ethylene glycol monomethyl ether, ethylene glycol monoethyl ether, ethylene glycol monoisopropyl ether, ethylene glycol monobutyl ether, diethylene glycol dimethyl ether, diethylene glycol diethyl ether, diethylene glycol monomethyl ether, ethylene glycol, diethylene glycol monoethyl ether, dipropylene glycol, ethers such as for example dibutyl ether, diisobutyl ether, diisoamyl ether, di-n-amyl ether, chlorinated solvents such as chlorobenzene or 1,2-dichlorobenzene, or further polar or apolar inert solvents such as for example phenol, imidazole, ethylbenzene, anisole, N,N-dimethylformamide, N,N-dimethylacetamide, sulfolane, N-methylpyrrolidone, toluene, 1,2-xylene, 1,3-xylene, 1,4-xylene or mixtures thereof.

When A and B are identical, the compounds of formulae (III) and (IV) can be reacted in a mixture, preferably with the compound of formula (II).

When A and B are not identical, the condensation reactions are particularly carried out in succession with or without intervening isolation of the intermediates formed, particularly by proceeding from the compound of formula (VI).

An intermediate obtainable from the compounds of formulae (III) and (VI) is the compound of formula (V)

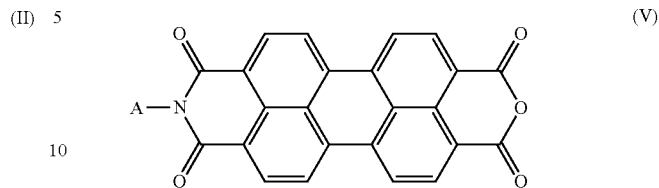

where A is as defined above. This can be reacted for example with a compound of formula (IVa)

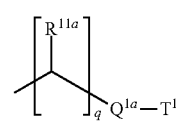

where $R^{1a1}$, $Q^{1a}$, $T^1$ and q are each as defined above, to form compounds of formulae (Ia) or (Ib), while reaction with the compound of formula (IVb)

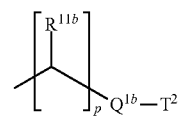

where $R^{11b}$, $Q^{1b}$, $T^3$ and p are each as defined above, produces compounds of formula (Ic).

Reacting the compound of formula (V) with a compound of formula (IVc)

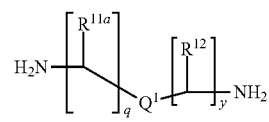

where $R^{11a}$, $R^{12}$, $Q^1$, q and y are each as defined above, produces compounds of formula (Id), (Ie) or (If), respectively, Finally, compounds of formulae (Ig) or (Ih) are formed when a compound of formula (V) is reacted with a compound of formula (IVd)

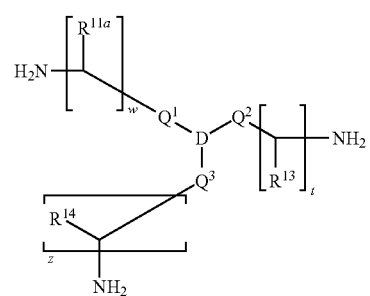

where $R^{11a}$, $R^{13}$, $R^{14}$, $Q^1$ to $Q^3$, D, w, t and z are each as defined above.

The compound of formula (II) is known and commercially available under the trivial name of peracid.

The compound of formula (VI) is known and can be prepared by following methods known in the literature, for example as described in Dyes and Pigments, (4) 1983, 171 ff.

The compounds of formulae (III) and (IV) are likewise known and commercially available or obtainable by following known methods.

Preferred compounds of formula (IV) are the compounds sold by Huntsman, The Woodlands, Tex., USA under the brand name of Jeffamine®. Examples are Jeffamine M-600, Jeffamine M-2005, Jeffamine M-2070, Jeffamine M-1000, Jeffamine D-230, Jeffamine D-400, Jeffamine D-2000, Jeffamine D-4000, Jeffamine HK-511, Jeffamine ED-600, Jeffamine ED-900, Jeffamine ED-2003, Jeffamine ED-2001, Jeffamine EDR-148, Jeffamine EDR-176, Jeffamine T-403, Jeffamine M-3000, Jeffamine T-5000, Jeffamine XTJ-435 and Jeffamine XTJ-436. When these compounds are used, the resulting dyes of formula (I) form statistical polymeric mixtures.

After synthesis, the dyes of formula (I) can be isolated by filtration, extraction or evaporation and, if necessary, drying. However, they can also be used without further workup.

The dyes of formula (I) according to the present invention can be used directly for polymer coloration, or they are subjected to a finishing (conditioning) operation to convert them into a salable dye preparation.

Finishing can be effected proceeding from a single dye of formula (I) or from a mixture of two or more dyes of formula (I) or mixtures of one or more of the dyes of formula (I) and dyes of other dye classes, for example pigments or solvent dyes, if appropriate with the assistance of auxiliaries, for example surface modifiers and dispersants, by dispersing, suspending or dissolving in a liquid or solid carrier material and also if appropriate standardizing to a desired color strength and a desired hue and if appropriate drying the preparation thus obtained.

Preparations comprising dyes of formula (I) may further comprise auxiliaries for modifying viscosity/flowability.

Useful auxiliaries of this kind are described for example in U.S. Pat. No. 6,605,126. Preferred examples are ethylene glycols, propylene glycols, polyether polyols, polyester polyols, lactones and carbonic esters.

The present invention accordingly also provides dye preparations comprising one or more dyes of formula (I) and also one or more auxiliaries for modifying viscosity/flowability.

These dye preparations preferably contain one or more dyes of formula (I) in amounts of 5% to 100% by weight and one or more auxiliaries for modifying viscosity/flowability in amounts of 0% to 95% by weight, all based on the dye preparation.

The present invention further provides for the use of the dyes of formula (I) according to the present invention for coloring a polymer.

A possible procedure here is for the dyes of formula (I) to be admixed to the polymer. In addition, dyes of formula (I) according to the present invention can also be used in the form of masterbatches. Masterbatches are dye concentrates consisting of carrier materials and colorants, the colorants being present in higher concentration than in the final use and the carrier materials being constituted such that they have compatibility with the materials to be colored. The carrier materials used can be polymers, for example polyolefins, polyurethane, polyvinyl chloride, polyesters, polyamides, polycarbonates or polystyrene. Preferred polymers are polyolefins, for example polyethylene or polypropylene and copolymers with polyolefins. Useful carrier materials further include paraffin oils and polyglycols. The dye masterbatches are characterized in particular in that they contain one or more dyes of formula (I) according to the present invention in amounts of 5% to 60% by weight and one or more carrier materials in amounts of 40% to 95% by weight.

The dyes of formula (I) have advantages in bleed/migration fastness in polyolefin mass coloration in particular, compared with commercially available solvent dyes. These advantages are particularly noticeable in the coloration of polypropylene, polypropylene copolymers and polypropylene blends. To achieve good bleed fastnesses for the colored polymer, it is preferable to use compounds of formula (I) that have sufficiently high molar mass.

The examples hereinbelow serve to elucidate the invention without restricting the invention to these examples. Parts and percentages are by weight, unless otherwise stated. Parts by weight relate to parts by volume as the kilogram relates to the liter.

Example 1 a) A mixture of 13.15 parts of the compound of formula (IVe)

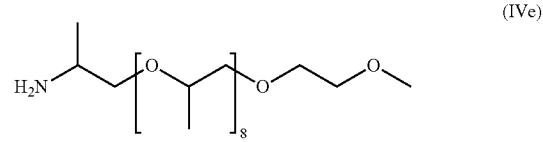

(IVe)

(commercially available as Jeffamine® M-600), 3.98 parts of the compound of formula (II), 20 parts of imidazole and 1.4 parts of zinc acetate dihydrate is stirred at 200° C. for 4 hours. After cooling to 50° C., the reaction mixture is introduced into toluene, the mixture is admixed with water and the phases are separated. After repeated washing, the organic phase is dried over sodium sulfate and evaporated to dryness to leave the compound of formula (Ic1).

b) 2.4 g of the dye obtained as per a) are applied to 1 kg of polypropylene pellet (Moplen RP340R from Basell). The masterbatch obtained is added to 1 kg of polypropylene pellet (Moplen RP340R from Basell). This mixture is mulled on a roller mill until homogeneous and then extruded in a twin-screw extruder (ZSE 18HP-D40 from Leistritz) and pelletized. The pellet obtained can be processed in an injection-molding machine (420 C 1000-100 from Arburg) to form transparent red sample plaques. The dye has high bleed fastness as per prEN14469-4, a high color stability to heat as per EN12877-2 and high light fastness as per EN ISO 105-B01.

Example 2 a) A mixture of 26.05 parts of the compound of formula (VI), 18.4 parts of 2-ethylhexylamine and 150 g of water is heated to 90° C. for 4 hours. After acidification, the precipitate formed is filtered off, washed neutral and dried to leave the compound of formula (Va).

(Va)

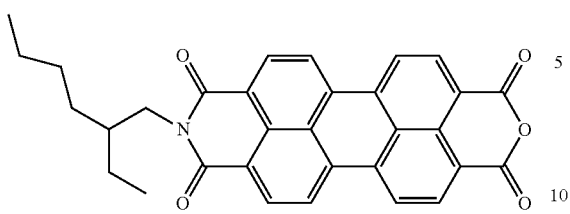

b) A mixture of 22.0 parts of the commercially available compound of formula (IVf)

(IVf)

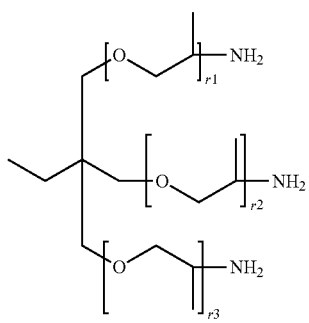

$r1 + r2 + r3 = 5-6$ (commercially available as Jeffamine® T-403), 3.98 parts of the compound of formula (II), 50 parts of imidazole, 7.55 g parts of the compound of formula (Va) prepared as per a) and 0.83 part of zinc acetate dihydrate is stirred at 200° C. for 8 hours. After cooling to 50° C., the reaction mixture is admixed with methanol. The isolated precipitate is for purification stirred at 50° C. with methanol, filtered off and dried to leave the compound of formula (Ig3).

c) 1 g of the dye obtained as per b) is comminuted in a mortar and added to altogether 2 kg of polypropylene pellet (Moplen RP340R from Basell). This mixture is mulled on a roller mill until homogeneous and then extruded in a twin-screw extruder (ZSE 18HP-D40 from Leistritz) and pelletized. The pellet obtained can be processed In an injection-molding machine (420 C 1000-100 from Arburg) to form transparent red sample plaques. The dye has high bleed fastness as per prEN14469-4, a good color stability to heat as per EN 12877-2 and good light fastness as per EN ISO 105-B01.

Example 3 a) A mixture of 7.13 parts of the compound of formula (IVe) mentioned in Example 1a), 25 parts of imidazole, 4.8 parts of the compound of formula (Va) prepared as per Example 2a) and 0.53 part of zinc acetate dihydrate is stirred at 200° C. for 2 hours. After cooling to 50° C., the reaction mixture is admixed with methanol. The isolated precipitate is for purification stirred at 50° C. with methanol, filtered off and dried to leave the compound of formula (Ic1).

b) 1 g of the dye obtained as per a) is added to altogether 2 kg of polypropylene pellet (Moplen RP340R from Basell). This mixture is mulled on a roller mill until homogeneous and then extruded in a twin-screw extruder (ZSE 18HP-D40 from Leistritz) and pelletized. The pellet obtained can be processed in an injection-molding machine (420 C 1000-100 from Arburg) to form transparent red sample plaques. The dye has high bleed fastness as per prEN14469-4, a high color stability to heat as per EN12877-2 and high light fastness as per EN ISO 105-B01.

Example 4 a) A mixture of 30.94 parts of the compound of formula (VI), 12.91 parts of 4-phenylbutylamine and 75 g of water is heated to 90° C. for 7 hours. After acidification, the precipitate formed is filtered off, washed neutral and dried to leave the compound of formula (Vb).

(Vb)

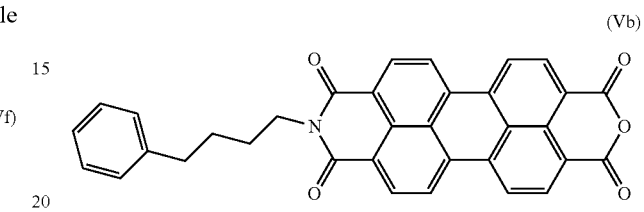

b) A mixture of 7.13 parts of the compound of formula (IVe) mentioned in Example 1a), 25 parts of imidazole, 5.0 parts of the compound of formula (Vb) prepared as per a) and 0.53 part of zinc acetate dihydrate is stirred at 200° C. for 2 hours. After cooling to 50° C., the reaction mixture is admixed with methanol. The isolated precipitate is for purification stirred at 50° C. with methanol, filtered off and dried to leave the compound of formula (Ia6).

b) 1 g of the dye obtained as per b) is added to altogether 2 kg of polypropylene pellet (Moplen RP340R from Basell). This mixture is mulled on a roller mill until homogeneous and then extruded in a twin-screw extruder (ZSE 18HP-D40 from Leistritz) and pelletized. The pellet obtained can be processed in an injection-molding machine (420 C 1000-100 from Arburg) to form transparent red sample plaques. The dye has high bleed fastness as per prEN14469-4, a good color stability to heat as per EN12877-2 and good light fastness as per EN ISO 105-B01.

What is claimed is:

1. A compound of the formula (1d), (1e), (1f), (1g) or (1h), (Id)

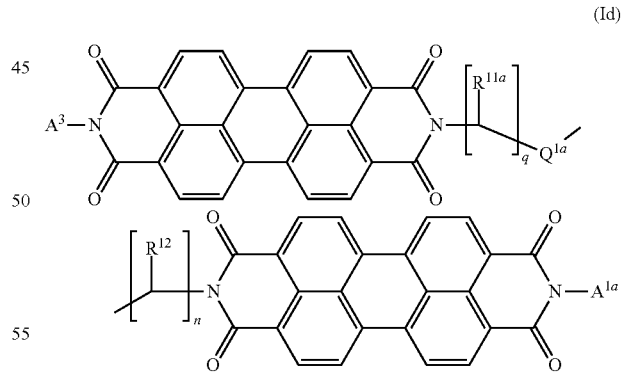

wherein
$R^{11a}$ and $R^{12}$ each independently have one of the meanings of $R^{11}$;
$R^{11}$ represent hydrogen, $(C_1-C_{35})$-alkyl, singly or multiply oxygen-interrupted $(C_1-C_{35})$-alkyl, aryl, aryl-$(C_1-C_{35})$-alkyl, $(C_1-C_{35})$-alkyl-aryl, aryloxy, $(C_1-C_{35})$-alkoxy, monohydroxy-$(C_1-C_{35})$-alkyl or polyhydroxy-$(C_2-C_{35})$-alkyl and are each identical or different within a molecule of formula (I);
q represents a number from 1 to 10;

n represents a number from 0 to 10;
A$^{1a}$ has one of the meanings of A$^3$, independently of A$^3$; and
A$^3$ represents (C$_5$-C$_6$)-cycloalkyl; heterocycloalkyl having 5 to 10 ring members; heteroaryl having 5 or 6 ring members; (C$_1$-C$_{35}$)-alkyl; (C$_2$-C$_{35}$)-alkyl interrupted by one or more hetero atoms, (C$_1$-C$_{35}$)-alkyl substituted by one or more substituents G$^2$; (C$_2$-C$_{35}$)-alkyl interrupted by one or more hetero atoms and substituted by one or more substituents G$^2$;
G$^2$ represents trifluoromethyl; cyclo-(C$_5$-C$_6$)-alkyl; aryl; heteroaryl having 5 or 6 ring members; heterocycloalkyl having 5 or 6 ring members; hydroxyl; (C$_1$-C$_{35}$)-alkoxy; aryloxy; (C$_2$-C$_{35}$)-acyl; arylcarbonyl, (C$_2$-C$_{35}$)-acyloxy; arylcarbonyloxy; (C$_2$-C$_{35}$)-acylamino; (C$_1$-C$_{35}$)-alkylsulfonylamino; aryl sulfonyl amino; arylcarbonylamino; carbamoyl; N-monocyclo-(C$_3$-C$_8$)-alkyl-carbamoyl; N-mono-(C$_1$-C$_{35}$)-alkyl-carbamoyl; N,N-dicyclo-(C$_3$-C$_8$)-alkyl-carbamoyl; N,N-di-(C$_1$-C$_{35}$)-alkyl-carbamoyl; N-monoaryl-carbamoyl; N,N-diaryl-carbamoyl; N-monocyclo-(C$_3$-C$_8$)-alkyl-N-monoarylcarbamoyl; N-mono-(C$_1$-C$_{35}$)-alkyl-N-monoaryl-carbamoyl; (C$_1$-C$_{35}$)-alkoxycarbonyl; aryloxycarbonyl; amino; monocyclo-(C$_3$-C$_8$)-alkyl-amino; mono-(C$_1$-C$_{35}$)-alkyl-amino; di(cyclo)-(C$_3$-C$_8$)-alkyl-amino; di-(C$_1$-C$_{35}$)-alkyl-amino; monoaryl-amino; diaryl-amino; monocyclo-(C$_3$-C$_8$)-alkylmonoarylamino; mono-(C$_1$-C$_{35}$)-alkylmonoarylamino; aminothiocarbonylamino; aminocarbonylamino; sulfamoyl; N-monocyclo-(C$_3$-C$_8$)-alkyl-sulfamoyl; N-mono-(C$_1$-C$_{35}$)-alkyl-sulfamoyl; N,N-dicyclo-(C$_3$-C$_8$)-alkyl-sulfamoyl; N,N-di-(C$_1$-C$_{35}$)-alkyl-sulfamoyl; N-monoaryl-sulfamoyl; N,N-diaryl-sulfamoyl; N-monocyclo-(C$_3$-C$_8$)-alkyl-N-monoarylsulfamoyl; N-mono-(C$_1$-C$_{35}$)-alkyl-N-monoarylsulfamoyl; aminosulfonyl-amino; (C$_1$-C$_{35}$)-alkylthio; arylthio; (C$_1$-C$_{35}$)-alkylsulfonyl or arylsulfonyl; wherein
aryl represents a group of formula (9a) or (10a)

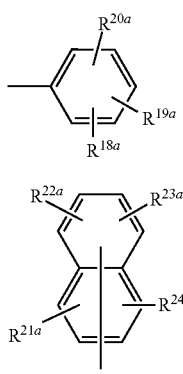

(9a)

(10a)

wherein
R$^{18a}$ to R$^{24a}$ each independently represent hydrogen; (C$_1$-C$_{12}$)-alkyl; trifluoromethyl; cyclo-(C$_3$-C$_8$)-alkyl; halogen; cyano; nitro; hydroxyl; (C$_1$-C$_6$)-alkoxy; (C$_2$-C$_6$)-acyl; (C$_2$-C$_6$)-acylamino; (C$_1$-C$_6$)-alkylsulfonylamino; carbamoyl; N-mono-(C$_1$-C$_6$)-alkyl-carbamoyl; N,N-di-(C$_1$-C$_6$)-alkyl-carbamoyl; amino; mono-(C$_1$-C$_6$)-alkyl-amino; di-(C$_1$-C$_6$)-alkyl-amino; aminocarbonylamino; sulfamoyl; N-mono-(C$_1$-C$_6$)-alkyl-sulfamoyl; N,N-di-(C$_1$-C$_6$)-alkyl-sulfamoyl; aminosulfonylamino; (C$_1$-C$_6$)-alkylthio or (C$_1$-C$_6$)-alkylsulfonyl;
Q$^{1a}$ has one of the meanings of Q$^1$, Q$^1$ represents a group of formula (7)

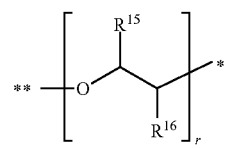

(7)

wherein
r represents a rational number from 1 to 200;
R$^{15}$ and R$^{16}$ each independently represent hydrogen, (C$_1$-C$_{35}$)-alkyl, singly or multiply oxygen-interrupted (C$_1$-C$_{35}$)-alkyl, aryl, aryloxy, (C$_1$-C$_{35}$)-alkoxy, monohydroxy-(C$_1$-C$_{35}$)-alkyl or polyhydroxy-(C$_2$-C$_{35}$)alkyl;

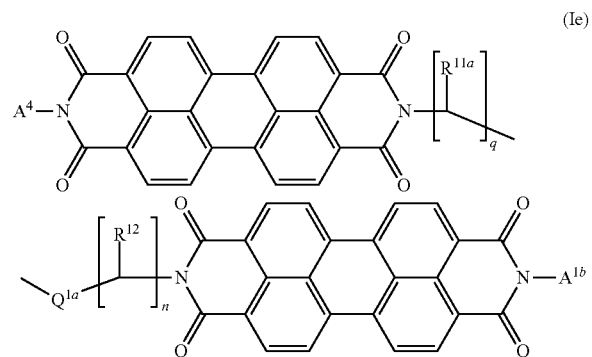

(Ie)

wherein
R$^{11a}$ and R$^{12}$ each independently have one of the meanings of R$^{11}$;
q represents a number from 1 to 10;
n represents a number from 0 to 10;
A$^{1b}$ has one of the meanings of A$^4$ independently of A$^4$; and
A$^4$ represents a group Ar;
Ar represents a group of formula (1) or (2)

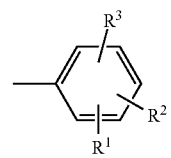

(1)

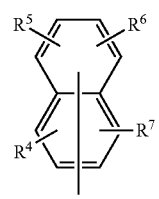

(2)

wherein
R$^1$ to R$^7$ each independently represent hydrogen; (C$_1$-C$_{35}$)-alkyl; singly or multiply hetero atom-interrupted (C$_2$-C$_{35}$)-alkyl, monohydroxy-(C$_1$-C$_{35}$)-alkyl, polyhydroxy-(C$_2$-C$_{35}$)alkyl, vinylsulfonyl, hydroxyethylsulfonyl, trifluoromethyl; cyclo-(C$_5$-C$_6$)-alkyl; aryl; heteroaryl having 5 or 6 ring members; heterocycloalkyl having 5 or 6 ring members; halogen; cyano; nitro; hydroxyl; (C$_1$-C$_{35}$)-alkoxy; aryl-(C$_1$-C$_{35}$)-alkoxy, aryloxy; (C$_2$-C$_{35}$)-acyl; cyclo-(C$_3$-C$_8$)-alkylcarbonyl, arylcarbonyl, (C$_2$-C$_{35}$)-acyloxy; arylcarbonyloxy; ($C_2$-$C_{35}$)-acylamino; ($C_1$-$C_{35}$)-alkylsulfonylamino; arylsulfonylamino; arylcarbonylamino; carbamoyl; N-monocyclo-($C_3$-$C_8$)-alkyl-carbamoyl; N-mono-($C_1$-$C_{35}$)-alkyl-carbamoyl; N,N-dicyclo-($C_3$-$C_8$)-alkyl-carbamoyl; N,N-di-($C_1$-$C_{35}$)-alkyl-carbamoyl; N-monoaryl-carbamoyl; N,N-diaryl-carbamoyl; N-monocyclo-($C_3$-$C_8$)-alkyl-N-monoarylcarbamoyl; N-mono-($C_1$-$C_{35}$)-alkyl-N-monoarylcarbamoyl; ($C_1$-$C_{35}$)-alkoxycarbonyl; aryloxycarbonyl; amino; monocyclo-($C_3$-$C_8$)-alkyl-amino; mono-($C_1$-$C_{35}$)-alkyl-amino; di(cyclo)-($C_3$-$C_8$)-alkyl-amino; amino; monoaryl-amino; diaryl-amino; monocyclo-($C_3$-$C_8$)-alkylmonoarylamino; mono-($C_1$-$C_{35}$)-alkylmonoaryl-amino; aminothiocarbonylamino; aminocarbonylamino; sulfamoyl; N-monocyclo-($C_3$-$C_8$)-alkyl-sulfamoyl; N-mono-($C_1$-$C_{35}$)-alkyl-sulfamoyl; N,N-dicyclo-($C_3$-$C_8$)-alkyl-sulfamoyl; N,N-di-($C_1$-$C_{35}$)-alkyl-sulfamoyl; N-monoaryl-sulfamoyl; N,N-diaryl-sulfamoyl; N-monocyclo-($C_3$-$C_8$)-alkyl-N-monoarylsulfamoyl; N-mono-($C_1$-$C_{35}$)-alkyl-N-monoarylsulfamoyl; aminosulfonylamino; ($C_1$-$C_{35}$)-alkylthio; arylthio; ($C_1$-$C_{35}$)-alkylsulfonyl or arylsulfonyl; or a substituent of formula (2) or (3)

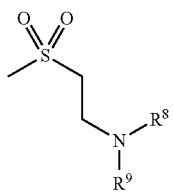

(2)

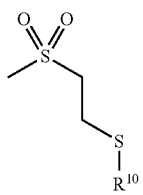

(3)

wherein
$R^8$ to $R^{10}$ each independently represent ($C_5$-$C_6$)-cycloalkyl; heterocycloalkyl having 5 or 6 ring members; heteroaryl having 5 or 6 ring members; aryl; ($C_1$-$C_{35}$)-alkyl; ($C_2$-$C_{35}$)-alkyl interrupted by one or more hetero atoms; ($C_1$-$C_{35}$)-alkyl substituted by one or more substituents $G^1$; or ($C_2$-$C_{35}$)-alkyl interrupted by one or more hetero atoms and substituted by one or more substituents $G^1$; and $R^8$ and $R^9$ optionally represent hydrogen;

$Q^{1a}$ has one of the meanings of $Q^1$;

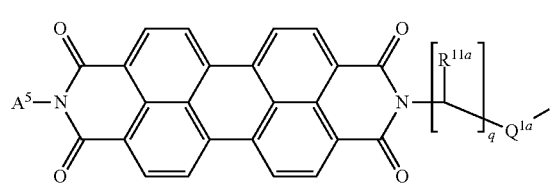

(If)

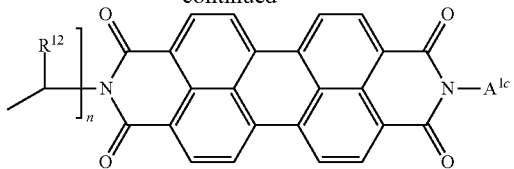

wherein
$A^{1c}$ represents a group of formula (4c)

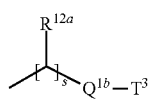

(4c)

and
$A^5$ represents a group of formula (4d)

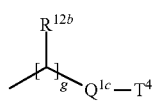

(4d)

wherein
$R^{11a}$, $R^{12}$, $R^{12a}$ and $R^{12b}$ each independently have one of the meanings of $R^{11}$;
q, s and g each independently represent a number from 1 to 10;
n represents a number from 0 to 10;
$T^3$ and $T^4$ each independently represent hydrogen, ($C_1$-$C_{35}$)-alkyl, aryl, aryloxy, ($C_1$-$C_{35}$)-alkoxy or ($C_1$-$C_{35}$)-alkyl-aryloxy;
$Q^{1b}$ and $Q^{1c}$ each have one of the meanings of $Q^{1a}$ independently of $Q^{1a}$; and
$Q^{1a}$ has one of the meanings of $Q^1$;

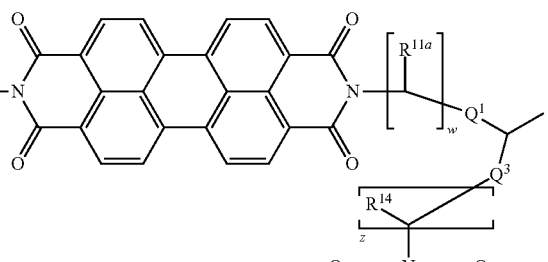

(Ig)

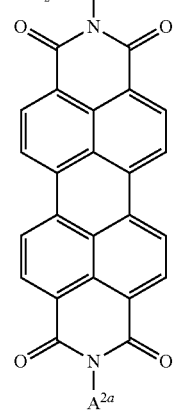

-continued

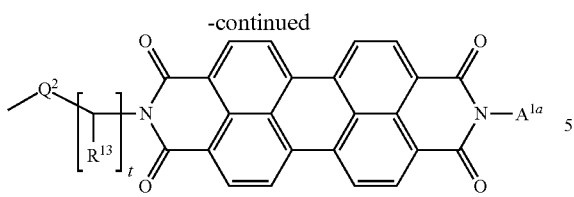

wherein
$R^{13}$ and $R^{14}$ each independently have one of the meanings of $R^{11a}$ independently of $R^{11a}$;
t, w and z each independently represent a number from 0 to 10;
$Q^2$ and $Q^3$ each independently have one of the meanings of $Q^1$ independently of $Q^1$;
D represents a group of formula (8a)

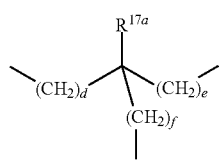 (8a)

wherein
$R^{17a}$ represents hydrogen or $(C_1-C_{35})$-alkyl; and
d, e and f independently represent a number from 0 to 5;
$A^{1a}$ and $A^{2a}$ each independently have one of the meanings of $A^3$ independently of $A^3$; and
$A^3$ represents $(C_5-C_6)$-cycloalkyl; heterocycloalkyl having 5 to 10 ring members; heteroaryl having 5 or 6 ring members; $(C_1-C_{35})$-alkyl; $(C_2-C_{35})$-alkyl interrupted by one or more hetero atoms, $(C_1-C_{35})$-alkyl substituted by one or more substituents $G^2$; $(C_2-C_{35})$-alkyl interrupted by one or more hetero atoms and substituted by one or more substituents $G^2$;
$R^{11a}$ has one of the meanings of $R^{11}$; and
$Q^1$ is as defined above;

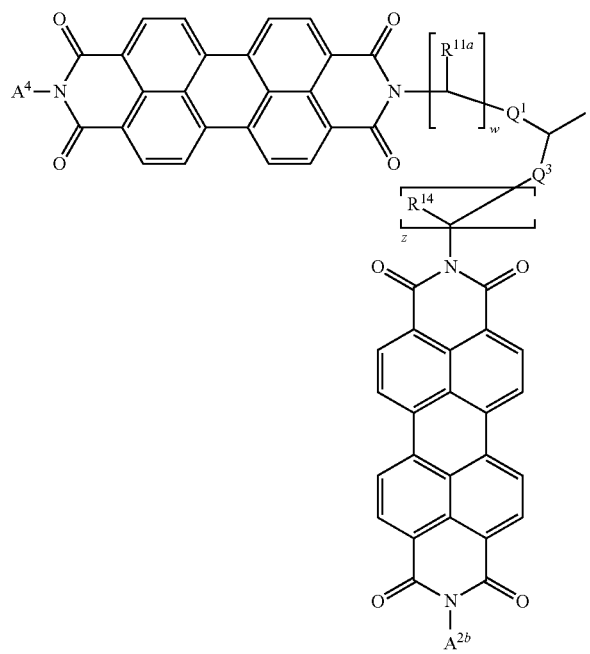 (Ih)

wherein
$R^{13}$ and $R^{14}$ each independently have one of the meanings of $R^{11a}$ independently of $R^{11a}$;
t, w and z each independently represent a number from 0 to 10;
$Q^2$ and $Q^3$ each independently have one of the meanings of $Q^1$ independently of $Q^1$;
D represents a group of formula (8a)

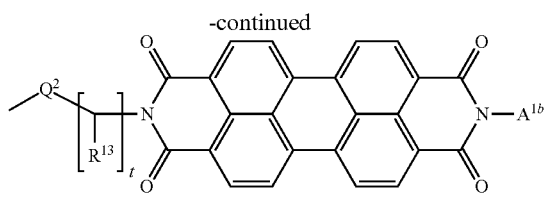

(8a)

wherein
$R^{17a}$ represents hydrogen or $(C_1-C_{35})$-alkyl; and
d, e and f independently represent a number from 0 to 5;
$A^{1b}$ and $A^{2b}$ each independently have one of the meanings of $A^4$ independently of $A^4$; and
$A^4$ represents a group Ar as defined above; $R^{11a}$ has one of the meanings of $R^{11}$; and $Q^1$ is as defined above.

2. The compound as claimed in claim 1, wherein the compound is the formula (1d).

3. The compound as claimed in claim 1, wherein the compound is the formula (1e).

4. The compound as claimed in claim 1, wherein the compound is the formula (1f).

5. The compound as claimed in claim 1, wherein the compound is the formula (1g).

6. The compound as claimed in claim 1, wherein the compound is the formula (1h).

7. A process for coloring a polymer which comprises utilizing a dye comprising the compound of formula (I) as claimed in claim 1.

8. A masterbatch comprising the compound of formula (I) as claimed in claim 1 and a carrier material.

* * * * *